(12) United States Patent
Atsumi et al.

(10) Patent No.: US 10,884,706 B2
(45) Date of Patent: *Jan. 5, 2021

(54) RANDOMIZATION OF DATA USING A PLURALITY OF TYPES OF PSEUDORANDOM NUMBER GENERATORS

(71) Applicant: Toshiba Memory Corporation, Tokyo (JP)

(72) Inventors: Tsuyoshi Atsumi, Ota Tokyo (JP); Yasuhiko Kurosawa, Fujisawa Kanagawa (JP); Yohei Koganei, Kawasaki Kanagawa (JP); Yuji Nagai, Sagamihara Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/567,898

(22) Filed: Sep. 11, 2019

(65) Prior Publication Data

US 2020/0004505 A1  Jan. 2, 2020

Related U.S. Application Data

(63) Continuation of application No. 15/448,558, filed on Mar. 2, 2017, now Pat. No. 10,459,691.

(30) Foreign Application Priority Data

Sep. 15, 2016 (JP) ................. 2016-180509

(51) Int. Cl.
G06F 7/58 (2006.01)
H04L 9/06 (2006.01)

(52) U.S. Cl.
CPC .............. *G06F 7/582* (2013.01); *G06F 7/584* (2013.01); *H04L 9/0662* (2013.01); *H04L 2209/08* (2013.01)

(58) Field of Classification Search
CPC ........... G06F 7/582; G06F 7/584; G06F 7/586
See application file for complete search history.

(56) References Cited

U.S. PATENT DOCUMENTS 7,860,912 B1  12/2010  Gyugyi et al.
8,976,586 B2  3/2015  Nagai et al.
(Continued)

FOREIGN PATENT DOCUMENTS

JP  H04246681 A  9/1992
JP  2009157836 A  7/2009
(Continued)

OTHER PUBLICATIONS

U.S. Appl. No. 15/253,757, filed Aug. 31, 2016, now U.S. Pat. No. 9,921,772.
(Continued)

*Primary Examiner* — Chuong D Ngo
(74) *Attorney, Agent, or Firm* — Kim & Stewart LLP

(57) ABSTRACT

A randomizer includes a first pseudorandom number generator, a second pseudorandom number generator, and a first logic circuit configured to output a pseudorandom sequence by carrying out an operation on a pseudorandom sequence generated by the first pseudorandom number generator and a pseudorandom sequence generated by the second pseudorandom number generator, and a second logic circuit configured to randomize a data string input to the randomizer based on the pseudorandom sequence output by the first logic circuit.

13 Claims, 43 Drawing Sheets

(56) References Cited

U.S. PATENT DOCUMENTS

| | | | |
|---|---|---|---|
| 9,301,169 | B2 | 3/2016 | Suenaga |
| 9,921,772 | B2 | 3/2018 | Atsumi et al. |
| 10,459,691 | B2 * | 10/2019 | Atsumi ................ G06F 7/582 |
| 2009/0204656 | A1 | 8/2009 | Goettfert et al. |
| 2009/0327382 | A1 | 12/2009 | Hisakado |
| 2013/0018934 | A1 | 1/2013 | Kim et al. |

FOREIGN PATENT DOCUMENTS

| | | |
|---|---|---|
| JP | 2010002959 A | 1/2010 |
| JP | 2010160248 A | 7/2010 |
| JP | 2012048614 A | 3/2012 |
| JP | 2012252195 A | 12/2012 |
| JP | 2013021461 A | 1/2013 |
| JP | 2014165832 A | 9/2014 |

OTHER PUBLICATIONS

Japanese Office Action dated Apr. 2, 2019 in related Japanese Patent Application 2016-180509 with English translation, 10 pages.

* cited by examiner

FIG. 8

| shiftnum | offset | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 2 | 3 | 4 | 5 | 6 | 7 | 8 | 9 | 10 | 11 | 12 | 13 | 14 | 15 |
| 1 | 16 | 17 | 18 | 19 | 20 | 21 | 22 | 23 | 24 | 25 | 26 | 27 | 28 | 29 | 30 | 31 |
| 2 | 32 | 33 | 34 | 35 | 36 | 37 | 38 | 39 | 40 | 41 | 42 | 43 | 44 | 45 | 46 | 47 |
| 3 | 48 | 49 | 50 | 51 | 52 | 53 | 54 | 55 | 56 | 57 | 58 | 59 | 60 | 61 | 62 | 63 |
| 4 | 64 | 65 | 66 | 0 | 1 | 2 | 3 | 4 | 5 | 6 | 7 | 8 | 9 | 10 | 11 | 12 |
| 5 | 13 | 14 | 15 | 16 | 17 | 18 | 19 | 20 | 21 | 22 | 23 | 24 | 25 | 26 | 27 | 28 |
| 6 | 29 | 30 | 31 | 32 | 33 | 34 | 35 | 36 | 37 | 38 | 39 | 40 | 41 | 42 | 43 | 44 |
| 7 | 45 | 46 | 47 | 48 | 49 | 50 | 51 | 52 | 53 | 54 | 55 | 56 | 57 | 58 | 59 | 60 |
| 8 | 61 | 62 | 63 | 64 | 65 | 66 | 0 | 1 | 2 | 3 | 4 | 5 | 6 | 7 | 8 | 9 |
| 9 | 10 | 11 | 12 | 13 | 14 | 15 | 16 | 17 | 18 | 19 | 20 | 21 | 22 | 23 | 24 | 25 |
| 10 | 26 | 27 | 28 | 29 | 30 | 31 | 32 | 33 | 34 | 35 | 36 | 37 | 38 | 39 | 40 | 41 |
| 11 | 42 | 43 | 44 | 45 | 46 | 47 | 48 | 49 | 50 | 51 | 52 | 53 | 54 | 55 | 56 | 57 |
| 12 | 58 | 59 | 60 | 61 | 62 | 63 | 64 | 65 | 66 | 0 | 1 | 2 | 3 | 4 | 5 | 6 |
| 13 | 7 | 8 | 9 | 10 | 11 | 12 | 13 | 14 | 15 | 16 | 17 | 18 | 19 | 20 | 21 | 22 |
| 14 | 23 | 24 | 25 | 26 | 27 | 28 | 29 | 30 | 31 | 32 | 33 | 34 | 35 | 36 | 37 | 38 |
| 15 | 39 | 40 | 41 | 42 | 43 | 44 | 45 | 46 | 47 | 48 | 49 | 50 | 51 | 52 | 53 | 54 |
| 16 | 55 | 56 | 57 | 58 | 59 | 60 | 61 | 62 | 63 | 64 | 65 | 66 | 0 | 1 | 2 | 3 |
| 17 | 4 | 5 | 6 | 7 | 8 | 9 | 10 | 11 | 12 | 13 | 14 | 15 | 16 | 17 | 18 | 19 |
| 18 | 20 | 21 | 22 | 23 | 24 | 25 | 26 | 27 | 28 | 29 | 30 | 31 | 32 | 33 | 34 | 35 |
| 19 | 36 | 37 | 38 | 39 | 40 | 41 | 42 | 43 | 44 | 45 | 46 | 47 | 48 | 49 | 50 | 51 |
| 20 | 52 | 53 | 54 | 55 | 56 | 57 | 58 | 59 | 60 | 61 | 62 | 63 | 64 | 65 | 66 | 0 |
| 21 | 1 | 2 | 3 | 4 | 5 | 6 | 7 | 8 | 9 | 10 | 11 | 12 | 13 | 14 | 15 | 16 |
| 22 | 17 | 18 | 19 | 20 | 21 | 22 | 23 | 24 | 25 | 26 | 27 | 28 | 29 | 30 | 31 | 32 |
| 23 | 33 | 34 | 35 | 36 | 37 | 38 | 39 | 40 | 41 | 42 | 43 | 44 | 45 | 46 | 47 | 48 |
| 24 | 49 | 50 | 51 | 52 | 53 | 54 | 55 | 56 | 57 | 58 | 59 | 60 | 61 | 62 | 63 | 64 |

FIG. 9

| INDEX | SEED |
|---|---|
| 0 | 00000001 |
| 1 | 9489ba62 |
| 2 | 4963ae34 |
| 3 | d8aa9eca |
| 4 | c16134c9 |
| 5 | 814fb74f |
| 6 | f51a001e |
| 7 | 348363d0 |
| 8 | e6f7cc7a |
| 9 | d2e8d2e5 |
| 10 | d17bf247 |
| 11 | c2fb03d3 |
| 12 | 37ab64c8 |
| 13 | 547fc47d |
| 14 | fdaaaaa9 |
| 15 | 364bfe75 |
| 16 | 3f52dcc6 |
| 17 | e67b1b43 |
| 18 | 1db3d22d |
| 19 | cdb9309f |
| 20 | 0a99fba9 |
| 21 | 7bddf962 |
| 22 | e06427b7 |
| 23 | 9b963ca3 |
| 24 | 15f31077 |
| 25 | f7fa1f7a |
| 26 | 8eddd13f |
| 27 | 49487e21 |
| 28 | 45a110be |
| 29 | 79dab490 |
| 30 | 370d8e70 |
| 31 | e7aacbf8 |
| 32 | 26cfaecf |
| 33 | a9f88671 |

| INDEX | SEED |
|---|---|
| 34 | e570fbe0 |
| 35 | fc888e03 |
| 36 | 9137909a |
| 37 | e78928ba |
| 38 | af42586d |
| 39 | dc62791a |
| 40 | c1ea853d |
| 41 | 7962cbab |
| 42 | 8d04507d |
| 43 | 993bd80b |
| 44 | 23c1ea96 |
| 45 | cc10c634 |
| 46 | b4f57180 |
| 47 | 8b82f22f |
| 48 | 21a12e28 |
| 49 | 121e5cdc |
| 50 | 7d52b96a |
| 51 | 650e025c |
| 52 | 27129d3e |
| 53 | 5f4daed5 |
| 54 | b1644f81 |
| 55 | 888cc660 |
| 56 | d10ba513 |
| 57 | d46db956 |
| 58 | c1e3077e |
| 59 | 50a670f1 |
| 60 | 0b945a65 |
| 61 | b874ad1d |
| 62 | 32673916 |
| 63 | 1c79c97c |
| 64 | 3818a21e |
| 65 | 40fdd5bb |
| 66 | 68ad234b |

FIG. 35

| | FRAME OFFSET NUMBER | | | | | | | | | | | | | | |
|---|---|---|---|---|---|---|---|---|---|---|---|---|---|---|---|
| | | 0 | 1 | 2 | 3 | 4 | 5 | 6 | 7 | 8 | 9 | 10 | ⋯ ⋯ ⋯ | 30 | 31 |
| PAGE NUMBER | 0 | 0 | 1 | 2 | 3 | 4 | 5 | 6 | 7 | 8 | 9 | 10 | ⋯ ⋯ ⋯ | 30 | 31 |
| | 1 | 32 | 33 | 34 | 35 | 36 | 37 | 38 | 39 | 40 | 41 | 42 | ⋯ ⋯ ⋯ | 62 | 63 |
| | 2 | 64 | 65 | 66 | 0 | 1 | 2 | 3 | 4 | 5 | 6 | 7 | ⋯ ⋯ ⋯ | 27 | 28 |
| | 3 | 29 | 30 | 31 | 32 | 33 | 34 | 35 | 36 | 37 | 38 | 39 | ⋯ ⋯ ⋯ | 59 | 60 |
| | 4 | 61 | 62 | 63 | 64 | 65 | 66 | 0 | 1 | 2 | 3 | 4 | ⋯ ⋯ ⋯ | 24 | 25 |
| | 5 | 26 | 27 | 28 | 29 | 30 | 31 | 32 | 33 | 34 | 35 | 36 | ⋯ ⋯ ⋯ | 56 | 57 |
| | 6 | 58 | 59 | 60 | 61 | 62 | 63 | 64 | 65 | 66 | 0 | 1 | ⋯ ⋯ ⋯ | 21 | 22 |
| | 7 | 23 | 24 | 25 | 26 | 27 | 28 | 29 | 30 | 31 | 32 | 33 | ⋯ ⋯ ⋯ | 53 | 54 |
| | 8 | 55 | 56 | 57 | 58 | 59 | 60 | 61 | 62 | 63 | 64 | 65 | ⋯ ⋯ ⋯ | 18 | 19 |
| | ⋯ | ⋯ | ⋯ | ⋯ | ⋯ | ⋯ | ⋯ | ⋯ | ⋯ | ⋯ | ⋯ | ⋯ | ⋯ ⋯ ⋯ | ⋯ | ⋯ |
| | 67 | 0 | 2 | 4 | 6 | 8 | 10 | 12 | 14 | 16 | 18 | 20 | ⋯ ⋯ ⋯ | 60 | 62 |
| | 68 | 64 | 66 | 1 | 3 | 5 | 7 | 9 | 11 | 13 | 15 | 17 | ⋯ ⋯ ⋯ | 57 | 59 |
| | 69 | 61 | 63 | 65 | 0 | 2 | 4 | 6 | 8 | 10 | 12 | 14 | ⋯ ⋯ ⋯ | 54 | 56 |
| | 70 | 58 | 60 | 62 | 64 | 66 | 1 | 3 | 5 | 7 | 9 | 11 | ⋯ ⋯ ⋯ | 51 | 53 |
| | 71 | 55 | 57 | 59 | 61 | 63 | 65 | 0 | 2 | 4 | 6 | 8 | ⋯ ⋯ ⋯ | 48 | 50 |
| | 72 | 52 | 54 | 56 | 58 | 60 | 62 | 64 | 66 | 1 | 3 | 5 | ⋯ ⋯ ⋯ | 45 | 47 |
| | 73 | 49 | 51 | 53 | 55 | 57 | 59 | 61 | 63 | 65 | 0 | 2 | ⋯ ⋯ ⋯ | 42 | 44 |
| | 74 | 46 | 48 | 50 | 52 | 54 | 56 | 58 | 60 | 62 | 64 | 66 | ⋯ ⋯ ⋯ | 39 | 41 |
| | 75 | 43 | 45 | 47 | 49 | 51 | 53 | 55 | 57 | 59 | 61 | 63 | ⋯ ⋯ ⋯ | 36 | 38 |
| | ⋯ | ⋯ | ⋯ | ⋯ | ⋯ | ⋯ | ⋯ | ⋯ | ⋯ | ⋯ | ⋯ | ⋯ | ⋯ ⋯ ⋯ | ⋯ | ⋯ |
| | 134 | 0 | 3 | 6 | 9 | 12 | 15 | 18 | 21 | 24 | 27 | 30 | ⋯ ⋯ ⋯ | 23 | 26 |
| | 135 | 29 | 32 | 35 | 38 | 41 | 44 | 47 | 50 | 53 | 56 | 59 | ⋯ ⋯ ⋯ | 52 | 55 |
| | 136 | 58 | 61 | 64 | 0 | 3 | 6 | 9 | 12 | 15 | 18 | 21 | ⋯ ⋯ ⋯ | 14 | 17 |
| | 137 | 20 | 23 | 26 | 29 | 32 | 35 | 38 | 41 | 44 | 47 | 50 | ⋯ ⋯ ⋯ | 43 | 46 |
| | 138 | 49 | 52 | 55 | 58 | 61 | 64 | 0 | 3 | 6 | 9 | 12 | ⋯ ⋯ ⋯ | 5 | 8 |
| | 139 | 11 | 14 | 17 | 20 | 23 | 26 | 29 | 32 | 35 | 38 | 41 | ⋯ ⋯ ⋯ | 34 | 37 |
| | 140 | 40 | 43 | 46 | 49 | 52 | 55 | 58 | 61 | 64 | 0 | 3 | ⋯ ⋯ ⋯ | 63 | 66 |
| | ⋯ | ⋯ | ⋯ | ⋯ | ⋯ | ⋯ | ⋯ | ⋯ | ⋯ | ⋯ | ⋯ | ⋯ | ⋯ ⋯ ⋯ | ⋯ | ⋯ |

Rows 0–8: INDEX INTERVAL = 1
Rows 67–75: INDEX INTERVAL = 2
Rows 134–140: INDEX INTERVAL = 3

PAGE NUMBER / FRAME OFFSET NUMBER

IN CASE OF 4 KB

FIG. 40

IN CASE OF 8 KB

FIG. 41

IN CASE OF 16 KB

FIG. 44

SCRAMBLING VALUE = 0
[000]

PAGE NUMBER / FRAME OFFSET NUMBER

| PAGE NUMBER | 0 | 1 | 2 | 3... | |
|---|---|---|---|---|---|
| 0 | | | | | NON-INVERSION |
| 1 | | | | | NON-INVERSION |
| 2 | | | | | NON-INVERSION |
| 3 | | | | | NON-INVERSION |
| 4 | | | | | NON-INVERSION |
| 5 | | | | | NON-INVERSION |
| ... | | | | | ... |

FIG. 45

SCRAMBLING VALUE = 1
[001]

| PAGE NUMBER | 0 | 1 | 2 | 3... | |
|---|---|---|---|---|---|
| 0 | | | | | INVERSION |
| 1 | | | | | NON-INVERSION |
| 2 | | | | | NON-INVERSION |
| 3 | | | | | INVERSION |
| 4 | | | | | NON-INVERSION |
| 5 | | | | | NON-INVERSION |
| ... | | | | | ... |

FIG. 46

SCRAMBLING VALUE = 2
[002]

| PAGE NUMBER | 0 | 1 | 2 | 3... | |
|---|---|---|---|---|---|
| 0 | | | | | NON-INVERSION |
| 1 | | | | | INVERSION |
| 2 | | | | | NON-INVERSION |
| 3 | | | | | NON-INVERSION |
| 4 | | | | | INVERSION |
| 5 | | | | | NON-INVERSION |
| ... | | | | | ... |

FIG. 47

SCRAMBLING VALUE = 3
[003]

| PAGE NUMBER | FRAME OFFSET NUMBER 0 | 1 | 2 | 3... | |
|---|---|---|---|---|---|
| 0 | | | | | INVERSION |
| 1 | | | | | INVERSION |
| 2 | | | | | NON-INVERSION |
| 3 | | | | | INVERSION |
| 4 | | | | | INVERSION |
| 5 | | | | | NON-INVERSION |
| ... | | | | | ... |

FIG. 48

SCRAMBLING VALUE = 4
[004]

| PAGE NUMBER | FRAME OFFSET NUMBER 0 | 1 | 2 | 3... | |
|---|---|---|---|---|---|
| 0 | | | | | NON-INVERSION |
| 1 | | | | | NON-INVERSION |
| 2 | | | | | INVERSION |
| 3 | | | | | NON-INVERSION |
| 4 | | | | | NON-INVERSION |
| 5 | | | | | INVERSION |
| ... | | | | | ... |

FIG. 49

SCRAMBLING VALUE = 5
[005]

| PAGE NUMBER | FRAME OFFSET NUMBER 0 | 1 | 2 | 3... | |
|---|---|---|---|---|---|
| 0 | | | | | INVERSION |
| 1 | | | | | NON-INVERSION |
| 2 | | | | | INVERSION |
| 3 | | | | | INVERSION |
| 4 | | | | | NON-INVERSION |
| 5 | | | | | INVERSION |
| ... | | | | | ... |

FIG. 50

SCRAMBLING VALUE = 6
[0 0 3]

| PAGE NUMBER | FRAME OFFSET NUMBER | | | | |
|---|---|---|---|---|---|
| | 0 | 1 | 2 | 3··· | |
| 0 | | | | | NON-INVERSION |
| 1 | | | | | INVERSION |
| 2 | | | | | INVERSION |
| 3 | | | | | NON-INVERSION |
| 4 | | | | | INVERSION |
| 5 | | | | | INVERSION |
| ··· | | | | | ··· |

FIG. 51

SCRAMBLING VALUE = 7
[0 0 4]

| PAGE NUMBER | FRAME OFFSET NUMBER | | | | |
|---|---|---|---|---|---|
| | 0 | 1 | 2 | 3··· | |
| 0 | | | | | INVERSION |
| 1 | | | | | INVERSION |
| 2 | | | | | INVERSION |
| 3 | | | | | INVERSION |
| 4 | | | | | INVERSION |
| 5 | | | | | INVERSION |
| ··· | | | | | ··· |

| SCRAMBLING VALUE | 0 | 1 | 2 | 3 | 4 | 5 | 6 | 7 |
|---|---|---|---|---|---|---|---|---|
| LEVEL OF NAND CELL | G | F | Er | E | B | C | A | D |
| | F | G | E | Er | C | B | D | A |
| | E | Er | F | G | D | A | C | B |
| | D | A | C | B | E | Er | F | G |
| | C | B | D | A | F | G | E | Er |
| | B | C | A | D | G | F | Er | E |
| | A | D | B | C | Er | E | G | F |
| | Er | E | G | F | A | D | B | C |

RANDOMIZATION OF DATA USING A PLURALITY OF TYPES OF PSEUDORANDOM NUMBER GENERATORS

CROSS-REFERENCE TO RELATED APPLICATION

This application is a continuation of U.S. patent application Ser. No. 15/448,558, filed Mar. 2, 2017, which application is based upon and claims the benefit of priority from Japanese Patent Application No. 2016-180509, filed Sep. 15, 2016, the entire contents of which are incorporated herein by reference.

FIELD

Embodiments described herein relate generally to a randomizer and a semiconductor storage device having the same.

BACKGROUND

In a nonvolatile memory such as a NAND flash memory (hereinafter, referred to as a NAND memory), user data to be written are scrambled into a random sequence and then written into a memory cell in order to improve reliability of the data when the data are read from a memory cell. At this point, if randomness of a random sequence is not sufficient, an error rate at the time of reading data may be increased.

DESCRIPTION OF THE DRAWINGS

FIG. 8 illustrates a correspondence among an index, a page number, and a frame offset number in the first embodiment.

FIG. 9 illustrates a structure of a seed table according to the first embodiment.

FIG. 35 illustrates sequence of an operation of a seed selection circuit according to the twelfth embodiment.

FIG. 36 illustrates a seed selection method used by the seed selection circuit in the twelfth embodiment in the case of a frame size of 512 bytes.

FIG. 37 illustrates a seed selection method used by the seed selection circuit in the twelfth embodiment in the case of a frame size of 1 kilobyte.

FIG. 38 illustrates a seed selection method used by the seed selection circuit in the twelfth embodiment in the case of a frame size of 2 kilobytes.

FIG. 39 illustrates a seed selection method used by the seed selection circuit in the twelfth embodiment in the case of a frame size of 4 kilobytes.

FIG. 40 illustrates a seed selection method used by the seed selection circuit in the twelfth embodiment in the case of a frame size of 8 kilobytes.

FIG. 41 illustrates a seed selection method used by the seed selection circuit in the twelfth embodiment in the case of a frame size of 16 kilobytes.

FIG. 44 illustrates an operating example of an output bit inversion circuit according to the twelfth embodiment in the case of a scrambling value of 0.

FIG. 45 illustrates an operating example of the output bit inversion circuit according to the twelfth embodiment in the case of a scrambling value of 1.

FIG. 46 illustrates an operating example of the output bit inversion circuit according to the twelfth embodiment in the case of a scrambling value of 2.

FIG. 47 illustrates an operating example of the output bit inversion circuit according to the twelfth embodiment in the case of a scrambling value of 3.

FIG. 48 illustrates an operating example of the output bit inversion circuit according to the twelfth embodiment in the case of a scrambling value of 4.

FIG. 49 illustrates an operating example of the output bit inversion circuit according to the twelfth embodiment in the case of a scrambling value of 5.

FIG. 50 illustrates an operating example of the output bit inversion circuit according to the twelfth embodiment in the case of a scrambling value of 6.

FIG. 51 illustrates an operating example of the output bit inversion circuit according to the twelfth embodiment in the case of a scrambling value of 7.

DETAILED DESCRIPTION

Figure 1:
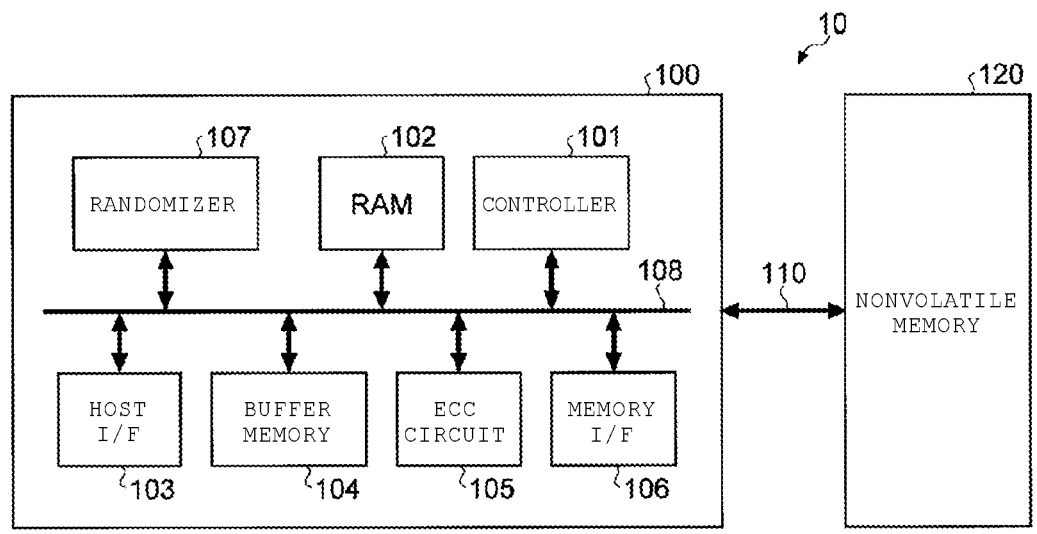
FIG. 1 is a block diagram of a semiconductor storage device (memory system) according to a first embodiment.

An embodiment provides a randomizer and a semiconductor storage device that store data more reliably.

In general, according to an embodiment, a randomizer includes a first pseudorandom number generator, a second pseudorandom number generator, and a first logic circuit configured to output a pseudorandom sequence by carrying out an operation on a pseudorandom sequence generated by the first pseudorandom number generator and a pseudorandom sequence generated by the second pseudorandom number generator, and a second logic circuit configured to randomize a data string input to the randomizer based on the pseudorandom sequence output by the first logic circuit.

Hereinafter, a randomizer and a semiconductor storage device according to embodiments will be described in detail with reference to the appended drawings. The present disclosure is not limited by these embodiments.

First Embodiment

In a nonvolatile memory such as a NAND flash memory (hereinafter, referred to as a NAND memory), particularly in a nonvolatile memory in which multilevel data of two or more bits can be written into one memory cell, a value obtained by a logical operation (for example, exclusive logical sum, addition, or multiplication) of write target data (user data; hereinafter, simply referred to as data) and a random sequence is written into a memory cell in order to improve reliability of data read from a memory cell. At this point, if a property of the random sequence used (randomness) is inappropriate, the error rate at the time of reading data may be increased, or degradation of a memory cell may be accelerated. Consequently, reliability of a product in which the nonvolatile memory is mounted may be decreased. Thus, a randomizer that is mounted in a semiconductor storage device including the nonvolatile memory is required to be capable of generating a random sequence having high randomness.

A randomizer is generally mounted in a memory controller that controls write/read on the nonvolatile memory. Recently, the speed of a memory interface (I/F) that executes write/read on the nonvolatile memory is increased, and accordingly, the randomizer as well is required to operate at a high speed. One measure for such a requirement is to implement the randomizer using dedicated hardware.

In a read operation on the nonvolatile memory, reading from discontinuous addresses may be required. In order to deal with such a case, the randomizer mounted in the memory controller retains a random number seed corresponding to a specified address in a table. The random number seed table has the following constraints.

(1) In the case of access according to a continuous address pattern, to an address for which a positive seed is not defined, if the number of types of seeds is small, a random sequence is required to be generated by using the difference between an address for which a positive seed is defined and an address for which a positive seed is not defined. However, in such a case, the latency of access is increased, and thus a necessary and sufficient number of types of seeds are required.

(2) For that reason, the size of the seed table is required to be approximately the same as the value obtained by dividing the size of an erase block (typically 6 megabytes (MB)), which is the unit of data erase on the nonvolatile memory, by the size of the unit of data write (typically 4 kilobytes (kB)) or to be approximately the same as the square root of the value.

(3) If seeds for generating random numbers overlap between different frames, correlation (abnormal value) arises in random testing. A sufficient number of types (number) of seeds is required to be secured in order to prevent overlapping of seeds. However, in such a case, the size of the seed table is increased.

(4) A pseudorandom number generator having a long cycle obtains a good testing result from random number testing in the case of generating a long pseudorandom sequence but not necessarily obtains a good testing result according to types of testing in the case of generating a short pseudorandom sequence since the same random sequence appears a plurality of times.

Considering these issues, in the following embodiments, in order to secure reliability of data read from the nonvolatile memory, write target data are scrambled by using a new pseudorandom sequence that is obtained by a logical operation (in the following description, the logical operation will be an exclusive logical sum (XOR) for clarification) of a plurality of pseudorandom sequences.

If pseudorandom sequences for scrambling data have regularity, the regularity may match a pattern that decreases reliability of the nonvolatile memory. In such a case, reliability of data read from the nonvolatile memory may be decreased or degradation of a memory cell may be accelerated. In the following embodiments, quality of a pseudorandom sequence used in scrambling is improved by using a technique described below.

FIG. 1 is a block diagram of a semiconductor storage device (memory system) according to a first embodiment. As illustrated in FIG. 1, a semiconductor storage device 10 includes a memory controller 100 and a nonvolatile memory 120 that are connected by a memory bus 110.

The nonvolatile memory 120 is a semiconductor memory that can store data in a nonvolatile manner, for example, a NAND flash memory (hereinafter, simply referred to as a NAND memory). Data writes and reads are performed in units of a page in the NAND memory. Data are erased in units of a block in the NAND memory. In the case of using the NAND memory in the nonvolatile memory 120, a memory cell of the NAND memory may be a single-level cell that is controlled to store one bit, or may be a multi-level cell that is controlled to store two bits or more.

The memory controller 100 is a controller that controls writes/reads of data on a memory in response to a request from a host, which is an external apparatus such as a personal computer or a portable terminal. As illustrated in FIG. 1, the memory controller 100 includes a controller 101, a random access memory (RAM) 102, a host interface (host I/F) 103, a buffer memory 104, an error check and correction (ECC) circuit 105, a memory interface (memory I/F) 106, and a randomizer 107, which are connected to one another via an internal bus 108.

The host I/F 103 outputs a command or user data (write data) received from the host to the internal bus 108. The host I/F 103 sends user data (read data) read from the nonvolatile memory 120, a response from the controller 101, or the like to the host.

The memory I/F 106, on the basis of an instruction from the controller 101, controls a process of writing user data or the like into the nonvolatile memory 120 and a process of reading user data or the like from the nonvolatile memory 120.

The controller 101 controls the entirety of the semiconductor storage device 10. The controller 101 may be, for example, a central processing unit (CPU) or a microprocessing unit (MPU). The controller 101, in accordance with a command from the host via the host I/F 103, controls each unit in accordance with the command. For example, the controller 101, in accordance with a command from the host, instructs the memory I/F 106 to write user data into the nonvolatile memory 120. In addition, the controller 101, in accordance with a command from the host, instructs the memory I/F 106 to read user data from the nonvolatile memory 120.

User data that are received as write data from the host through the host I/F 103 are temporarily stored in the buffer memory 104. The controller 101 determines a memory region of the nonvolatile memory 120 for the user data in the buffer memory 104 and instructs the memory I/F 106 to write the user data into the determined memory region. The controller 101, in accordance with a read command from the host, instructs the memory I/F 106 to read user data from an address included in the read command. The user data that are read from the nonvolatile memory 120 are temporarily stored in the buffer memory 104 and then sent to the host via the host I/F 103.

A volatile memory such as a static random access memory (SRAM) or a dynamic random access memory (DRAM) can be used as the buffer memory 104, which temporarily stores user data or the like at the time of writing/reading on the nonvolatile memory 120.

The ECC circuit 105 is, for example, a coding/decoding circuit that includes an error correction function, and codes user data to be written into the nonvolatile memory 120, into an error correction code such as a BCH code, and obtains original user data by decoding coded user data read from the nonvolatile memory 120.

The randomizer 107 randomizes a predetermined size of user data that are to be written into the same page of the nonvolatile memory 120, and sends the randomized user data to the ECC circuit 105. The ECC circuit 105 codes the randomized user data. A predetermined size of user data that are read from the same page of the nonvolatile memory 120 are decoded by the ECC circuit 105 and then sent to the randomizer 107. The randomizer 107 reverses randomization of the randomized user data to restore original user data.

Figure 2:
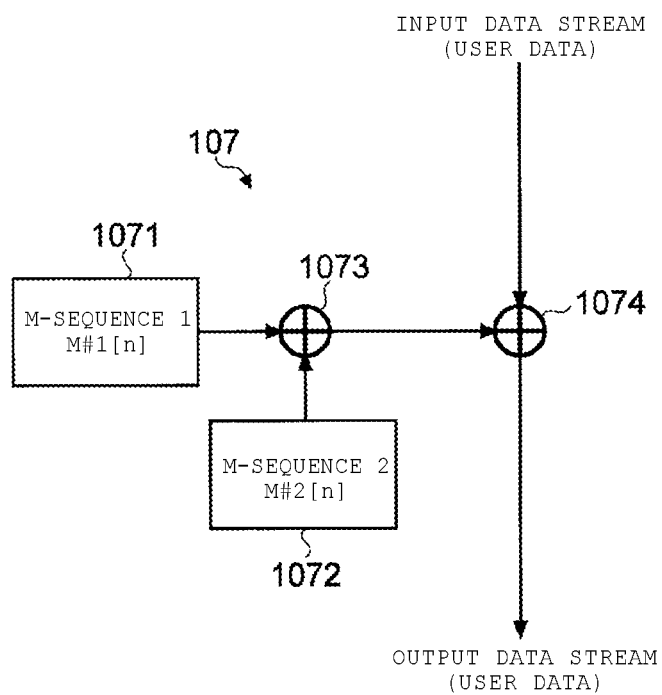
FIG. 2 is a block diagram of a randomizer according to the first embodiment.

Next, the randomizer 107 in FIG. 1 will be described in detail below with reference to the drawings. FIG. 2 is a block diagram of a randomizer according to the first embodiment. As illustrated in FIG. 2, the randomizer 107 includes two pseudorandom number generators 1071 and 1072 and two XOR circuits of an XOR circuit (more generally, a logic circuit) 1073 and an XOR circuit (scrambling circuit) 1074.

The two pseudorandom number generators 1071 and 1072 are random number generators that can generate a pseudorandom sequence, and are pseudorandom number generators that have different properties. Having different properties may mean having different stochasticity or regularity such as having different cycles if the pseudorandom number generators 1071 and 1072 are M-sequence pseudorandom number generators. One of the two pseudorandom number generators 1071 and 1072 can be an M-sequence pseudorandom number generator, and the other can be a non M-sequence pseudorandom number generator.

In the case of the pseudorandom number generators 1071 and 1072 being the same M-sequence pseudorandom number generators, shift additivity maintains randomness of a generated data sequence to be the same as randomness of an original M-sequence. Therefore, as illustrated in FIG. 2, calculating an exclusive logical sum of pseudorandom sequences output from the pseudorandom number generators 1071 and 1072 of different properties breaks shift additivity of an M-sequence and generates a new random sequence. Thereby, generation of regularity, bias in random numbers, or the like can be reduced in a non-focused dimension.

Figure 3:
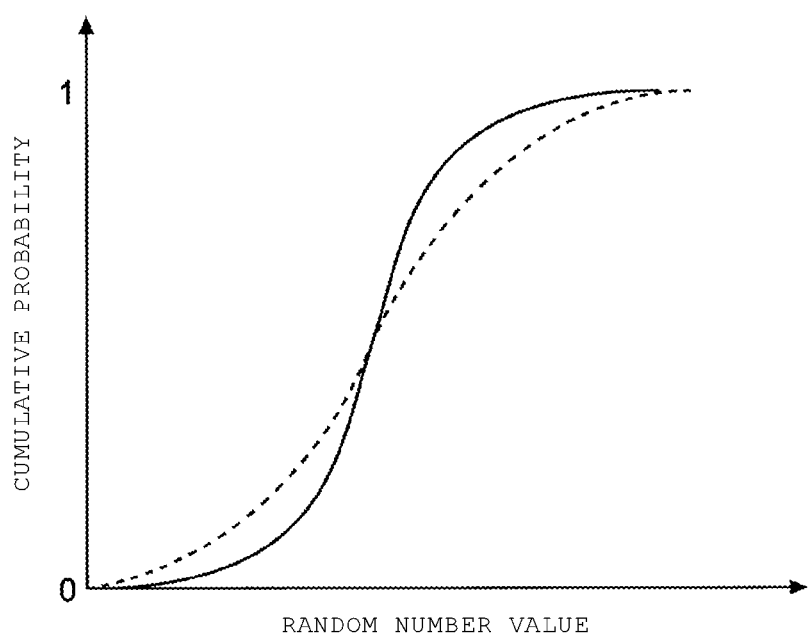
FIG. 3 illustrates a probability distribution of pseudorandom sequences generated by a single pseudorandom number generator and a probability distribution of random sequences in the case of calculating an exclusive logical sum of pseudorandom sequences generated by two pseudorandom number generators.

FIG. 3 illustrates a probability distribution (cumulative probability distribution; CDF) of a pseudorandom sequence generated by a single pseudorandom number generator and a probability distribution (cumulative probability distribution; CDF) of a random sequence in the case of calculating an exclusive logical sum of pseudorandom sequences generated by two pseudorandom number generators. As illustrated in FIG. 3, the cumulative probability distribution of a random sequence in the case of calculating an exclusive logical sum of pseudorandom sequences generated by two pseudorandom number generators has a steeper inclination than the cumulative probability distribution of a pseudorandom sequence generated by a single pseudorandom number generator. This indicates that a random sequence having higher randomness with regularity, bias in random numbers, or the like excluded is generated in the case of calculating an exclusive logical sum of pseudorandom sequences generated by two pseudorandom number generators.

In addition, generating a new random sequence by breaking shift additivity of an M-sequence can reduce influence of specifications of the nonvolatile memory 120 (for example, specifications of NAND in the NAND memory) to the minimum. As a result, the randomizer 107 that can be used regardless of generations of the nonvolatile memory 120 can be realized. That is, even if specifications of the nonvolatile memory 120 are changed, the randomizer 107 can be used as is without changing the design thereof. Consequently, load exerted on a cell constituting the nonvolatile memory 120 can be reduced, and an increase in cost or an effort, the amount of time, or the like required for redesign due to a change in design can be reduced.

Figure 4:
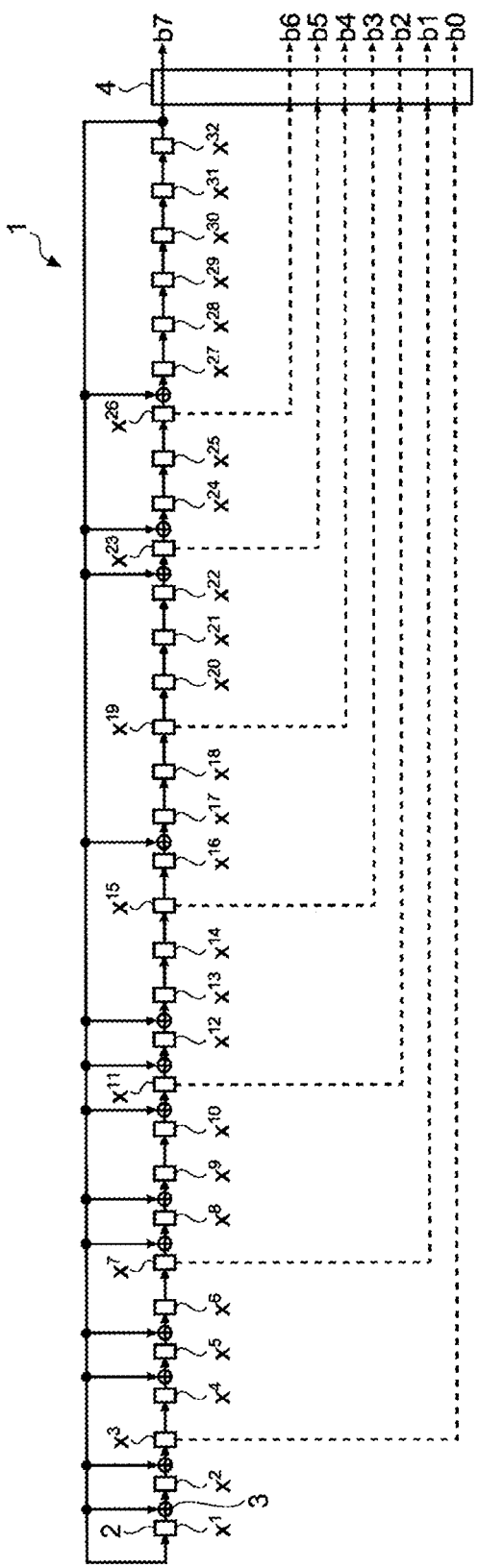
FIG. 4 illustrates an M-sequence linear feedback shift register that can be applied to a pseudorandom number generator according to the first embodiment.

Next, FIG. 4 illustrates one example of an M-sequence linear feedback shift register (LFSR) that can be applied to the pseudorandom number generator 1071 and/or 1072. A linear feedback shift register 1 illustrated in FIG. 4 is an M-sequence pseudorandom number generation circuit and is specifically a division circuit that uses a 32nd-degree polynomial used in CRC-32. While FIG. 4 illustrates a linear feedback shift register that represents the remainder of division with the 32nd-degree primitive polynomial as a random number, the present disclosure is not limited thereto. A linear feedback shift register that represents the remainder of division with a d-th (d is an integer greater than or equal to 2) degree primitive polynomial as a random number can be used. In addition, a part or the entirety of the linear feedback shift register 1 illustrated in FIG. 4 can be configured by hardware, or apart or the entirety thereof can be configured by firmware.

As illustrated in FIG. 4, the linear feedback shift register 1 includes 32 registers 2 of X' to $X^{32}$ and 13 XOR operation units 3. A flip-flop circuit, for example, is used in each register 2. The linear feedback shift register 1 that includes such a configuration outputs, as a pseudorandom sequence, the remainder of division with a 32nd-degree primitive polynomial M(X) represented by a formula (1) below. The cycle of the output pseudorandom sequence is $2^{32}-1$.

$$M(X)=X^{32}+X^{26}+X^{23}+X^{22}+X^{16}+X^{12}+X^{11}+X^{10}+X^{8}+X^{7}+X^{5}+X^{4}+X^{2}+X^{1}+1 \qquad (1)$$

The 32 registers 2 configuring the linear feedback shift register 1 respectively correspond to the 1st-degree term $X^1$ to the 32nd-degree term $X^{32}$ of the primitive polynomial M(X). The XOR operation units 3 are respectively disposed in the rear stages of the registers 2 that correspond to the terms $X^1, X^2, X^4, X^5, X^7, X^8, X^{10}, X^{11}, X^{12}, X^{16}, X^{22}, X^{23}$, and $X^{26}$ of the terms of the primitive polynomial M(X) having a coefficient of 1 other than the last-stage term $X^{32}$. Each XOR operation unit 3 calculates XOR of a register output b7 of the last-stage register 2 of the 32 registers 2 and the register output of the register 2 in the stage before the XOR operation unit 3 and outputs the result to the register 2 in the rear stage thereof. As a result, in the linear feedback shift register 1 illustrated in FIG. 4, the result of an XOR operation for each of the thirteen terms $X^1, X^2, X^4, X^5, X^7, X^8, X^{10}, X^{11}, X^{12}, X^{16}, X^{22}, X^{23}$, and $X^{26}$ of the primitive polynomial M(X) having a coefficient of 1 is generated in each one cycle.

A random number output unit 4 is disposed in the linear feedback shift register 1. The random number output unit 4 outputs, as a pseudorandom sequence, k (k is an integer greater than or equal to 1 and less than or equal to 12) of the 13 XOR operation results generated on a feedback loop of the linear feedback shift register 1. FIG. 4 illustrates an example in which, as a pseudorandom sequence, register outputs b0 to b7 of total eight bits in one cycle from seven (k=7) registers 2 corresponding to the terms $X^3, X^7, X^{11}, X^{15}, X^{19}, X^{23}$, and $X^{26}$ of the primitive polynomial M(X) in addition to the last-stage register 2 corresponding to the term $X^{32}$.

The XOR operation result of the term $X^{12}$, for example, is shifted in each one cycle in the order of term $X^{13}$→term $X^{14}$→term $X^{15}$→term $X^{16}$. However, the shifting does not change the XOR operation result of the term $X^{12}$. For that reason, the XOR operation result of the term $X^{12}$ can be taken from any term of the terms $X^{13}, X^{14}, X^{15}$, and $X^{16}$.

Though FIG. 4 illustrates a configuration of taking the register outputs b0 to b7 from each of the terms $X^3, X^7, X^{11}, X^{15}, X^{19}, X^{23}, X^{26}$, and $X^{32}$ in order to obtain a pseudorandom sequence of eight bits, the present disclosure is not limited to this configuration. Any 7 terms of the 13 terms $X^1, X^2, X^4, X^5, X^7, X^8, X^{10}, X^{11}, X^{12}, X^{16}, X^{22}, X^{23}$, and $X^{26}$ may be selected for, for example, the other register outputs b0 to b6 except for the register output b7.

A seed as an initial value is set in each register 2 in the case of generating a pseudorandom sequence using the linear feedback shift register 1 illustrated in FIG. 4. The value of each register 2 is shifted by one at a time to the next stage in each one cycle. At this point, taking the XOR operation result of each XOR operation unit 3 as a pseudorandom number allows a plurality of pseudorandom sequences to be taken from the linear feedback shift register 1 while maintaining randomness.

In the case of using a NAND memory as the nonvolatile memory 120, the degree d of the linear feedback shift register 1 is preferably determined in such a manner that a cycle Y of a pseudorandom sequence generated by the linear feedback shift register 1 is greater than a block size S of the NAND memory. Since data written into the same block of the NAND memory can be prevented from having periodicity, inter-cell interference in the same block of the NAND memory can be reduced. Consequently, reliability of the NAND memory is improved.

Figure 5:
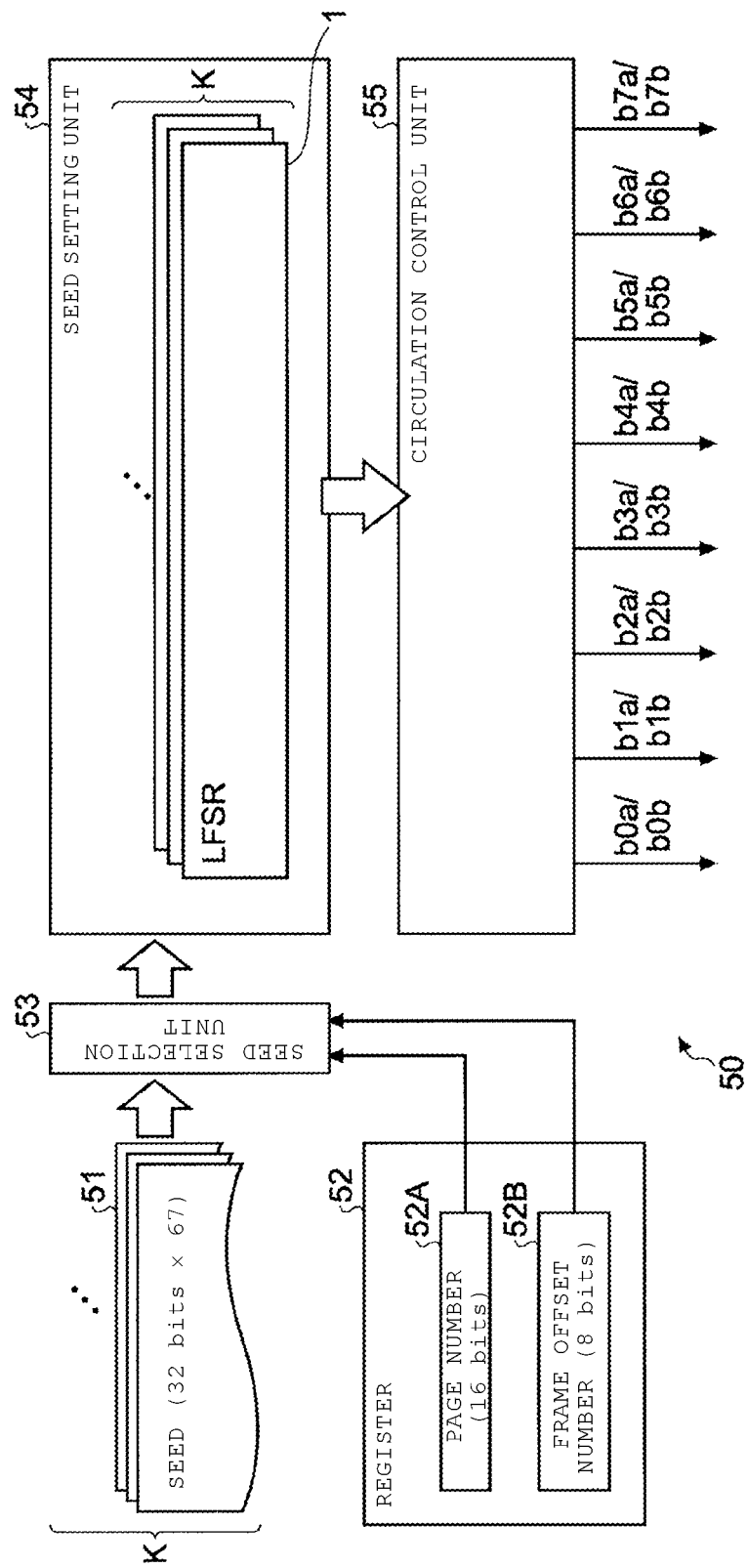
FIG. 5 illustrates a random number generator in which the linear feedback shift register illustrated in FIG. 4 is used.

FIG. 5 illustrates a schematic configuration example of a random number generator in which the linear feedback shift register 1 illustrated in FIG. 4 is used. A pseudorandom number generator 50 illustrated in FIG. 5 is a random number generator that is used as the pseudorandom number generator 1071 or 1072 in FIG. 2.

As illustrated in FIG. 5, the pseudorandom number generator 50 includes a seed table 51, a register 52, a seed selection unit 53, a seed setting unit 54, and a circulation control unit 55.

The pseudorandom number generator 50 stores, for example, K (K is an integer greater than or equal to 2) seed tables 51. 67 seeds of 32 bits, for example, are registered in each seed table 51. An index I is associated with each seed.

The index I is a number specifying a seed in the seed table 51. The number of seeds registered in each seed table 51 (67 in the present example) is preferably a prime number so that a correlation between the number of seeds and physical arrangement of memory cells is not easily obtained, as described below.

The register 52 retains a page number 52A and a frame offset number 52B of the nonvolatile memory 120. A page is the unit of writes or the unit of reads on the nonvolatile memory 120. A frame is the unit of processing of the ECC circuit 105 (hereinafter, referred to as an ECC unit).

The seed selection unit 53 obtains the index I on the basis of the page number 52A and the frame offset number 52B and selects a seed assigned to the index I from the seed table 51.

The seed setting unit 54 takes a seed to be used from the seed table 51 and sets the taken seed in the linear feedback shift register 1. The pseudorandom number generator 50 can include K linear feedback shift registers 1. In this case, the seed setting unit 54 takes a seed from the seed table 51 and sets the taken seed in each of the K linear feedback shift registers 1.

The linear feedback shift register 1 generates a pseudorandom sequence on the basis of the set seed and inputs the generated pseudorandom sequence into the circulation control unit 55. The circulation control unit 55 circulates the value of the linear feedback shift register 1 by one bit at a time in each one cycle. Consequently, a pseudorandom sequence of eight bits is output from the circulation control unit 55. In FIG. 5, the 8-bit register outputs of the pseudorandom number generator 1071 are b0a to b7a, and the 8-bit register outputs of the pseudorandom number generator 1072 are b0b to b7b for convenience of description.

Figure 6:
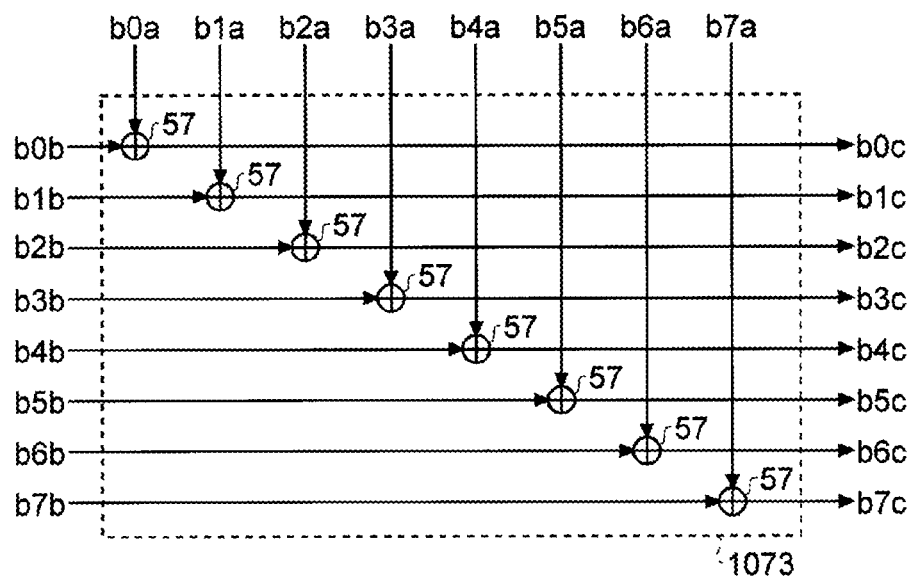
FIG. 6 illustrates an XOR circuit according to the first embodiment.

The 8-bit pseudorandom sequences that are respectively output from the pseudorandom number generators 1071 and 1072 are input into the XOR circuit 1073 illustrated in FIG. 2. FIG. 6 illustrates a schematic configuration example of the XOR circuit 1073. As illustrated in FIG. 6, the XOR circuit 1073 includes eight XOR operation circuits 57 that respectively correspond to combinations of the 8-bit register outputs b0a to b7a and b0b to b7b of the pseudorandom number generators 1071 and 1072. Each XOR operation circuit 57 calculates XOR of two corresponding bit values of the input two pseudorandom sequences and outputs the result of the operation. That is, a pseudorandom sequence of eight bits is output from the XOR circuit 1073. The 8-bit outputs of the XOR circuit 1073 are b0c to b7c for convenience of description.

Figure 7:
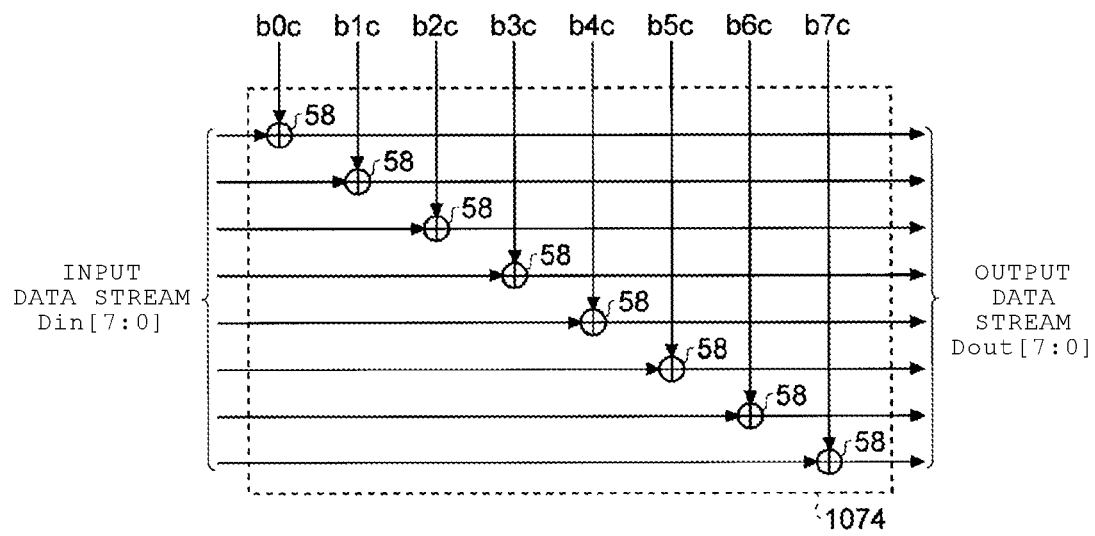
FIG. 7 illustrates an XOR circuit (scrambling circuit) according to the first embodiment.

The pseudorandom sequence output from the XOR circuit 1073 is input into the XOR circuit 1074. An input data stream Din[7:0] of eight bits that is to be written/read on the nonvolatile memory 120 is also input into the XOR circuit 1074. FIG. 7 illustrates a schematic configuration example of the XOR circuit 1074. As illustrated in FIG. 7, the XOR circuit 1074, in the same manner as the XOR circuit 1073 illustrated in FIG. 6, includes eight XOR operation circuits 58 that respectively correspond to combinations of the 8-bit outputs b0c to b7c of the XOR circuit 1073 and the 8-bit input data stream Din[7:0]. According to such a configuration, the XOR circuit 1074 can randomize the input data stream Din[7:0] on the basis of the outputs b0c to b7c of the XOR circuit 1073.

In the case of randomizing the input data stream Din[7:0], the page number 52A and the frame offset number 52B of the input data stream Din[7:0] are stored in the register 52 illustrated in FIG. 5. Then, the index I is calculated on the basis of the page number 52A and the frame offset number 52B. Then, a seed is selected from the seed table 51 by using the index I as a key and is set in the linear feedback shift register 1.

Given that the index I is Index, the page number 52A is shiftnum, the frame offset number 52B is offset, and the number of ECC units per 1 page is frame max, a relationship thereamong can be given by, for example, a formula (2) below. FIG. 8 illustrates one example of a correspondence among the index I (Index) specified by the formula (2), the page number 52A (shiftnum), and the frame offset number 52B (offset). The number of seeds is 67 in FIG. 8. The ECC frame size is 1 kB, and the page size is 16 kB. Thus, the number of ECC frames that can be written into one page (the number of ECC units per page (frame max)) is 16. Therefore, in FIG. 8, the frame offset number 52B may have a value of 0 to 15.

$$\text{Index} = \text{shiftnum} \times \text{frame max} + \text{offset} \tag{2}$$

For example, in the case of the frame offset number 52B (offset) being equal to 8 and the page number 52A (shiftnum) being equal to 13, the index I (Index) is obtained as 15 from the above formula (2) as illustrated in FIG. 8. In the case of a memory cell of the nonvolatile memory 120 being a 3-bit triple level cell (TLC), three page units are converted into one word line in TLC. Thus, the corresponding location in the nonvolatile memory 120 corresponds to five word lines (middle layer).

When the seed selected from the seed table 51 in each of the pseudorandom number generators 1071 and 1072 is set in the linear feedback shift register 1, the value of the linear feedback shift register 1 is circulated by one bit at a time in accordance with the input cycle of the input data stream Din[7:0], and the register outputs b0 to b7 at that time are input from the linear feedback shift register 1 into the XOR circuit 1073. In the XOR circuit 1073, XOR of the register outputs b0a to b7a of the linear feedback shift register 1 in the pseudorandom number generator 1071 and the register outputs b0b to b7b of the linear feedback shift register 1 in the pseudorandom number generator 1072 is obtained, and thereby a new pseudorandom sequence in which shift additivity of an M-sequence is broken is generated. The generated pseudorandom sequence is input into the XOR circuit 1074 via the outputs b0c to b7c of the XOR circuit 1073.

In the XOR circuit 1074, XOR of each bit of the input data stream Din[7:0] and the outputs b0c to b7c of the XOR circuit 1073 is obtained, and thereby an output data stream Dout [7:0] in which the input data stream Din[7:0] is randomized is generated.

Changing a seed given to the linear feedback shift register 1 on the basis of the page number 52A and the frame offset number 52B allows data to be written into the same memory cell to be changed to another value even in the case of writing the same data into the same memory cell after erasure of the nonvolatile memory 120. As a result, the same value can be prevented from being repeatedly written many times over into the same memory cell of the nonvolatile memory 120, and consequently a decrease in reliability of the semiconductor storage device 10 can be reduced.

Next, an example of a seed table according to the first embodiment will be described in detail below by using the drawings. FIG. 9 illustrates one example of a seed table according to the first embodiment. In FIG. 9, a seed of 32 bits registered in the seed table 51 is represented in hexadecimal. As illustrated in FIG. 9, 67 seeds of 32 bits are registered in the seed table 51. The numbers of bits of seeds at the time of lining up the seeds in an index order preferably have an equal interval.

The index I for specifying each seed is associated with each seed. The number of seeds registered in one seed table 51 (67 in the present example) is a prime number. The number of seeds registered in each seed table 51 being a prime number can prevent the cycle of reappearance of data between pages, between columns, or between layers in the nonvolatile memory 120 from matching the cycle of seeds. As a result, the cycle of data can be rendered different between adjacent pages, between adjacent columns, or between adjacent layers in the nonvolatile memory 120, and consequently interference between cells of the NAND memory can be reduced.

Having an equal interval between the numbers of seeds can increase the minimum interval between the numbers of bits of seeds. For that reason, even in the case of a change in the seed given to the linear feedback shift register 1, the cycle of random numbers generated by the linear feedback shift register 1 can be prevented from overlapping before and after the change in the seed.

Given that the number of seeds settable in the linear feedback shift register 1 is P, the number P preferably satisfies a condition Y/P>S using the cycle Y of pseudorandom sequences generated by the linear feedback shift register 1 and the block size S of the nonvolatile memory 120. For example, in the case of the block size S of the nonvolatile memory 120 being equal to approximately 4 Mbytes to 6 Mbytes and the number P of seeds settable in the linear feedback shift register 1 being equal to 67, Y/P is equal to $(2^{32}-1)/67\approx 8$ Mbytes, and the condition Y/P>S is satisfied. In this case, the cycle of write data in the blocks of the nonvolatile memory 120 can be set to be greater than or equal to the block size S. For that reason, inter-cell interference in the same block of the nonvolatile memory 120 can be reduced.

The number P of seeds is desirably a number that is coprime (does not have a common divisor) to a number characterizing a physical structure and a logical structure of the nonvolatile memory 120 (for example, the number of word lines, the number of layers of bit cost scalable (BiCS), a number of Fingers of BiCS, or the number of ECC frames included in one word line). A prime number does not have a common divisor by definition thereof and thus is not a common multiple of the number of word lines, the number of layers of BiCS, a Finger number, or the like. Using a prime number as the number P of seeds is effective from the viewpoint that randomness of the generated pseudorandom sequence is increased.

The number P of seeds is desirably a number that is approximately the same as the number of word lines. The expression "approximately the same" referred hereto means that the number P is in the range of a difference of one digit with the number of word lines. The reason is that if the number P of seeds is excessively small, the same seed is used multiple times, and consequently a pseudorandom sequence having the same layout appears multiple times, and correlation arises. If the number P of seeds is excessively great, the size of the seed table 51 is increased, and consequently a lot of memory regions are required for storing the seed table 51. Thus, the number P of seeds is preferably a number that is not excessively great.

A general NAND memory used as the nonvolatile memory 120 has a structure in which the NAND structure is characterized by an integral multiple of 2, 4, 8, 16, . . . , or 128 that is a power of 2. If a redundancy unit is added to such a NAND structure, a prime number having a comparatively small value such as 3, 5, or 17 appears in such a manner that 2+1=3, 4+1=5, 8+1=9=3×3, or 16+1=17. For that reason, such a comparatively small prime number is required not to be used as the number P of seeds.

Considering such conditions, the number "67" illustrated above is not a comparatively small prime number and has approximately the same magnitude as, for example, 64 word lines, 86 word lines, or 128 word lines of a floating gate NAND or 48 layers, 64 layers, or 128 layers of BiCS and thus can be said to be a suitable number as the number P of seeds.

Figure 10:
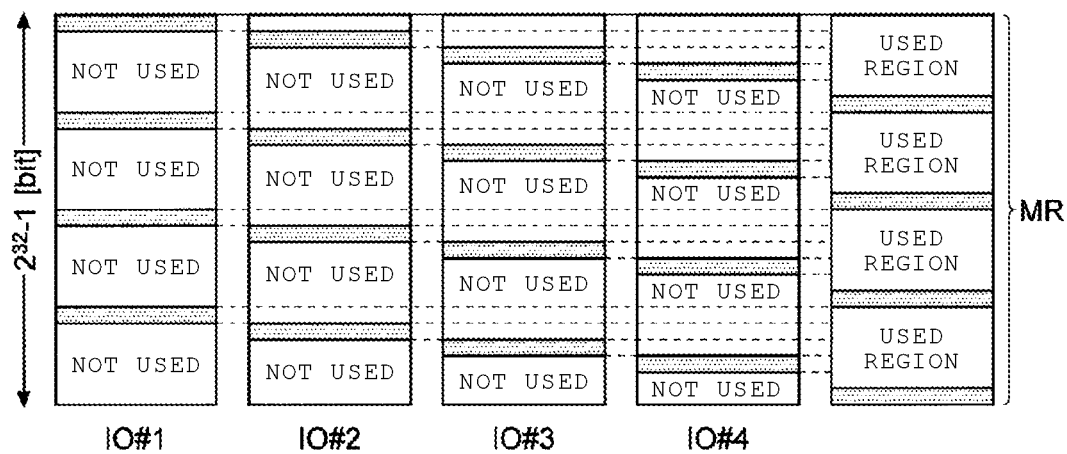
FIG. 10 illustrates an example of a used region in a nonvolatile memory in a case of changing a seed for each input/output in the first embodiment.

Next, a used region in the nonvolatile memory 120 in the case of changing a seed for each input/output will be described. FIG. 10 illustrates one example of a used region in a nonvolatile memory in the case of changing a seed for each input/output. In FIG. 10, a memory region MR having a capacity of less than or equal to the cycle $Y=2^{32}-1$ of the linear feedback shift register 1 is disposed in the nonvolatile memory 120. A used region and a non-used region may exist in the memory region MR. The number N of seed tables 51 and linear feedback shift registers 1 are four. In this case, the four seed tables 51 can be individually defined for each of input/outputs IO #1, IO #2, IO #3, and IO #4 of the memory region MR. The four seed tables 51 are respectively associated with the four linear feedback shift registers 1.

In a write operation on the nonvolatile memory 120, four seeds are selected from individual seed tables 51 for each of the input/outputs IO #1, IO #2, IO #3, and IO #4, and these four seeds are input to the four linear feedback shift registers 1. Such an operation randomizes four input data streams Din[7:0] per cycle.

Individually defining the seed tables 51 for each of the input/outputs IO #1, IO #2, IO #3, and IO #4 allows the longest cycle of the linear feedback shift register 1 to be efficiently used even in the case of a non-used region existing in each of the input/outputs IO #1, IO #2, IO #3, and IO #4. Consequently, randomness of the output data Dout [7:0] can be improved.

According to the first embodiment, with the above configuration and operation, a new random sequence is generated by breaking shift additivity of an M-sequence. Thus, generation of regularity, bias in random numbers, or the like can be reduced in a non-focused dimension. Consequently, a pseudorandom sequence having high randomness can be generated, and inter-cell interference in the same block of the nonvolatile memory 120 can be reduced. Also, reliability of the NAND memory can be improved.

In addition, generating a new random sequence by breaking shift additivity of an M-sequence can reduce influence of specifications of the nonvolatile memory 120 (for example, specifications of NAND in the NAND memory) to the minimum. For that reason, the randomizer 107 that can be used regardless of generations of the nonvolatile memory 120 can be realized. That is, even in the case of specifications of the nonvolatile memory 120 being changed, the randomizer 107 can be used as is without changing the design thereof. Consequently, load exerted on a cell constituting the nonvolatile memory 120 can be reduced, and an increase in cost or an effort, the amount of time, or the like required for redesign due to a change in design can be reduced.

Second Embodiment

The first embodiment illustrates the case of generating a new pseudorandom sequence by calculating XOR of two pseudorandom sequences generated by two pseudorandom number generators having different properties. Meanwhile, the second embodiment corresponds to a configuration of generating a pseudorandom sequence by appropriately selecting one or two or more pseudorandom number generators from a plurality of pseudorandom number generators.

Figure 11:
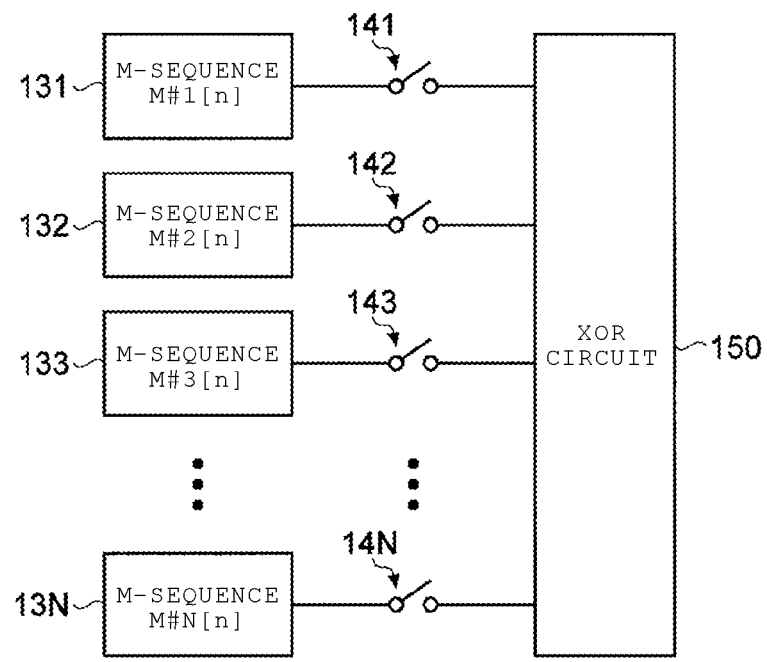
FIG. 11 is a block diagram of a randomizer according to a second embodiment.

FIG. 11 is a block diagram of a randomizer according to the second embodiment. As illustrated in FIG. 11, a randomizer according to the second embodiment includes N (N is an integer greater than or equal to 2) pseudorandom number generators 131 to 13N, an XOR circuit 150 that generates a new pseudorandom sequence by calculating XOR of two or more input pseudorandom sequences, and switch circuits 141 to 14N that switches a connection state between each of the pseudorandom number generators 131 to 13N and the XOR circuit 150 to any of electrical connection/non electrical connection.

Each of the pseudorandom number generators 131 to 13N may be the same as the pseudorandom number generator 1071 or 1072 illustrated in the first embodiment. The pseudorandom number generators 131 to 13N may be pseudorandom number generators having different properties in the same manner as the first embodiment. However, this does not exclude a configuration that two or more pseudorandom number generators have the same property.

The switch circuits 141 to 14N connects any one or two or more of the pseudorandom number generators 131 to 13N to the XOR circuit 150 in accordance with, for example, control by the controller 101 in the memory controller 100.

In the case of receiving two or more pseudorandom sequences due to turning on of two or more of the switch circuits 141 to 14N, the XOR circuit 150 generates a new pseudorandom sequence by calculating XOR of the pseudorandom sequences. In the case of receiving one pseudorandom sequence due to turning on of one of the switch circuits 141 to 14N, the XOR circuit 150 outputs the input pseudorandom sequence as is.

As above, the configuration that can appropriately select pseudorandom number generators to be combined in order to generate a new pseudorandom sequence can flexibly deal with specifications of the nonvolatile memory 120. As a result, a randomizer that can be used regardless of generations of the nonvolatile memory 120 can be realized.

Other configurations, operations, and effects are the same as the first embodiment, and thus duplicate descriptions thereof will not be provided.

Third Embodiment

A randomizer and a semiconductor storage device according to the third embodiment will be illustratively described. The above embodiments illustrate the case of registering a required number (for example, 67) of seeds of 32 bits in the seed table 51. In that case, if the number of seeds is 67, a memory space of 32 bits×67=total 2,144 bits is required in order to retain one seed table 51. In an M-sequence pseudorandom number generator, for example, it is known that randomness can be improved by increasing the number of seeds. However, typically, if the number of seeds is increased, a required memory space is increased. Considering this issue, according to the third embodiment, a randomizer and a semiconductor storage device are directed to using an increased number of seeds without increasing a memory space required for storing a seed table. The third embodiment will be described below in detail with reference to the drawings.

Figure 12:
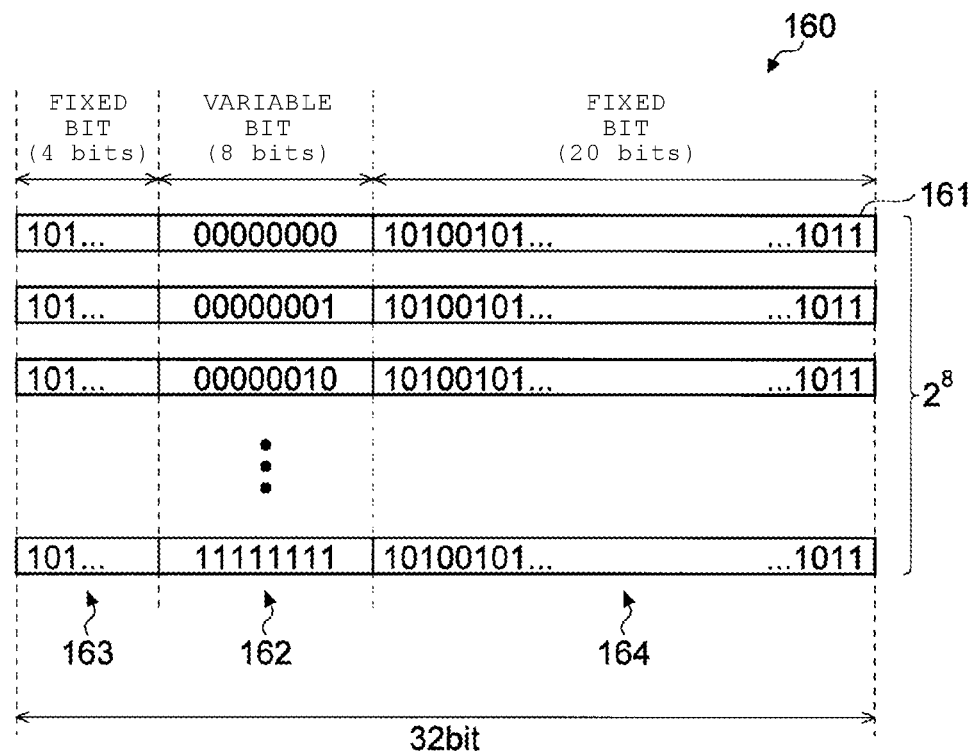
FIG. 12 illustrates a structure of a seed table according to a third embodiment.

FIG. 12 illustrates one example of a seed table according to the third embodiment. As illustrated in FIG. 12, 256 ($=2^8$) seeds 161 of 32 bits are registered in one seed table 160 in the third embodiment.

In each seed 161, bits of a part of 32 bits are defined as variable bits 162, and the remaining bits are defined as fixed bits 163 and 164. In the present example, eight bits of 32 bits are defined as the variable bits 162, and the remaining 24 bits are defined as the fixed bits 163 and 164. The fixed bits 163 and 164 have bit values that are common among the 256 seeds 161 registered in one seed table 160. The variable bit 162 has a bit value that does not have the same value existing among the 256 seeds 161 registered in one seed table 160.

In the case of the variable bits 162 being equal to eight bits, $2^8$, that is, 256, patterns of the bit values of the variable bits 162 exist. In this case, if the distance (cycle) between each seed 161 can be secured to be greater than or equal to a required cycle, degradation of randomness of a generated pseudorandom sequence can be reduced even in the case of using, as the variable bits 162, eight bits which is a part of 32 bits.

Although the variable bits 162 are eight bits in the middle of the seed 161 in the present example, the present disclosure is not limited thereto. For example, two or more continuous bits that include a leading bit of the seed 161 may be variable bits, or two or more continuous bits that include a trailing bit may be variable bits. Although the variable bits 162 are continuous eight bits in the present example, the present disclosure is not limited thereto. For example, two or more discontinuous bits in one seed 161 can be variable bits.

Though the number of seeds 161 registered in one seed table 160 is 256 ($=2^8$) in the present example since the variable bits 162 are eight bits, more seeds 161 can be registered in one seed table 160 by increasing the number of bits of the variable bits 162. For example, in the case of the variable bits 162 being equal to 10 bits, $2^{10}$, that is, 1,024, seeds 161 can be registered in one seed table 160.

Figure 13:
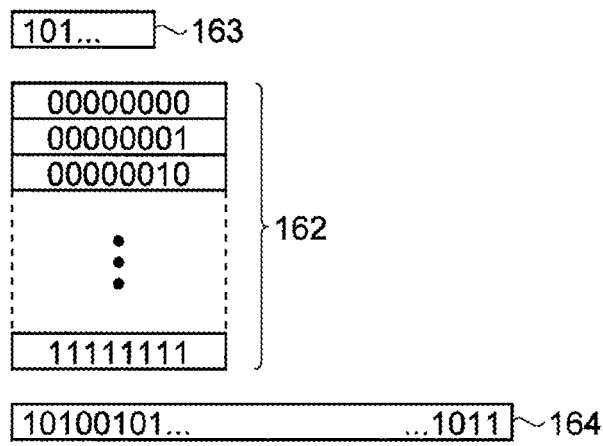
FIG. 13 illustrates a structure of data stored in a memory space that stores the seed table in the third embodiment.

FIG. 13 schematically illustrates an example of data stored in a memory space that stores the seed table in the third embodiment. As illustrated in FIG. 13, in the third embodiment, the fixed bits 163 and 164 are common in all of the seeds 161 registered in one seed table 160. For that reason, duplicate fixed bits 163 and 164 are omitted in a memory space storing the seed table 160. That is, a memory space required for storing one seed table 160 in the third embodiment is total 2,072 bits of 24 bits of the fixed bits 163 and 164 plus $2^8 \times 8$ bits for storing $2^8$ variable bits 162, that is, 2,048 bits. This corresponds to approximately 64 seeds in the case of not disposing the fixed bits 163 and 164 and thus means that a length of one seed table 160 can be extended approximately four times according to the third embodiment.

As above, configuring the same seed 161 not to exist in one seed table 160 by using a part of 32 bits of the seed 161 as the variable bits 162 can increase the number of seeds without increase in a memory space required for storing the seed table 160.

The controller 101 or the like in the memory controller 100 may be capable of appropriately setting any bit in the seed 161 as a variable bit. In this case, the controller 101 determines the required number of seeds according to, for example, a request from the host or specifications of the nonvolatile memory 120, specifies the number of bits required to obtain at least the determined number of non-overlapping bit patterns, selects the specified number of bits from a bit string of a seed randomly or in accordance with a predetermined rule, and generates a non-overlapping bit pattern having the specified number of bits. The generated bit pattern and a bit pattern used as fixed bits are stored in a predetermined memory that stores the seed table 160. A plurality of bit patterns used as variable bits and the bit pattern of fixed bits may be appropriately generated by the controller 101 or the randomizer 107.

While the third embodiment cites the configuration illustrated in the first embodiment, that is, the case of the randomizer 107 including two pseudorandom number generators 1071 and 1072, the present disclosure is not limited to this configuration. That is, the configuration, illustrated in the third embodiment, that uses a part of a seed as fixed bits can be applied to various pseudorandom number generators that use a primitive polynomial (generator polynomial) as above. The same applies to the case of the randomizer 107 including a single pseudorandom number generator.

Other configurations, operations, and effects are the same as the above embodiments, and thus duplicate descriptions thereof will not be provided.

Fourth Embodiment

A randomizer and a semiconductor storage device according to a fourth embodiment will be described in detail with reference to the drawings. In the following description, the same configurations and operations as the above embodiments will be designated by the same reference signs, and duplicate descriptions thereof will not be provided.

A schematic configuration example of the semiconductor storage device according to the fourth embodiment is substantially the same as the configuration described by using FIG. 1 in the first embodiment.

In the fourth embodiment, the following conditions are set to combined pseudorandom number generators in order to generate a new pseudorandom sequence having high randomness by resolving defects of each pseudorandom number generator combined in the randomizer 107.

(A) A long-cycle pseudorandom number generator has a cycle greater than or equal to a-times (a is a number greater than or equal to 1; for example, 100) the size of randomness testing target data.

(B) A short-cycle pseudorandom number generator has a cycle less than or equal to 1/b (b is a number greater than or equal to 1; for example, 8) of the size of randomness testing target data.

The pseudorandom number generator of the article (A) can be used not to generate an overlap in the generated pseudorandom sequence but, according to a seed given to the pseudorandom number generator, may generate a pseudorandom sequence having a locally bad property. In addition, since the length of a required seed is great, the size of a seed table is increased in the case of having multiple seeds.

The pseudorandom number generator of the article (B), in principle, generates an overlap in the generated pseudorandom sequence and thus may have an improper property of a random sequence. Generation of multiple overlaps in the generated pseudorandom sequence also has a characteristic that, when the pseudorandom sequence is considered to be, for example, small data that are divided in units of eight bits, the probability of generation of small data is likely to be closer to a uniform distribution than the pseudorandom number generator of (A).

Considering this issue, according to the fourth embodiment, calculating XOR of a pseudorandom sequence generated by the pseudorandom number generator of (A) and a pseudorandom sequence generated by the pseudorandom number generator of (B) offsets the weak points of both pseudorandom number generators, and a random sequence having a good property is obtained.

In the fourth embodiment, a pseudorandom sequence that is generated by inputting a seed to the pseudorandom number generator of (B) is used as a seed of the pseudorandom number generator of (A). Such a configuration can decrease the length of each seed, and thus the size of a seed table can be decreased.

A CRC-32 random number generator or a 56-bit (or 64-bit) random number generator of a lagged Fibonacci type (hereinafter, simply referred to as a lagged Fibonacci random number generator) that generates a pseudorandom sequence in accordance with a rule described below can be used as the long-cycle random number generator of (A) (referred to as a main random number generator (second pseudorandom number generator)). A CRC-8 or CRC-16 (or CRC-32) pseudorandom number generator can be used as the short-cycle random number generator of (B) (referred to as a sub random number generator (first pseudorandom number generator)). In the fourth embodiment, data having a length greater than or equal to ½ of the entire cycle of the lastly generated pseudorandom sequence are used as write target data on the nonvolatile memory 120. The main random number generator and the sub random number generator in the fourth embodiment correspond to, for example, the two pseudorandom number generators 1071 and 1072 in the first embodiment.

For example, a 64-bit lagged Fibonacci random number generator includes 64 flip-flops and 64 XOR circuits and thus can generate a pseudorandom sequence having $2^{32}$ times a cycle (approximately $4\times10^3$ times) with an approximately twice circuit size. The lagged Fibonacci random number generator has a point that an XOR circuit is used in only one stage between each flip-flop, a point that the number of logical outputs of the output of the flip-flop (fan out) is four including an external output and feedback to the flip-flop, and a point that the number of interconnections between flip-flops is approximately 128 which is twice the number of flip-flops. For these reason, the lagged Fibonacci random number generator is also considered to be configured for hardware implementation.

In the fourth embodiment, a 64-bit lagged Fibonacci random number generator is used in the main random number generator. In the case of configuring the main random number generator with a lagged Fibonacci random number generator, a lagged Fibonacci sequence that is extended from a sequence of n terms to a sequence of 2n terms and generated by a formula (3) (recursive formula) below is used in the rule at the time of generating a pseudorandom sequence, considering hardware implementation.

$$X(i)=\{X(j\text{-}24) \text{ xor } X(j\text{-}55)\} \bmod m \quad (3)$$

Conditions of the above recursive formula (3) include m=2, n>55, 0≤i≤n−1, j=i+n (at the time of i<n), j=i (at the time of i>n+1), and X(j)=X(i).

From the conditions 0≤i≤n−1, j=i+n (at the time of i<n), and j=i (at the time of i>n+1) of the above conditions, n≤j≤2n−1 is established. Furthermore, from the condition m=2, X(i)={0, 1} is established.

A pseudorandom sequence that is generated in the case of using the recursive formula (3) as above has a cycle of $2^{55}-1$. The size of an erase block of a nonvolatile memory to which the pseudorandom sequence is applied is approximately 128 megabytes (Mbytes) ($\approx$1 gigabit (Gbit))=$2^3$. Thus, the cycle of the pseudorandom sequence has a length that is approximately $2^{25}$ times ($\approx(2^{55}-1)/2^{30}$) the size of the erase block of the nonvolatile memory. This cycle has approximately $2^{15}$ ($\approx(2^{55}-1)/2^{40}$ times a length of the block even in the case of the capacity of a nonvolatile memory chip being equal to 1 terabit (Tbit) ($\approx 2^{40}$ bits), and has more than 1,000 ($\approx 2^{10}$) times a length.

While the recursive formula (3) for generating a lagged Fibonacci sequence uses an XOR operation in order to facilitate hardware implementation of the main random number generator in the present description, other logical operations such as addition and multiplication can also be used. In addition, if the amount of hardware is not considered, not only bits {0, 1} of m=2 but also a greater unit, for example, bytes {0000_0000, 0000_0001, 0000_0010, . . . , 1111_1111} of m=8 can be used in the elements of X(i).

Furthermore, a combination of "lags" of lagged Fibonacci in the recursive formula (3) is described as (24, 55) in the present description. In this case, (5, 17), (13, 31), (33, 68), (33, 97), (37, 100), (83, 258), or the like can also be used as another combination of "lags". Using such a combination can generate a pseudorandom sequence by using outputs from elements that can only reach each other via two or more stages of logical operations (XOR). As a result, a pseudorandom sequence having lower correlation can be generated. If a combination of lags is (a, b) (b>a), the cycle thereof is $2^b-1$.

The fourth embodiment has two conditions that a cycle is sufficiently long with respect to the size of a target to which a pseudorandom sequence is applied, and that eight or more bits are used at the same time, and a combination of "lags" is (24, 55) in order to satisfy the conditions. Satisfying these conditions allows easy implementation of a hardware configuration that can output up to the a-th bit at the same time with respect to the combination of lags (a, b), as mentioned below.

The fourth embodiment is illustratively described in the case of using, as the sub random number generator, a pseudorandom number generator in which the linear feedback shift register 1 of a CRC-32 type described by using FIG. 4 in the first embodiment is used.

As described in the first embodiment, the linear feedback shift register 1 illustrated in FIG. 4 is defined by the primitive polynomial M(X) illustrated in the formula (1). In the fourth embodiment, the sub random number generator is configured by using the linear feedback shift register 1, and a 32-bit seed that is defined in advance is input into the sub random number generator, and thereby a 64-bit pseudorandom sequence is generated in a cycle of 8 bits×7. The 64-bit pseudorandom sequence generated in a cycle of 8 bits×7 by the sub random number generator is input as a seed to the 64-bit lagged Fibonacci random number generator, which is the main random number generator.

A seed that is required for generating a pseudorandom sequence in CRC-32 is 32 bits, and a seed that is required by the 64-bit lagged Fibonacci random number generator which is the main random number generator is 64 bits. Thus, using the pseudorandom sequence generated by the sub random number generator of a CRC-32 type as a seed of the 64-bit lagged Fibonacci random number generator which is the main random number generator means that the size of a seed can be reduced to approximately ½ thereof.

The sub random number generator of a CRC-32 type is a 32-bit short-cycle pseudorandom number generator. For that reason, approximately 64 million ($\approx 2^{26}=2^{32}/2^6 \approx (2^{32}-1)/64$) seeds of $2^6$ ($=64\approx 55$) bits can be generated by using the output of the sub random number generator of a CRC-32 in order as a seed of the main random number generator.

Even in the case of lack of a 55-bit seed, a 55-bit seed of another sequence can be generated, in addition to the 32-bit seed input into the sub random number generator, by adjusting the number of times the output given as an offset until an output is taken from the sub random number generator is discarded. As a result, the lack can be resolved.

A seed given to the sub random number generator of a CRC-32 type can be specified by specifying an index i of the seed table 51 having, for example, 67 entries (67 seeds) and a frame offset number with respect to the index i, as described with reference to FIG. 5 in the first embodiment.

Figure 14:
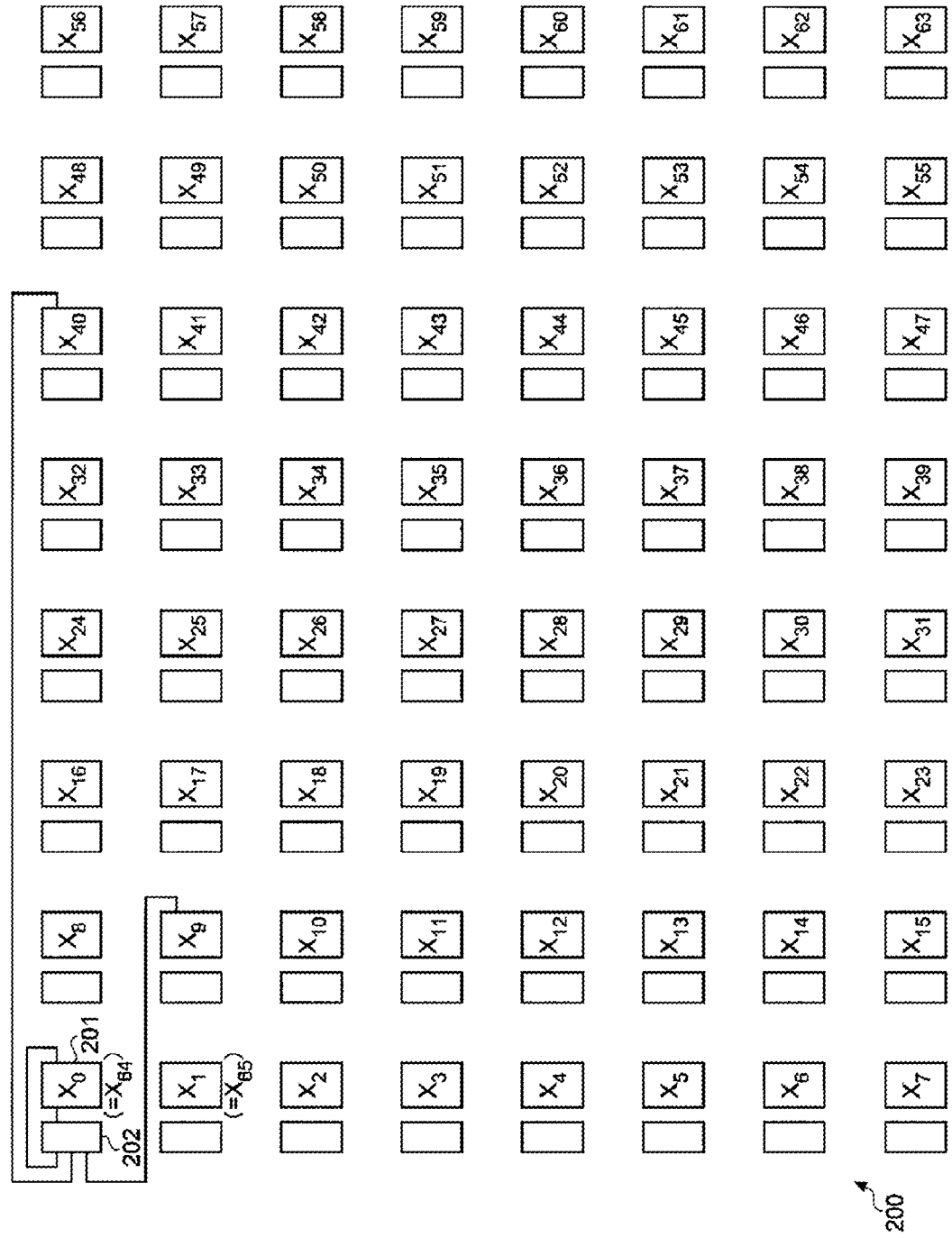
FIG. 14 illustrates a 64-bit lagged Fibonacci random number generator that is used as a main random number generator in a fourth embodiment.
Figure 15:
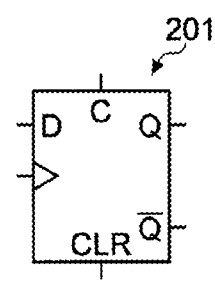
FIG. 15 illustrates a flip-flop that is used in the 64-bit lagged Fibonacci random number generator of FIG. 14.

FIG. 14 illustrates one example of a 64-bit lagged Fibonacci random number generator that is used as the main random number generator in the fourth embodiment. FIG. 15 illustrates one example of a flip-flop that is used in the 64-bit lagged Fibonacci random number generator of FIG. 14, and FIG. 16 illustrates one example of an input circuit that is disposed in the input stage of each flip-flop of FIG. 14.

A 64-bit lagged Fibonacci random number generator (hereinafter, simply referred to as a main random number generator) 200 illustrated in FIG. 14 includes total 64 flip-flops 201 respectively corresponding to the indexes i of 0 to 63 (that is, $X_0$ to $X_{63}$) and an input circuit 202 disposed in the input stage of each of the 64 flip-flops 201. In the present description, the flip-flop 201 of the index i may be referred to as "$X_i$" or X(i)".

Each flip-flop 201 is, for example, a D flip-flop and includes, as terminals thereof, a clock (C) terminal, a D input, a Q output, a Qbar (inverted) output, and a clear (CLR) terminal as illustrated in FIG. 15.

Figure 16:
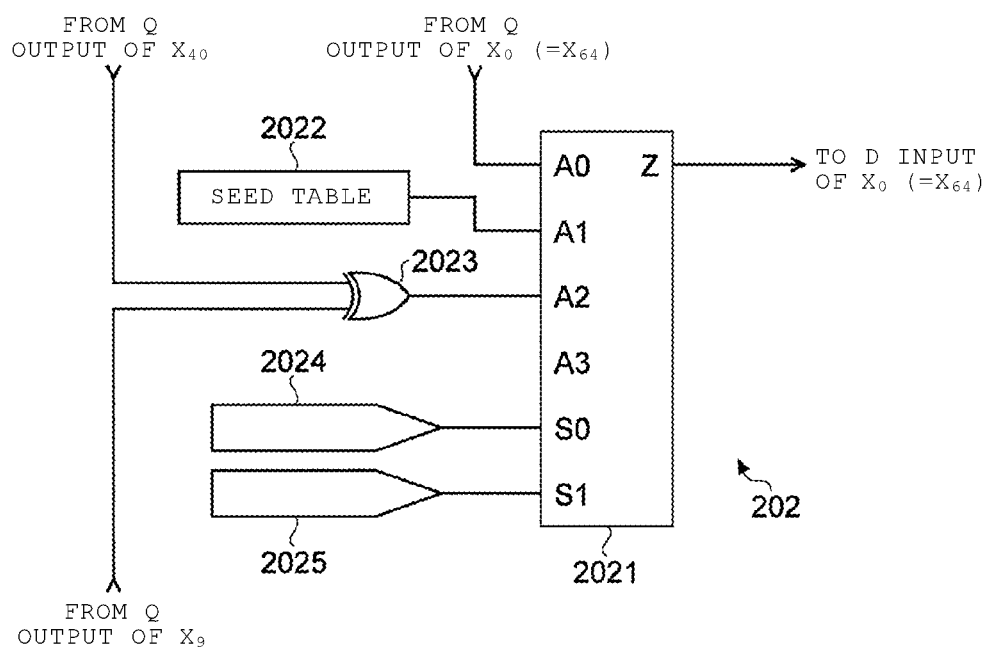
FIG. 16 illustrates an input circuit disposed in an input stage of each flip-flop of FIG. 14.

The input circuit 202 disposed in the input stage of each flip-flop 201 includes a selector 2021, a seed table 2022, and an XOR circuit 2023 as illustrated in FIG. 16. Although FIG. 16 illustrates the input circuit 202 that is disposed in the input stage of the flip-flop 201 corresponding to the index i=0, the same input circuit 202 is disposed for the flip-flops 201 that respectively correspond to other indexes i=1 to 63.

In a general 64-bit lagged Fibonacci random number generator, the flip-flops of i=0 to 63 are used in order, and then the flip-flops of i=64 to 127 are used in order. However, for example, after the subsequent flip-flops that reference the flip-flops of i=0 to 7 are updated by using information stored in the flip-flops of i=0 to 7, the flip-flops of i=0 to 7 are no longer referenced from the subsequent flip-flops. In the main random number generator 200 according to the fourth embodiment, for example, the flip-flops 201 of i=0 to 7 are used as flip-flops storing information of i=64 to 71 after the subsequent flip-flops 201 that reference the flip-flops 201 of i=0 to 7 are updated by using information stored in the flip-flops 201 of i=0 to 7. Similarly, the flip-flops 201 of i=8 to 55 are used as flip-flops that store information of i=72 to 119 in order. That is, in the fourth embodiment, information is stored by regarding, of the 64 flip-flops 201, "flip-flops with the same modulo n (hereinafter, described as mod n) as being equivalent".

FIG. 14 illustrates the main random number generator 200, focusing on an element including the flip-flop 201 of i=0. Other elements respectively including the flip-flops 201 of i=1 to 63 include the same connection configuration. That is, the main random number generator 200 according to the fourth embodiment has a configuration in which an element configured with one flip-flop 201 and one input circuit 202 disposed in the input stage of the flip-flop 201 is arranged in a 8-row and 8-column matrix. In the configuration illustrated in FIG. 14, elements corresponding to i=0 to 7 are arranged from the top to the bottom of the leftmost column (referred to as the first column), and elements corresponding to i=8 to 15 are arranged from the top to the bottom of the second column from left. In the same manner, elements corresponding to i=56 to 63 are arranged from the top to the bottom of the rightmost column (that is, the eighth column from left).

The flip-flop 201 of i=0 (mod 64) that is positioned uppermost in the leftmost column of FIG. 14, that is, $X_0$ (=$X_{64}$), is updated with reference to information of the flip-flops 201 of i=9 (=64−55) and i=40 (=64−24) (that is, $X_9$ and $X_{40}$) according to the above recursive formula (3). A value that the XOR circuit 2023 obtains by calculating XOR of the Q outputs of $X_9$ and $X_{40}$ is input into the D input of $X_0$ (=$X_{64}$). $X_0$ (=$X_{64}$) is operated according to a combination of input select signals 2024 and 2025, each of which has one bit, by selecting either retaining of the current value of $X_0$, retaining of the value of a bit (seed value) output from the seed table 2022, or retaining of the value obtained by calculating XOR of the Q outputs of $X_9$ and $X_{40}$. Such operation is the same for the other flip-flops 201 of $X_1$ to $X_{63}$.

As described above, in the case of generating a seed to be input into the long-cycle main random number generator 200 using the short-cycle sub random number generator, the output of the sub random number generator is connected to a seed table input A1 or an input A3, which is an empty port, of the selector 2021 in the input circuit 202 illustrated in FIG. 16.

Figure 17:
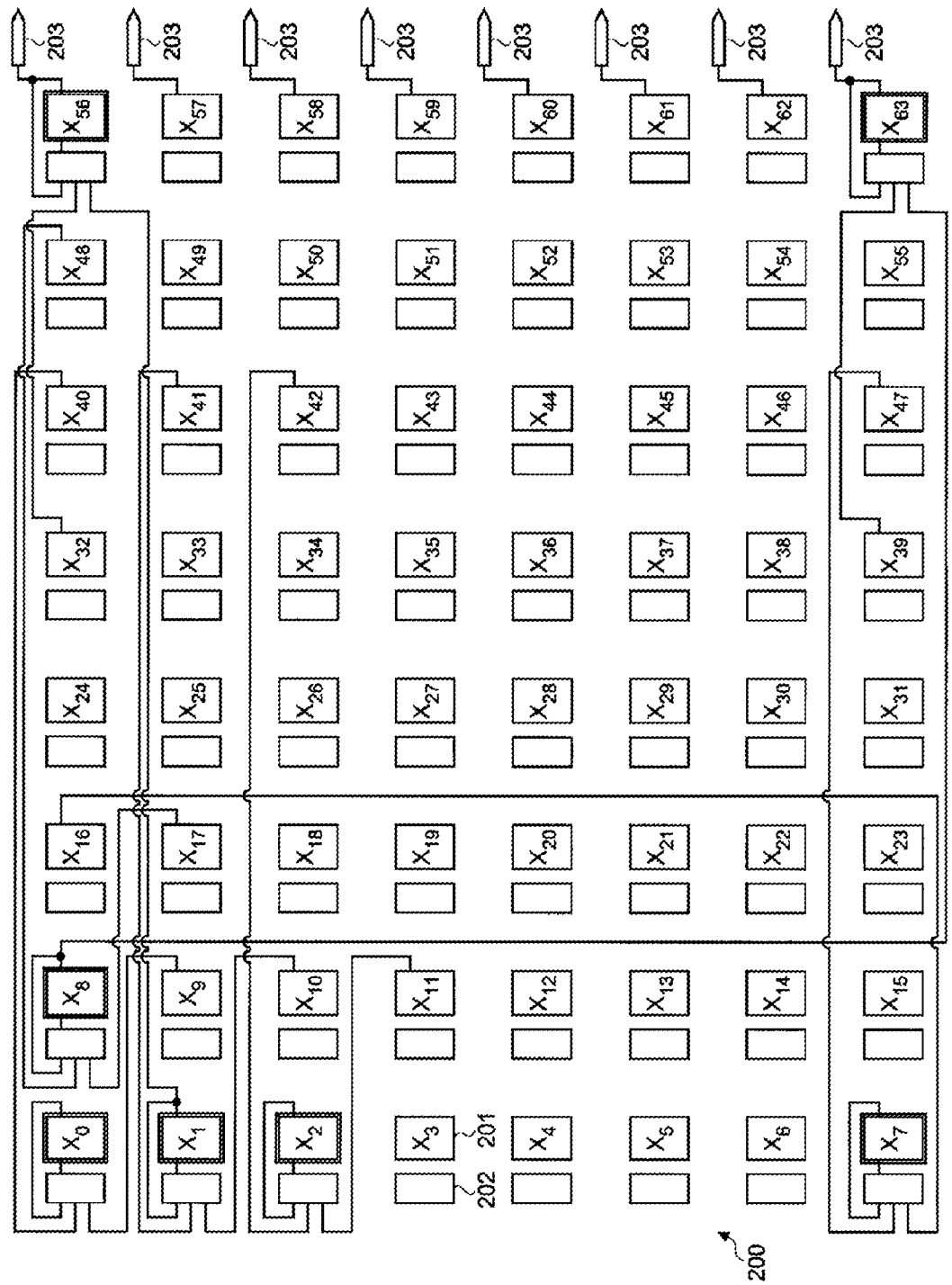
FIG. 17 illustrates an input configuration example of $X_0$, $X_1$, $X_2$, $X_7$, $X_8$, $X_{56}$, and $X_{63}$ in the main random number generator illustrated in FIG. 14.

FIG. 17 illustrates an input configuration example of $X_0$, $X_1$, $X_2$, $X_7$, $X_8$, $X_{56}$, and $X_{63}$. The flip-flop 201 that does not have an input configuration example illustrated in FIG. 17 has the same connection configuration. An output tap 203 is disposed in each 8-bit flip-flop 201 in the rightmost column in FIG. 17. Values output from the eight output taps 203 correspond to the last eight bits of a value that is cut in units of 64 bits out of a lagged Fibonacci sequence with n=64. That is, the main random number generator 200 illustrated in FIG. 17 is configured to output the last eight bits of the value that is cut in units of 64 bits out of a lagged Fibonacci sequence with n=64. However, the present disclosure is not limited to this configuration, and various modifications can be made, such as a configuration that outputs the initial eight bits or a configuration that outputs continuous or discontinuous eight bits in the middle of the sequence. In the case of using the configuration that outputs the initial eight bits, data output can be promptly performed in the second round.

Figure 18:
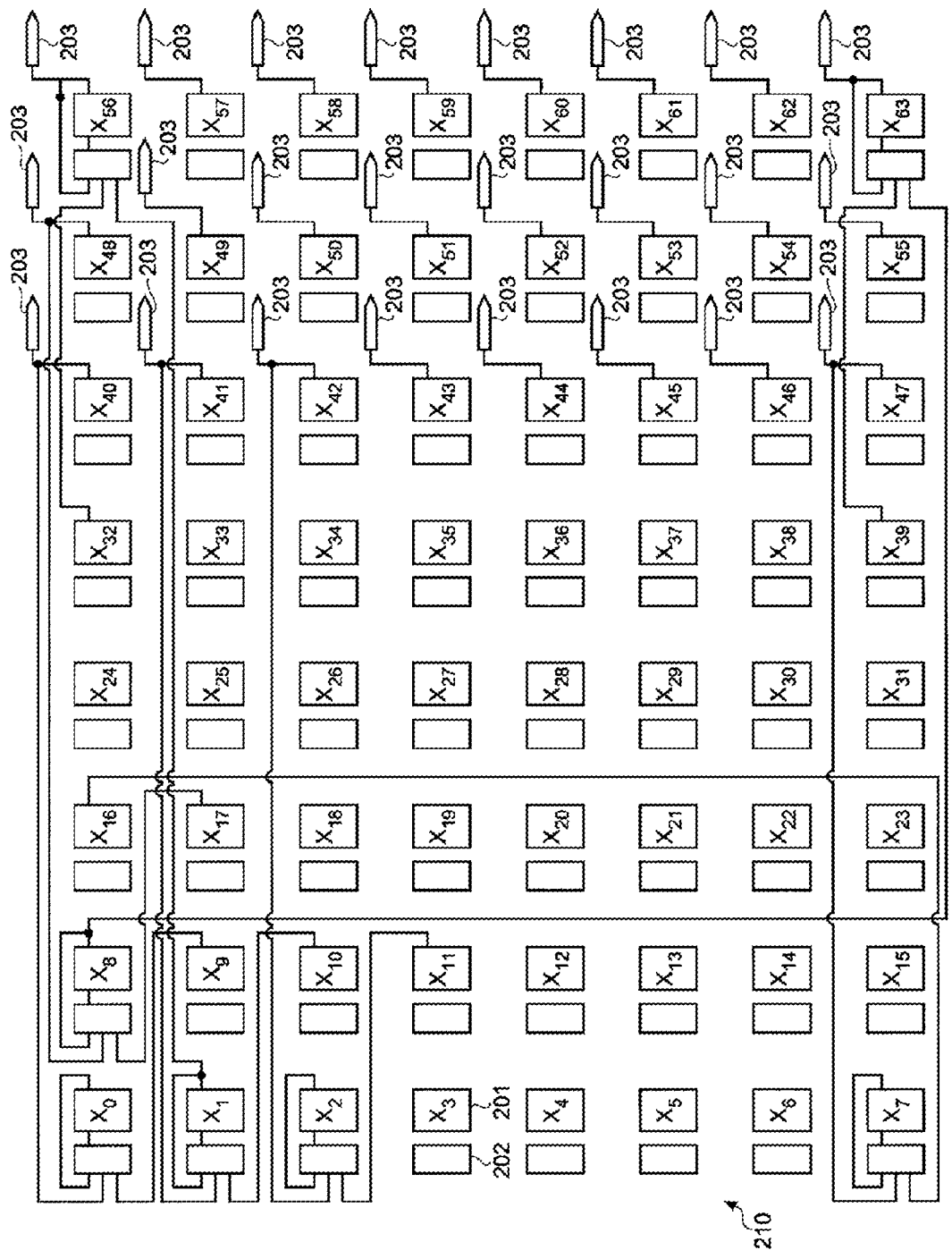
FIG. 18 illustrates a main random number generator configured to output the last 24 bits of a value that is cut in units of 64 bits out of a lagged Fibonacci sequence with $n=64$.

The number of bits output by the main random number generator is not limited to eight bits. FIG. 18 illustrates a main random number generator 210 configured to output the initial 24 bits of a value that is cut in units of 64 bits out of a lagged Fibonacci sequence with n=64. Generally, a lagged Fibonacci sequence is known to be capable of generating a pseudorandom sequence having a significantly good property. In the configuration, such as illustrated in FIG. 18, that outputs the initial 24 bits of the value which is cut in units of 64 bits out of a lagged Fibonacci sequence with n=64, information that is retained in one flip-flop 201 does not reach another flip-flop in one cycle. For that reason, a pseudorandom sequence having particularly small correlation can be generated.

Figure 19:
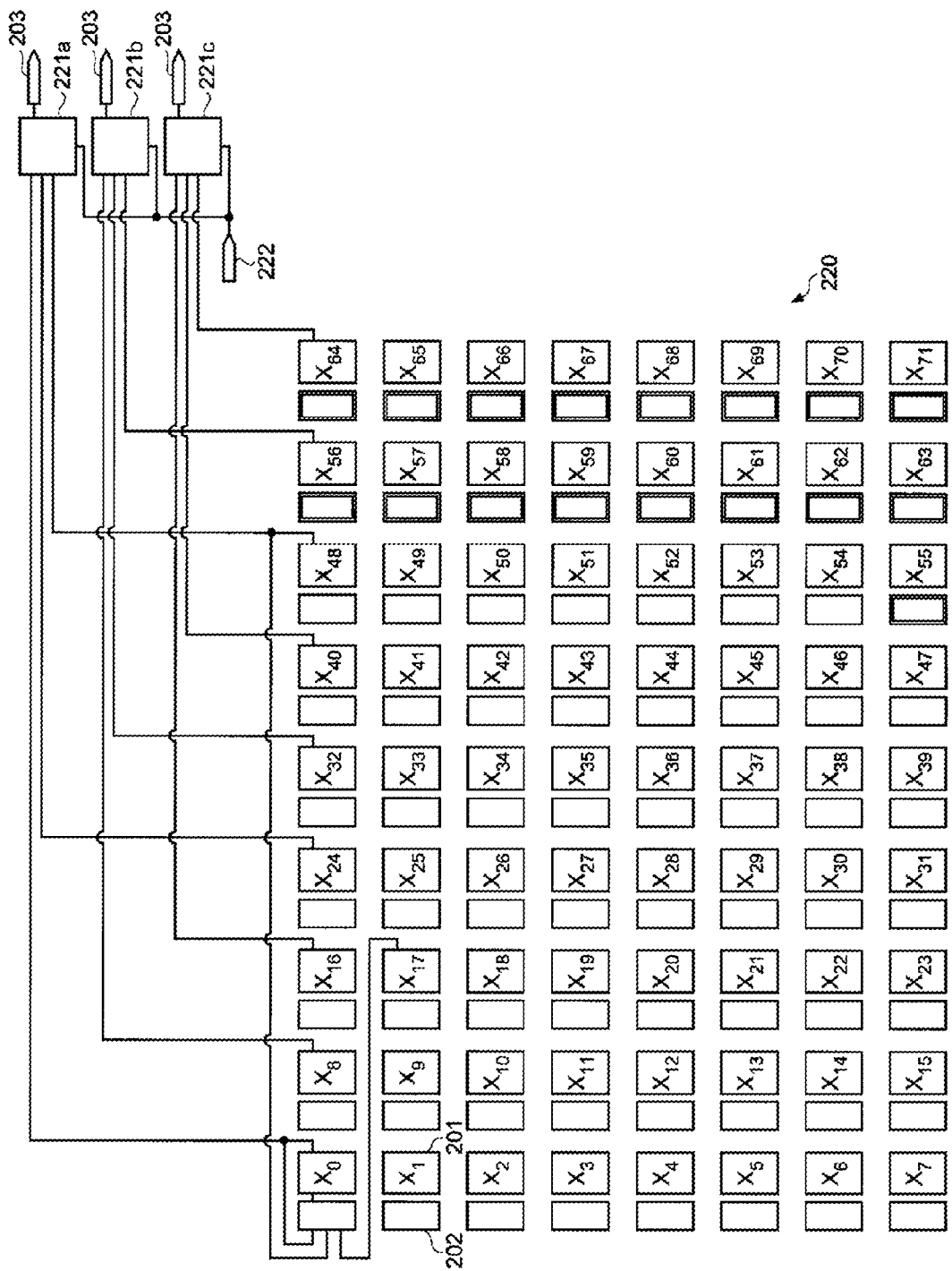
FIG. 19 illustrates a main random number generator of a 72-bit configuration according to the fourth embodiment.
Figure 20:
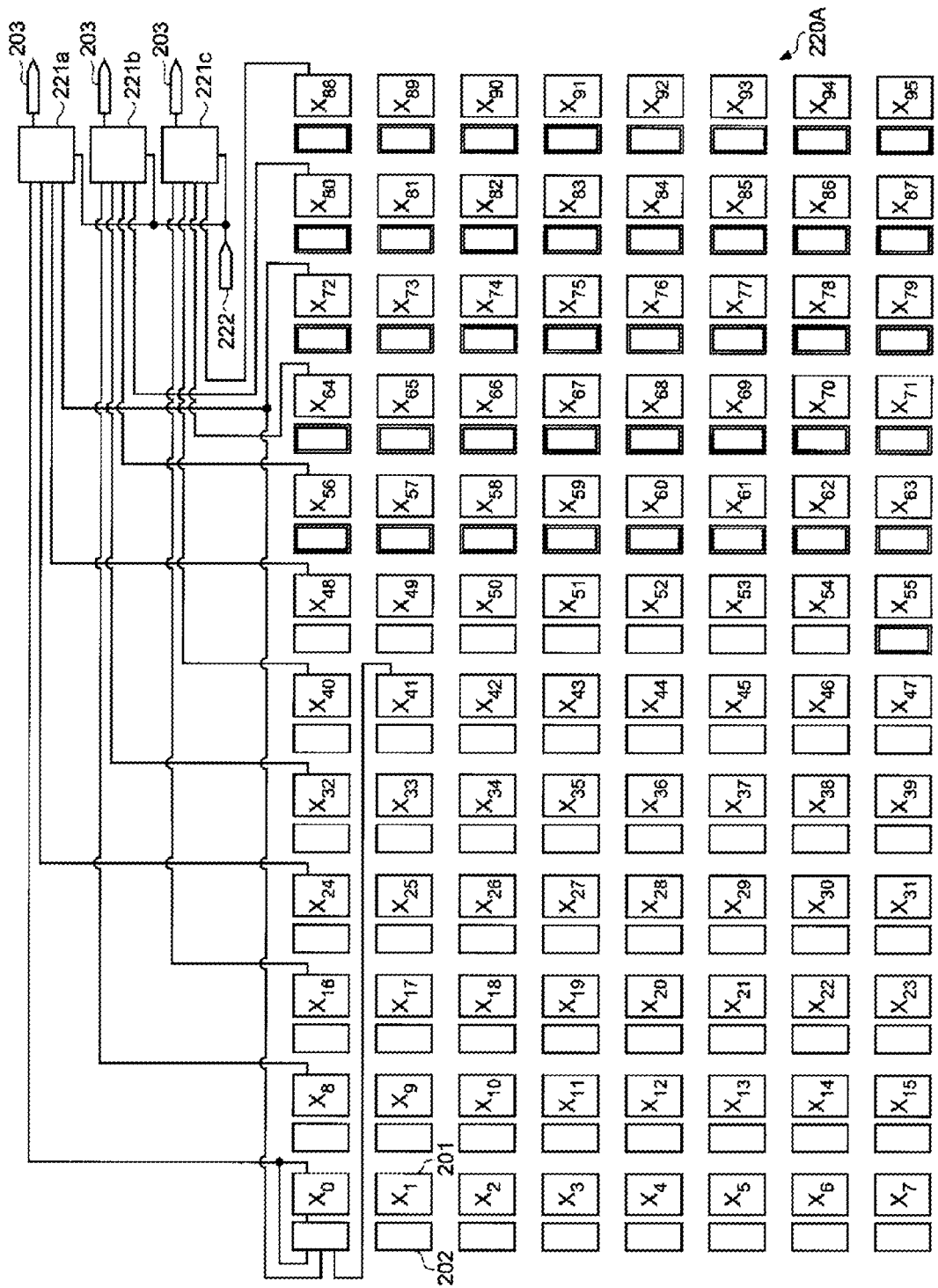
FIG. 20 illustrates a main random number generator of a 96-bit configuration according to the fourth embodiment.

In the case of 24-bit output, a configuration with the number of bits that is greater than 56 bits and is a multiple of 24 bits, such as a 72-bit configuration (is greater than 56 and is the minimum multiple of 24) as illustrated in FIG. 19 described below or a 96-bit configuration (a multiple of 24) as illustrated in FIG. 20, may be used instead of a 64-bit configuration illustrated in FIG. 18. In this case, 24 output taps 203 can be connected one-to-one to output selectors. As a result, hardware implementation can be facilitated. In addition, from the same reason, a 64-bit configuration (is greater than 56 and is the minimum multiple of 16) is more suitable than a 56-bit configuration or a 72-bit configuration in the case of 16-bit output. Furthermore, a 56-bit configuration is suitable in the case of 8-bit output.

FIG. 19 and FIG. 20 illustrate an example of amain random number generator that has 24-bit output. FIG. 19 illustrates a schematic configuration example of a main random number generator that includes a 64-bit lagged Fibonacci random number generator having 24-bit output suitable for hardware implementation. FIG. 20 illustrates a schematic configuration example of a main random number generator that includes a 64-bit lagged Fibonacci random number generator having 24-bit output suitable for verification in a software model.

A main random number generator 220 illustrated in FIG. 19 has a configuration in which 72 elements configured with the flip-flop 201 illustrated in FIG. 15 and the input circuit 202 illustrated in FIG. 16 are arranged in an 8-row and 9-column matrix. The main random number generator 220 is configured to output 24-bit output in eight cycles, three bits at a time. The main random number generator 220 includes three output selectors 221a to 221c. The output selector 221a is connected to the Q outputs of the flip-flops 201 in the first column, the fourth column, and the seventh column, of the flip-flops 201 in the elements arranged in an 8-row and 9-column matrix. Similarly, the output selector 221b is connected to the Q outputs of the flip-flops 201 in the second column, the fifth column, and the eighth column, and the output selector 221c is connected to the Q outputs of the flip-flops 201 in the third column, the sixth column, and the ninth column.

The input select signals 2024 and 2025 that are input into the selector 2021 are controlled in the input circuit 202 of each element in such a manner that three columns are updated in one cycle. The output selectors 221a to 221c are operated on the basis of 2-bit output select signal 222 in such a manner that output combinations thereof are an output combination from the first column, the second column, and the third column, an output combination from the fourth column, the fifth column, and the sixth column, and an output combination from the seventh column, the eighth column, and the ninth column. At this point, configuring the output select signal 222 to be a signal that is obtained by delaying the input select signals 2024 and 2025 by one cycle (or two cycles) allows the outputs of the output selectors 221a to 221c to be synchronized with the input select signal.

As above, in the case of hardware implementation that implements array elements of a 64-bit lagged Fibonacci sequence using the flip-flops 201, efficiency of generating a pseudorandom sequence can be increased by configuring a 64-bit lagged Fibonacci random number generator to have a 72-bit configuration. In the case of verifying a 64-bit lagged Fibonacci random number generator in a software model, increasing the number of array elements by 24 to total 96 ($X_0$ to $X_{95}$), as a main random number generator 220A illustrated in FIG. 20, results in a configuration in which an array of a destination of reference at the time of updating the subsequent arrays is not updated at the time of updating the subsequent arrays. For that reason, implementation can be facilitated.

Figure 21:
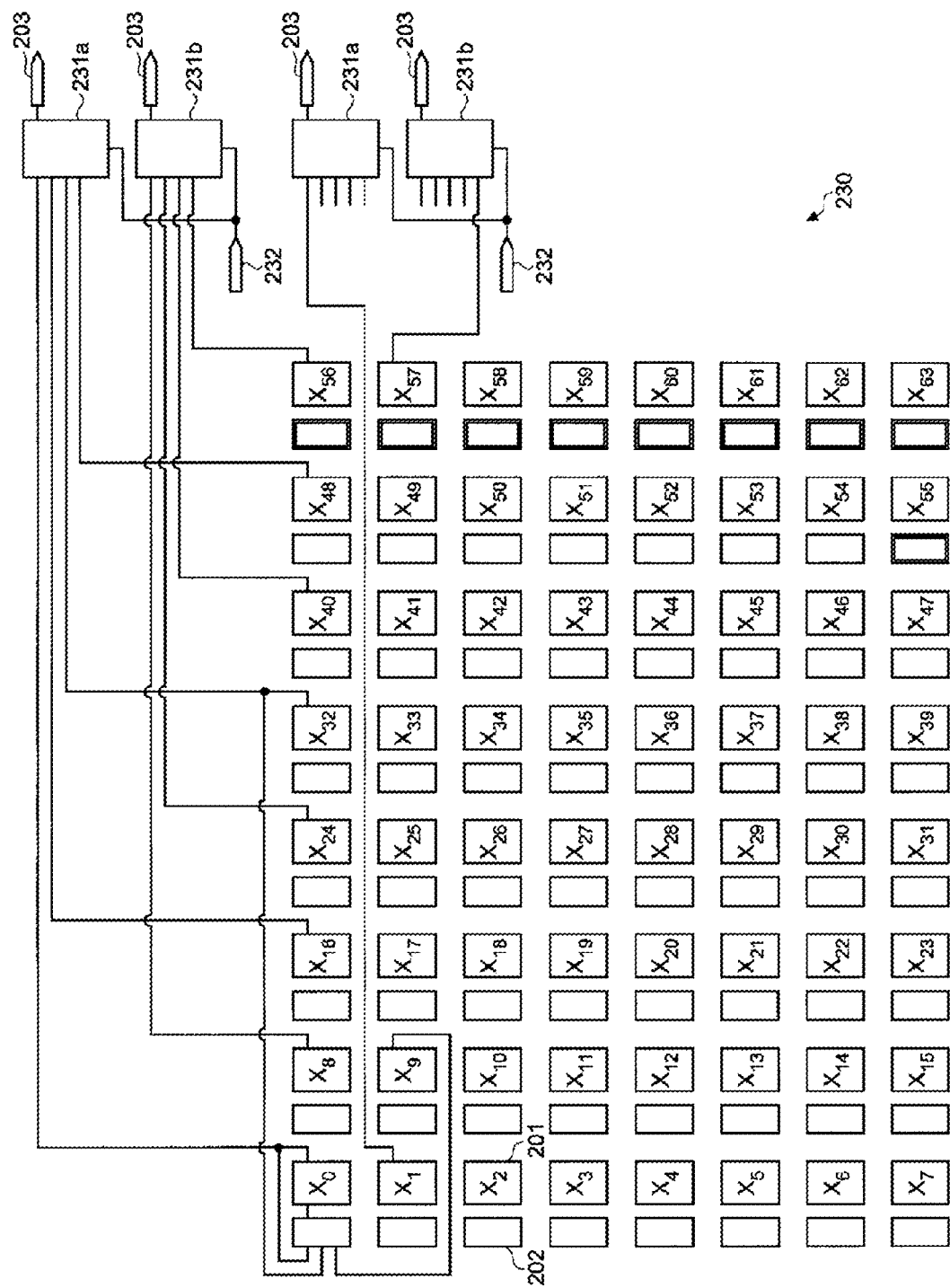
FIG. 21 illustrates amain random number generator having a 16-bit output according to the fourth embodiment.
Figure 22:
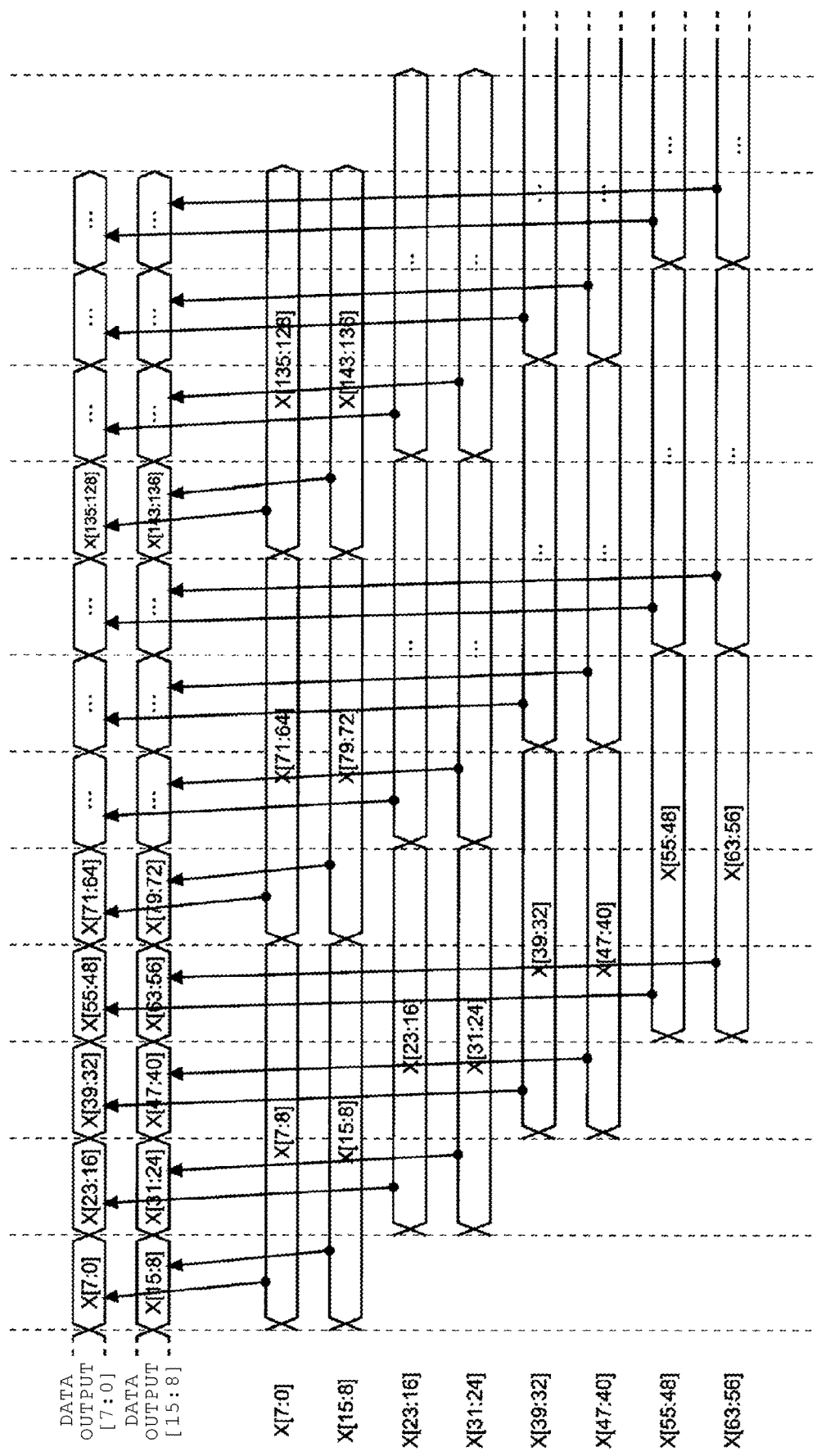
FIG. 22 is a timing chart of operations by the main random number generator illustrated in FIG. 21.

An example of a main random number generator that has 16-bit output is illustrated in FIG. 21 as a configuration other than 8-bit output and 24-bit output. FIG. 22 illustrates a timing chart of the main random number generator illustrated in FIG. 21.

As illustrated in FIG. 21, a main random number generator 230 has a configuration in which 64 elements configured with the flip-flop 201 and the input circuit 202 are arranged in an 8-row and 8-column matrix. The main random number generator 230 includes two output selectors 231a and 231b as a configuration for outputting 16-bit output in four cycles, four bits at a time. The output selector 231a is connected to the Q outputs of, of the flip-flops 201 in the elements arranged in an 8-row and 8-column matrix, the flip-flops 201 in the first column, the third column, the fifth column, and the seventh column, and the output selector 231b is connected to the Q outputs of the flip-flops 201 in the second column, the fourth column, the sixth column, and the eighth column.

In the case of 16-bit output, a 2-bit input select signal (refer to the input select signals 2024 and 2025 in FIG. 16) in the input circuit 202 is controlled in such a manner that two columns are updated in one cycle. As illustrated in FIG. 21 and FIG. 22, an output select signal 232 that is obtained by delaying the input select signal by one cycle (or two cycles) is controlled in such a manner that output from the output selectors 231a and 231b is an output combination of the first column, the second column, the third column, and the fourth column of the elements arranged in an 8-row and 8-column matrix or an output combination of the fifth column, the sixth column, the seventh column, and the eighth column. As a result, the output of the output selectors 231a and 231b is switched in synchronization with the input select signal.

In the case of 8-bit output, a 3-bit input select signal in the input circuit 202 is controlled in such a manner that one column is updated in one cycle, and a 2-bit output select signal that is obtained by delaying the input select signal by one cycle (or two cycles) is controlled in such a manner that output from the output selector is output from the first column, the second column, the third column, the fourth column, the fifth column, the sixth column, the seventh column, and the eighth column. As a result, the output of the output selector is switched in synchronization with the input select signal.

As described above, a lagged Fibonacci random number generator that is employed in the main random number generator in the fourth embodiment generates a pseudorandom sequence having significantly good quality. However, a lagged Fibonacci random number generator has a simple generation method (recursive formula) and generates a pseudorandom sequence with reference to a far element, not an element in the vicinity with a distance of, for example, less than or equal to 10. Thus, if similar seed values are given, the lagged Fibonacci random number generator may output very similar sequences in a region where the number of cycles is small (for example, a leading part of the pseudorandom sequence). In other words, in the case of specifying a seed in small units in order to deal with random access or the like, similar pseudorandom sequences are generated in a part where the number of cycles is small, according to a selection method for a seed, and a pseudorandom sequence having a bad testing result may be generated.

In the fourth embodiment, as described above, the linear feedback shift register 1 (refer to FIG. 4) of a CRC-32 type, for example, is used as the sub random number generator, 55 or more bits (for example, 56 bits) are taken at a time from a pseudorandom sequence that is generated by using a seed table configured with eight sets of 67 entries in the sub random number generator, and 55 bits of the taken bits are used as a seed of the main random number generator that uses a 64-bit lagged Fibonacci type.

Figure 23:
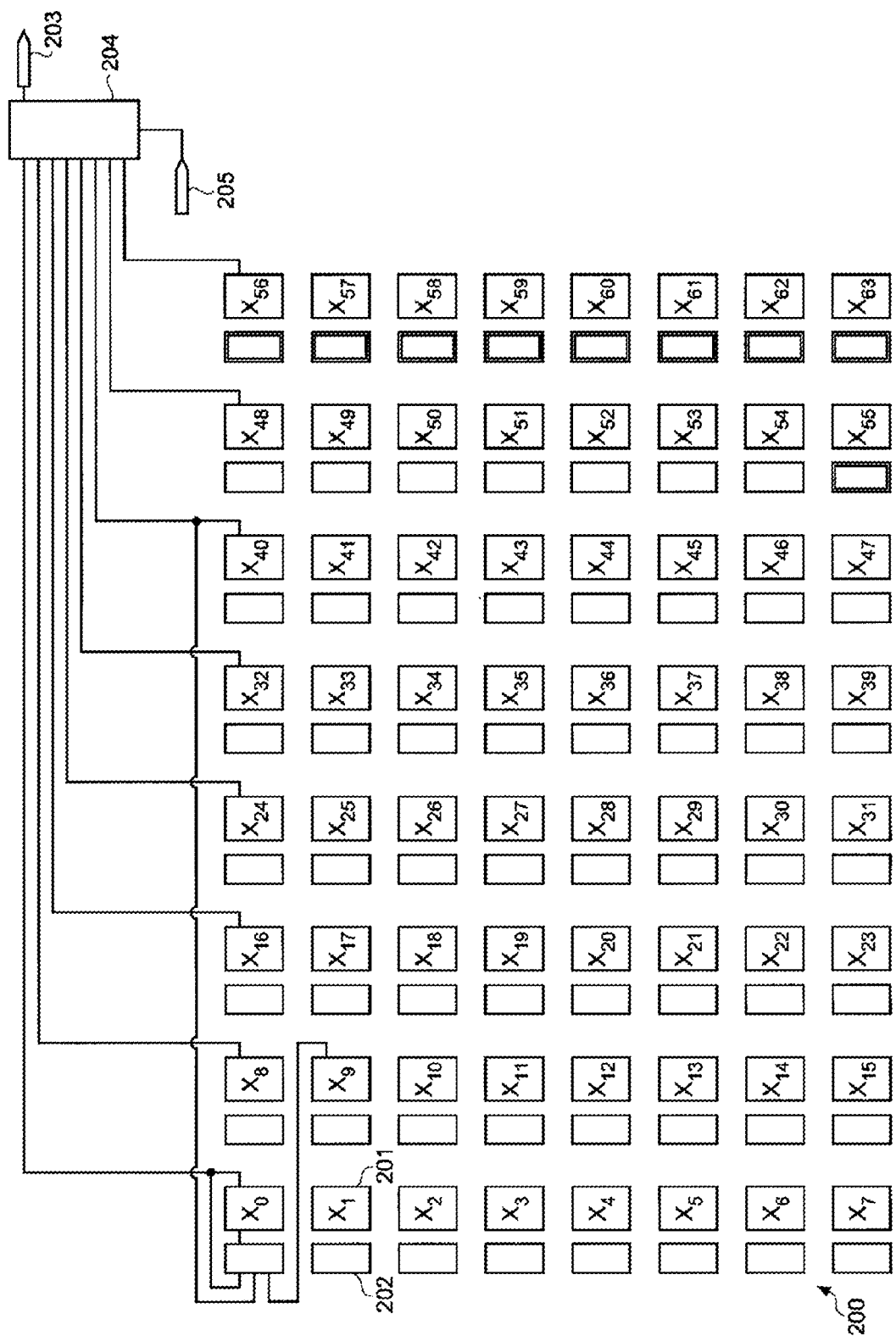
FIG. 23 illustrates a main random number generator in the fourth embodiment, including a 64-bit lagged Fibonacci random number generator that generates 8-bit output.
Figure 24:
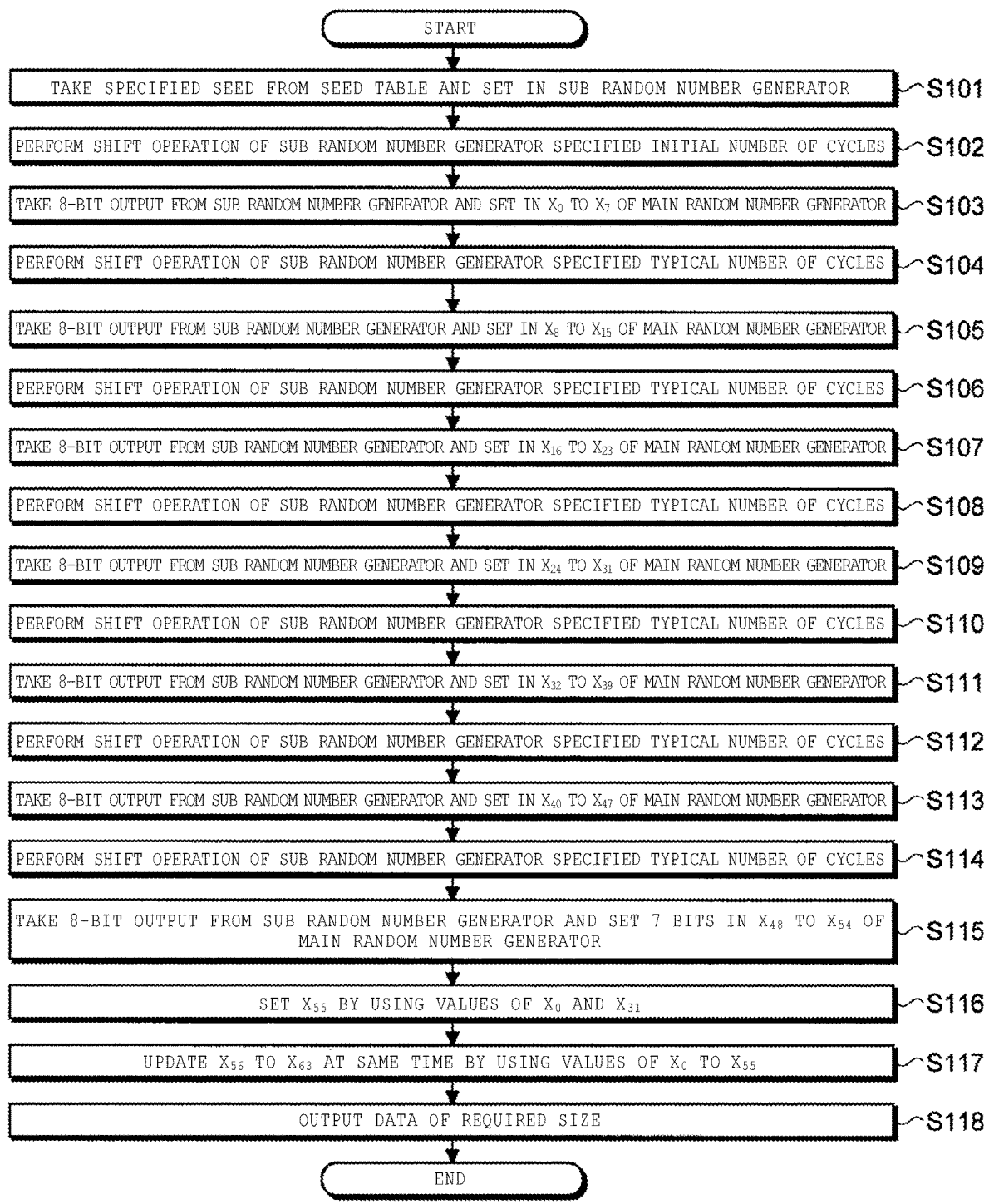
FIG. 24 is a flowchart illustrating an operation carried out when a pseudorandom sequence generated by a sub random number generator is used as a seed of the main random number generator illustrated in FIG. 23.

An operating example at the time of using a pseudorandom sequence generated by the sub random number generator as a seed of the main random number generator will be described in detail below by using the drawings. FIG. 23 illustrates one example of a main random number generator that is used in the present description of operation and in which a 64-bit lagged Fibonacci random number generator having 8-bit output is used. FIG. 24 is a flowchart illustrating an operating example when a pseudorandom sequence generated by a sub random number generator is used as a seed of the main random number generator illustrated in FIG. 23. The main random number generator 200 illustrated in FIG. 23 may be the same as the main random number generator 200 illustrated in FIG. 14.

As illustrated in FIG. 23, the main random number generator 200 used in the present description includes, in addition to the configuration illustrated in FIG. 14, an output selector 204 that is connected to the Q outputs of the flip-flops 201 of the first column to the eighth column, and the output tap 203 that outputs data (pseudorandom sequence) from the output selector 204. The output selector 204 switches the output thereof in synchronization with an input select signal on the basis of an output select signal 205 that is obtained by delaying the input select signals 2024 and 2025 in the input circuit 202 by one cycle (or two cycles).

The main random number generator 200 illustrated in FIG. 23 is operated in accordance with, for example, a procedure illustrated in Steps S101 to S122 and a natural extension thereof (Step S123) described in FIG. 24 and below and thereby generates a pseudorandom sequence of a required size.

(Step S101) First, a seed that is specified from a seed table for the sub random number generator is obtained, and the value of the seed is set in the sub random number generator.

(Step S102) The sub random number generator is caused to perform a shift operation with a specified initial number of cycles.

(Step S103) An 8-bit output is taken from the sub random number generator and is set in $X_0$ to $X_7$ of the main random number generator 200.

(Step S104) The sub random number generator is caused to perform a shift operation with a specified typical number of cycles.

(Step S105) An 8-bit output is taken from the sub random number generator and is set in $X_8$ to $X_{15}$ of the main random number generator 200.

(Step S106) The sub random number generator is caused to perform a shift operation with the specified typical number of cycles.

(Step S107) An 8-bit output is taken from the sub random number generator and is set in $X_{16}$ to $X_{23}$ of the main random number generator 200.

(Step S108) The sub random number generator is caused to perform a shift operation with the specified typical number of cycles.

(Step S109) An 8-bit output is taken from the sub random number generator and is set in $X_{24}$ to $X_{31}$ of the main random number generator 200.

(Step S110) The sub random number generator is caused to perform a shift operation with the specified typical number of cycles.

(Step S111) An 8-bit output is taken from the sub random number generator and is set in $X_{32}$ to $X_{39}$ of the main random number generator 200.

(Step S112) The sub random number generator is caused to perform a shift operation with the specified typical number of cycles.

(Step S113) An 8-bit output is taken from the sub random number generator and is set in $X_{40}$ to $X_{47}$ of the main random number generator 200.

(Step S114) The sub random number generator is caused to perform a shift operation with the specified typical number of cycles.

(Step S115) An 8-bit output is taken from the sub random number generator, and seven bits thereof are set in $X_{48}$ to $X_{54}$ of the main random number generator 200.

(Step S116) The value of $X_{55}$ of the main random number generator 200 is set by using the values of $X_0$ and $X_{31}$. The input of $X_{55}$ is implemented in the XOR circuit 2023 (refer to FIG. 16) that is in accordance with the recursive formula (3) of lagged Fibonacci.

(Step S117) $X_{56}$ to $X_{63}$ of the main random number generator 200 are updated at the same time by using the values of $X_0$ to $X_{55}$. The input of each of $X_{56}$ to $X_{63}$ is implemented in the XOR circuit 2023 that is in accordance with the recursive formula (3) of lagged Fibonacci.

(Step S118) Data of a required size are output from the main random number generator 200 after values are set in $X_0$ to $X_{63}$ of the main random number generator 200 as above.

Figure 25:
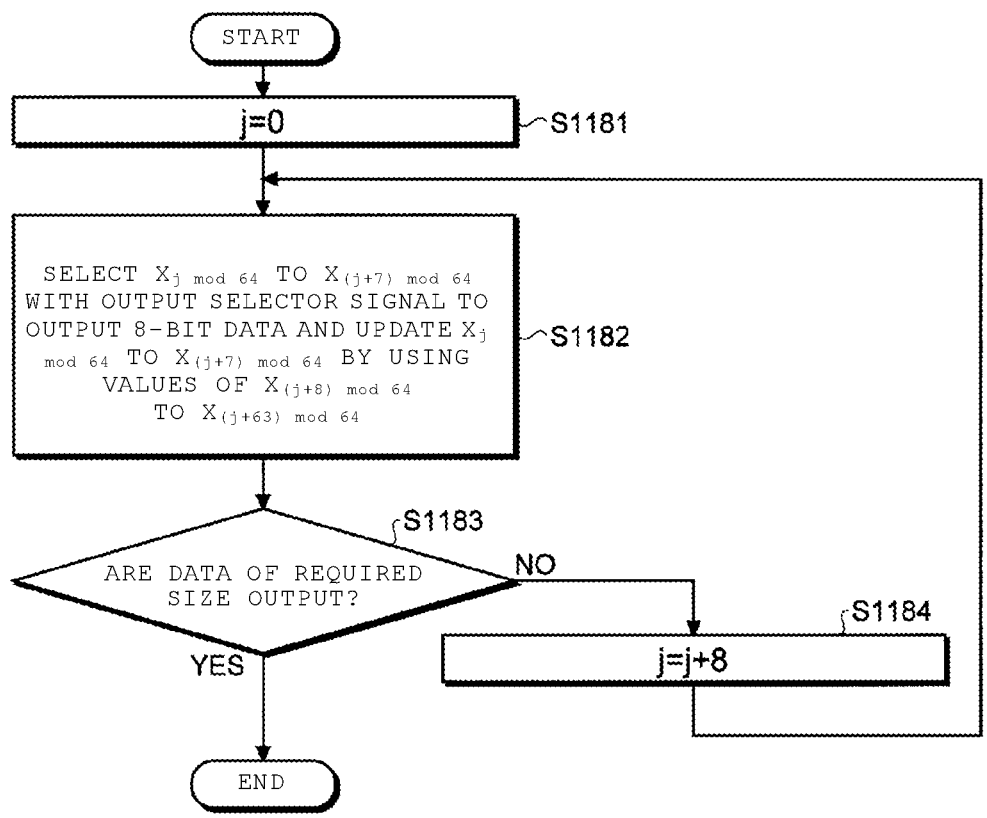
FIG. 25 is a flowchart illustrating a specific example of an operation illustrated in Step S118 of FIG. 24.

In the Step S118 of FIG. 24, for example, an operation illustrated in FIG. 25 is performed. In the operation illustrated in FIG. 25, first, the value of j that specifies a term of the recursive formula (3) is reset to 0 (Step S1181).

Next, 8-bit data are output by selecting $X_{j\ mod\ 64}$ to $X_{(j+7)\ mod\ 64}$ with an output selector signal, and $X_{j\ mod\ 64}$ to $X_{(j+7)\ mod\ 64}$ are updated by using the values of $X_{(j+8)\ mod\ 64}$ to $X_{(j+63)\ mod\ 64}$ (Step S1182).

Next, a determination of whether or not data of the required size are output is performed (Step S1183). If data of the required size are not output (NO in the Step S1183), j is incremented by 8 (Step S1184), and then the operation returns to the Step S1181. Meanwhile, if data of the required size are output (YES in the Step S1183), the present operation is ended.

In the operation illustrated in FIG. 24 and FIG. 25, $X_i$ that has the index i corresponding to j mod 64, (j-24) mod 64, and (j-55) mod 64 is used in X(j), X(j-24), and X(j-55). While only $X_{55}$ is updated in the Step S116, update is performed in units of eight after Step S117.

While FIG. 24 and FIG. 25 assume a case where the typical number of shift cycles of a pseudorandom number generator of a CRC-32 type used in the sub random number generator is one, another pseudorandom sequence can be generated by using a value other than one.

While the operating example illustrated in FIG. 24 and FIG. 25 is configured to update eight bits in one cycle and take eight bits of data at a time, this configuration is considered to be sufficient for generating a required pseudorandom sequence from the following reasons since the main random number generator 200 includes the 64-bit flip-flops 201 of $X_0$ to $X_{63}$. The first reason is that since eight bits to be updated reference 56 non-updated bits, operation in accordance with the recursive formula (3) can be performed. The second reason is that when eight bits are updated, eight flip-flops 201 selected by the output select signal 205 are not referenced from now on and thus can be assigned to the next eight bits to be updated.

In the fourth embodiment, a seed is supplied to the sub random number generator from the seed table for the sub random number generator (for example, refer to the seed table 51 of FIG. 5). In the initial output of a short-cycle random number, a seed may be set, and then a seed of the main random number generator may be used from data (pseudorandom sequence) that is output in the initial cycle.

In the case of using up seeds for the sub random number generator, a seed may be set in the sub random number generator, and then data (pseudorandom sequence) corresponding to a separately specified number of cycles (for example, 67 cycles) may be discarded from data output from the sub random number generator, and the subsequent (for example, from the 68-th cycle) data (pseudorandom sequence) may be used as a seed of the main random number generator. This can decrease the size of the seed table for the sub random number generator.

In addition to the method of using the output of the sub random number generator in order, a method, for example, that generates apparently another random sequence by splitting the output of the sub random number generator in units of eight bits and swapping (rotating) the order of bits in eight bits can be employed as another seed extension method. In this case, considering bit permutations of eight bits, eight factorial (8!=4,320) new combinations can be generated.

Confirmation of whether or not output from the long cycle main random number generator serves for the use purpose may be performed by performing in advance random number testing that serves for the use purpose. At this point, what has to be considered is that since a pseudorandom sequence output from the short-cycle sub random number generator is uniquely determined by a seed given to the sub random number generator, a seed given to the main random number generator is uniquely determined by the seed given to the sub random number generator, and consequently a pseudorandom sequence output by the main random number generator is also uniquely determined. That is, when a seed given to the sub random number generator is determined, a pseudorandom sequence output by the main random number generator is also uniquely determined.

According to the definition of the main random number generator, a pseudorandom sequence used in writing of data into the nonvolatile memory is apart of pseudorandom sequences that can be output by the main random number generator. In this case, a seed of the sub random number generator that corresponds to a pseudorandom sequence not serving for the use purpose can be configured not to be registered in a seed table. Examples of a pseudorandom sequence not serving for the sue purpose include, for example, the case of multiple (for example, eight or more bits) "0"s being continuous in a pseudorandom sequence and the case of a pseudorandom sequence output by the main random number generator having correlation with a plurality of seeds for the sub random number generator.

As above, according to the fourth embodiment, a new random sequence is generated by calculating XOR of a pseudorandom sequence generated by the main random number generator and a pseudorandom sequence generated by the sub random number generator. For that reason, a random sequence having a good property can be obtained by offsetting weak points of each pseudorandom number generator.

In addition, according to the fourth embodiment, a pseudorandom sequence generated by giving a seed to the sub random number generator is used as a seed of the main random number generator. As a result, the length of each seed can be decreased, and accordingly the size of a seed table can be decreased.

Furthermore, according to the fourth embodiment, information is stored by regarding flip-flops having the same mod n as being equivalent. For that reason, the number of elements included in the main random number generator can be decreased. Accordingly, the circuit size of the main random number generator can be decreased, and hardware implementation of the main random number generator and the randomizer can be facilitated.

Other configurations, operations, and effects are the same as the above embodiments, and duplicate descriptions thereof will not be provided.

Fifth Embodiment

Next, a randomizer and a semiconductor storage device according to a fifth embodiment will be described in detail below with reference to the drawings.

While the above fourth embodiment illustrates the case of outputting a few continuous bits (for example, 8 bits, 16 bits, or 24 bits) from a lagged Fibonacci sequence used in the main random number generator, the fifth embodiment will be illustratively described in the case of outputting a few discontinuous bits from a lagged Fibonacci sequence.

Figure 26:
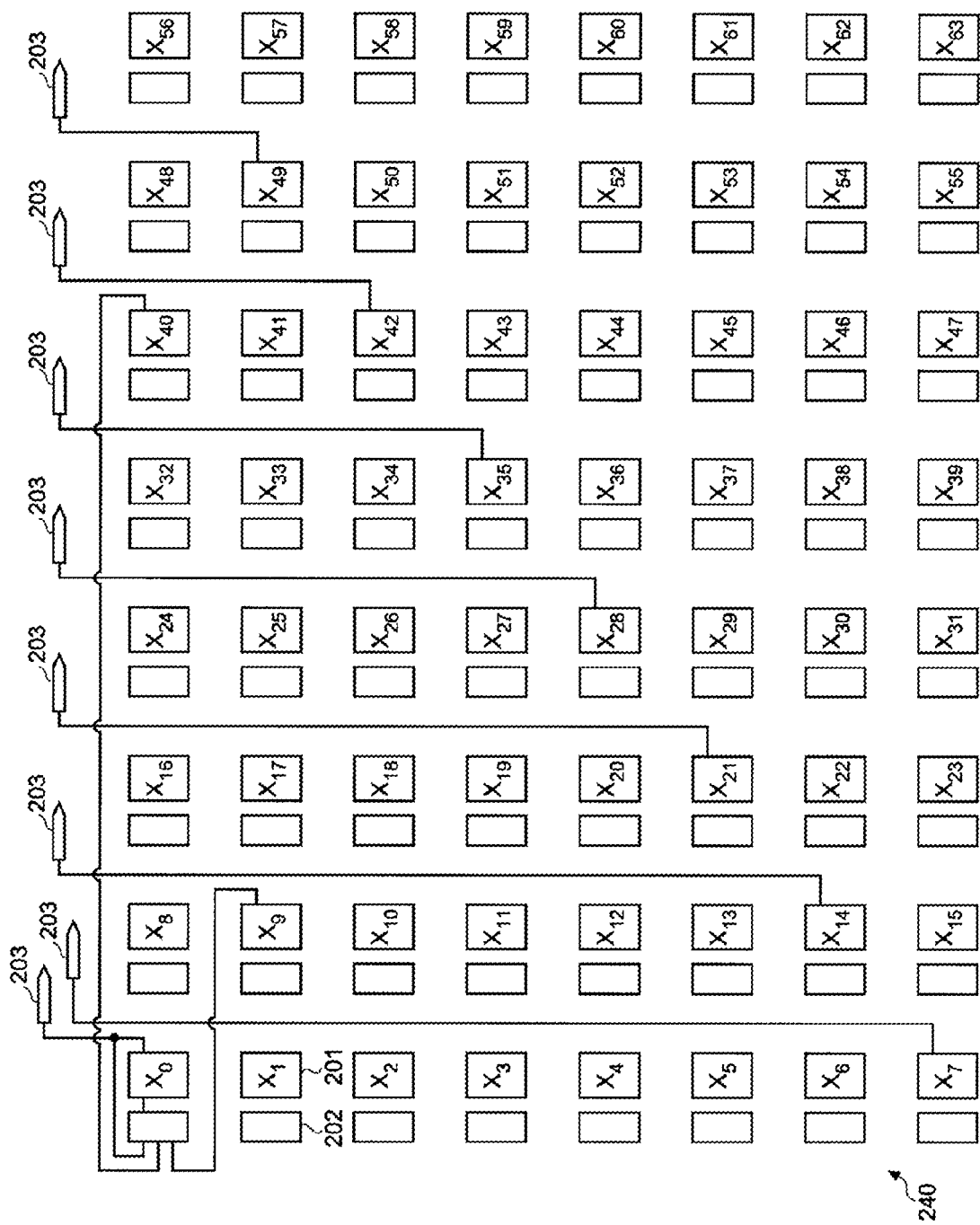
FIG. 26 illustrates a main random number generator according to a fifth embodiment, including a lagged Fibonacci random number generator.

FIG. 26 illustrates one example of a main random number generator according to a fifth embodiment, in which a lagged Fibonacci random number generator is used. In FIG. 26, $X_0$, $X_7$, $X_{14}$, $X_{21}$, $X_{28}$, $X_{35}$, $X_{42}$, and $X_{49}$ are selected as an example of discontinuous eight bits to be taken out.

In a main random number generator 240 illustrated in FIG. 26, eight bit elements to be taken out (the flip-flop 201 and the input circuit 202) are arranged at intervals of seven bits which is a prime number. As described in the fourth embodiment, for a certain bit in a lagged Fibonacci sequence, a bit before 24 bits and a bit before 55 bits have correlation. For that reason, taking bits at intervals of seven bits that is coprime to 24 and 55 can significantly weaken correlation between taken bits.

In the case of the number of taken bits being equal to, for example, 16 bits, bits may be taken at intervals of, for example, 13 bits that is another prime number coprime to 24 and 55, since 56 bits are eight times 7 bits. In this case, a pseudorandom sequence obtained is a bit string taken from, for example, $X_0$, $X_{13}$, $X_{26}$, $X_{39}$, $X_{52}$, $X_9$, $X_{22}$, $X_{35}$, $X_{48}$, $X_5$, $X_{18}$, $X_{31}$, $X_{44}$, $X_1$, $X_{14}$, and $X_{27}$. The bit to be taken is determined by using (52+13) mod 56=(65) mod 56=9 or the like.

As above, taking bits from the main random number generator 240 at bit intervals of a prime number coprime to bit intervals (for example, 24-bit intervals and 55-bit intervals) at which correlation arises in a lagged Fibonacci sequence can significantly weaken correlation between taken bits. Consequently, a pseudorandom sequence having good randomness can be generated.

In a lagged Fibonacci sequence, there is no or significantly weak correlation between adjacent bits as understood from the recursive formula (3). For that reason, X(7:0) can be used if 8-bit output is produced, and X(15:0) can be used if 16-bit output is produced.

Other configurations, operations, and effects are the same as the above embodiments, and duplicate descriptions thereof will not be provided.

Sixth Embodiment

While the above fourth embodiment illustrates the case of generating a seed of the long-cycle main random number generator by using one short-cycle sub random number generator, a sixth embodiment will be illustratively described in the case of generating a seed of the main random number generator by using a plurality of sub random number generators.

Examples of the plurality of sub random number generators can include total eight sub random number generators of two M13-sequence pseudorandom number generators, two M17-sequence pseudorandom number generators, two M19-sequence pseudorandom number generators, and two M23-sequence pseudorandom number generators. Examples of a seed table in this case can be illustrated by the following two examples.

First example: Prepare a seed table for each of one or more M-sequences that include an M-sequence (an M23-sequence in the above example) requiring the longest seed of M-sequences used, and use a part of seeds in any prepared seed table for other sequences.

Second example: Prepare a dedicated seed table for each M-sequence.

In the case of the above first example, the size of a seed table can be decreased, but it is not assured that generated pseudorandom sequences do not have an overlap for other than the M-sequence (for example, the M23-sequence) for which a seed table is prepared. In the case of the second example, pseudorandom sequences can be generated without generating an overlap, but the size of a seed table is increased.

In the sixth embodiment, the sub random number generator is used for the purpose of generating a seed of the main random number generator. For that reason, the quality of a random number (randomness) of a seed generated by the sub random number generator is tolerated. In the case of the cycle of the main random number generator being significantly long such as approximately 100 times to 1,000 times the length of data of a target of use (for example, data with which XOR is calculated), the proportion of actually used pseudorandom sequences in pseudorandom sequences that can be generated by the main random number generator is small. Thus, the possibility of an overlap being generated in a pseudorandom sequence that is actually used according to selection of a seed given to the sub random number generator is considered to be significantly low. For example, the possibility of an overlap between pseudorandom sequences generated at the time of giving two seeds to the sub random number generator of a CRC-32 type is a probability of approximately $1/1{,}000$ to $1/100$. In addition, since the cycle of lagged Fibonacci is 8M times the cycle of CRC-32, the possibility of an overlap between two generated pseudorandom sequences is a probability of $1/8M$. This is the same for other embodiments.

As above, configuring a seed given to the main random number generator to be generated by using the plurality of sub random number generators can increase randomness of a seed given to the main random number generator. In addition, for example, the case of desire to decrease the size of a seed table prepared for the plurality of sub random number generators can be flexibly dealt with.

Other configurations, operations, and effects are the same as the above embodiments, and duplicate descriptions thereof will not be provided.

Seventh Embodiment

As in the above fifth embodiment, in the case of outputting a few discontinuous bits from a lagged Fibonacci sequence, increasing the number of used flip-flops can configure more bits to be output in one cycle. In view of this, in a seventh embodiment, a randomizer and a semiconductor storage device that can output 16-bit data in one cycle will be described with a specific example.

Figure 27:
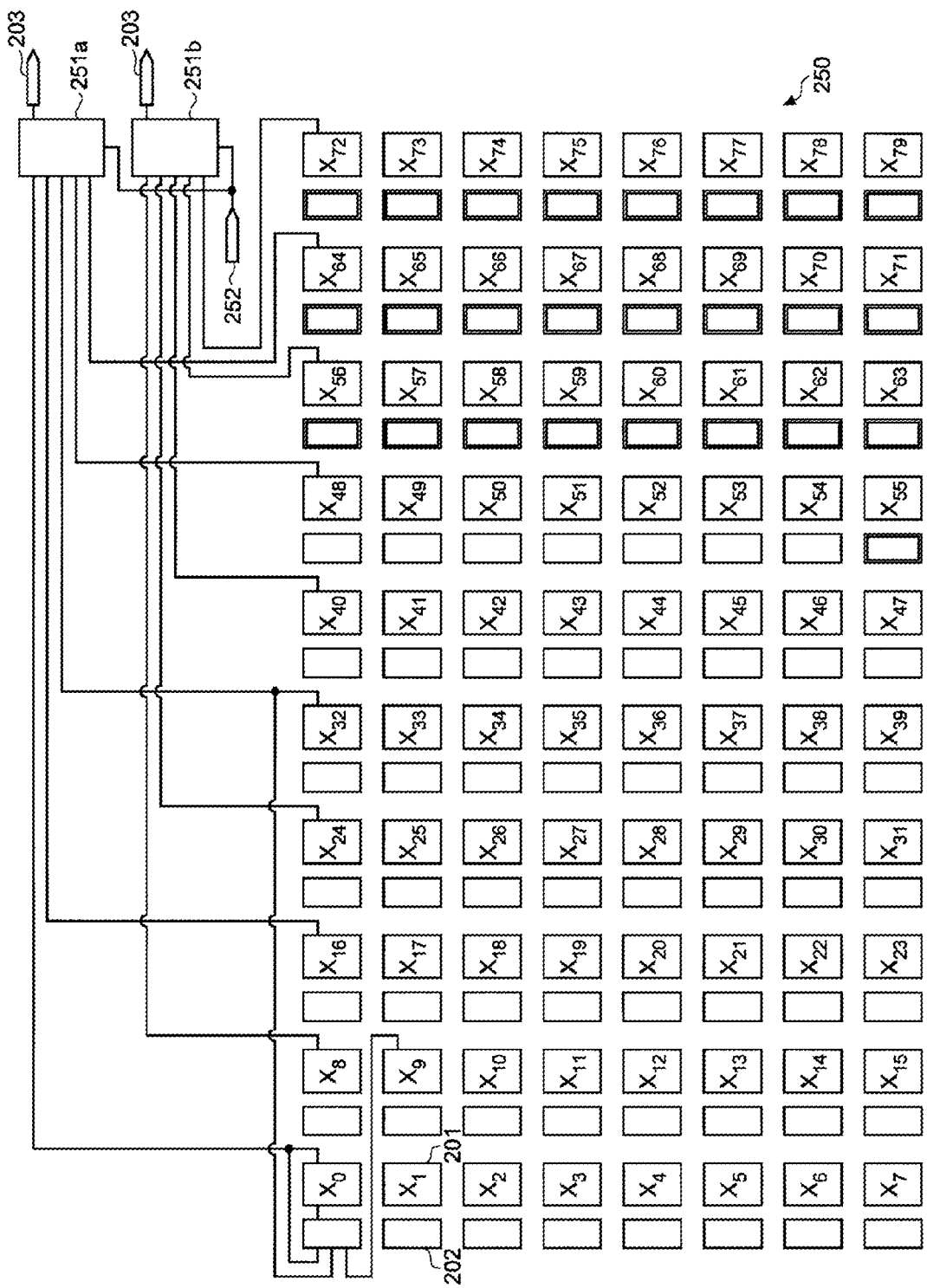
FIG. 27 illustrates an example of a main random number generator according to a seventh embodiment.
Figure 28:
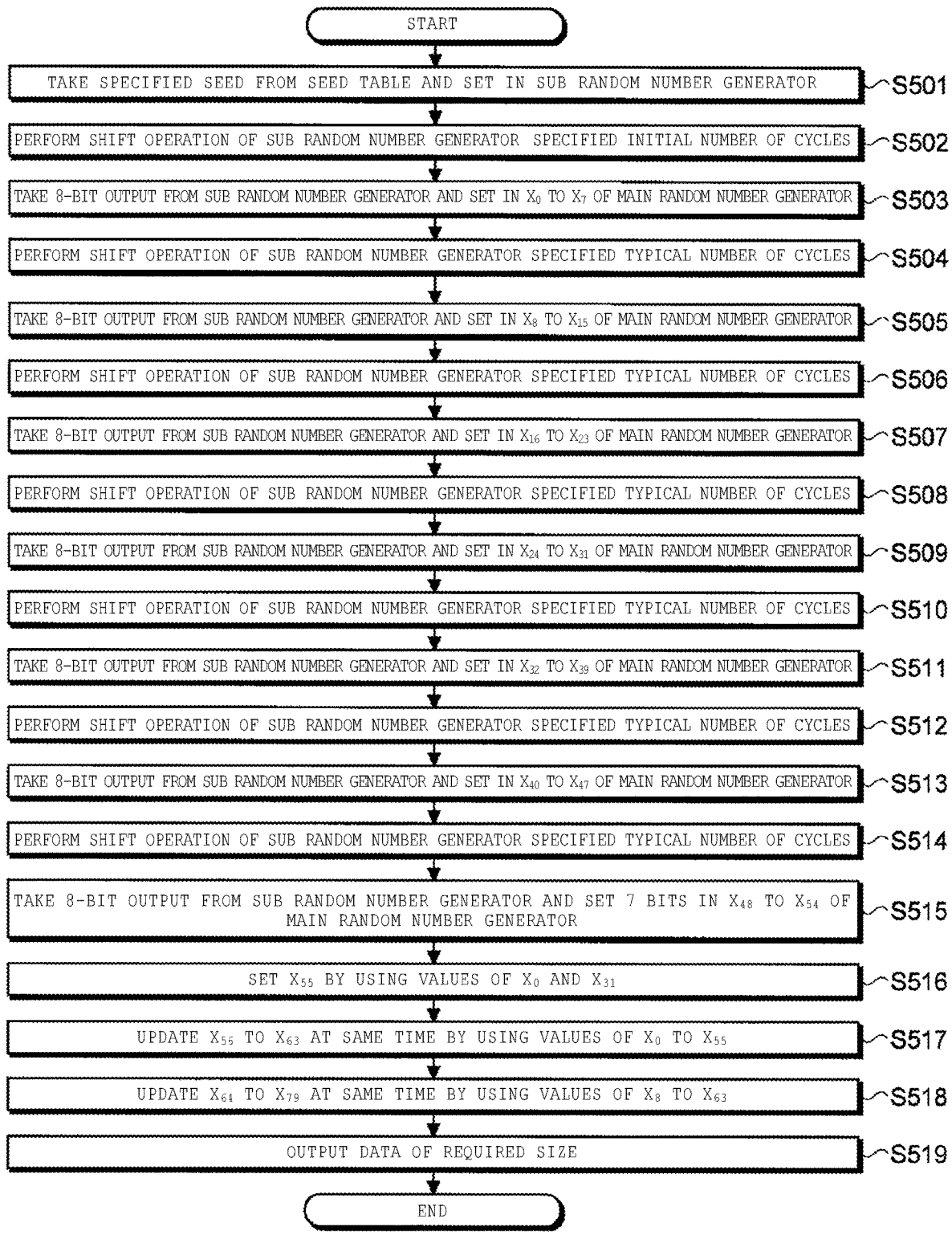
FIG. 28 is a flowchart illustrating an operation carried out when a pseudorandom sequence generated by a sub random number generator is used as a seed of the main random number generator illustrated in FIG. 27.

FIG. 27 illustrates one example of a main random number generator according to the seventh embodiment, and FIG. 28 illustrates an operating example at the time of using a pseudorandom sequence generated by a sub random number generator as a seed of the main random number generator illustrated in FIG. 27. A main random number generator 250 illustrated in FIG. 27 is a lagged Fibonacci random number generator that is configured to output 16-bit data in one cycle.

As illustrated in FIG. 27, the main random number generator 250 according to the seventh embodiment has a configuration in which 80 elements configured with the flip-flop 201 and the input circuit 202 are arranged in an 8-row and 10-column matrix. The main random number generator 250 includes an output selector 251a connected to the Q outputs of the flip-flops 201 in the first column, the third column, the fifth column, the seventh column, and the ninth column, and an output selector 251b connected to the Q outputs of the flip-flops 201 in the second column, the fourth column, the sixth column, the eighth column, and the tenth column. The output selectors 251a and 251b switch the output thereof in synchronization with an input select signal on the basis of an output select signal 252 that is obtained by delaying the input select signals 2024 and 2025 in the input circuit 202 by one cycle (or two cycles).

The main random number generator 250 illustrated in FIG. 27 is operated in accordance with, for example, a procedure illustrated in Steps S501 to S521 and a natural extension thereof (Step S522) described in FIG. 28 and below, and thereby generates a pseudorandom sequence of a required size. The Steps S501 to S517 are the same as the operation described by using the Steps S101 to S117 of FIG. 24 above, and duplicate descriptions thereof will not be provided.

(Step S518) $X_{64}$ to $X_{79}$ of the main random number generator 250 are updated at the same time by using the values of $X_8$ to $X_{63}$. The value of X(j) is set to $X_i$ that corresponds to i=j mod 80. The inputs of $X_{64}$ to $X_{79}$ are implemented in the XOR circuit 2023 that is in accordance with the recursive formula (3) of lagged Fibonacci corresponding to $X_{64}$ to $X_{79}$.

(Step S519) Data of a required size are output from the main random number generator 250 after values are set in $X_0$ to $X_{79}$ of the main random number generator 250 as above.

Figure 29:
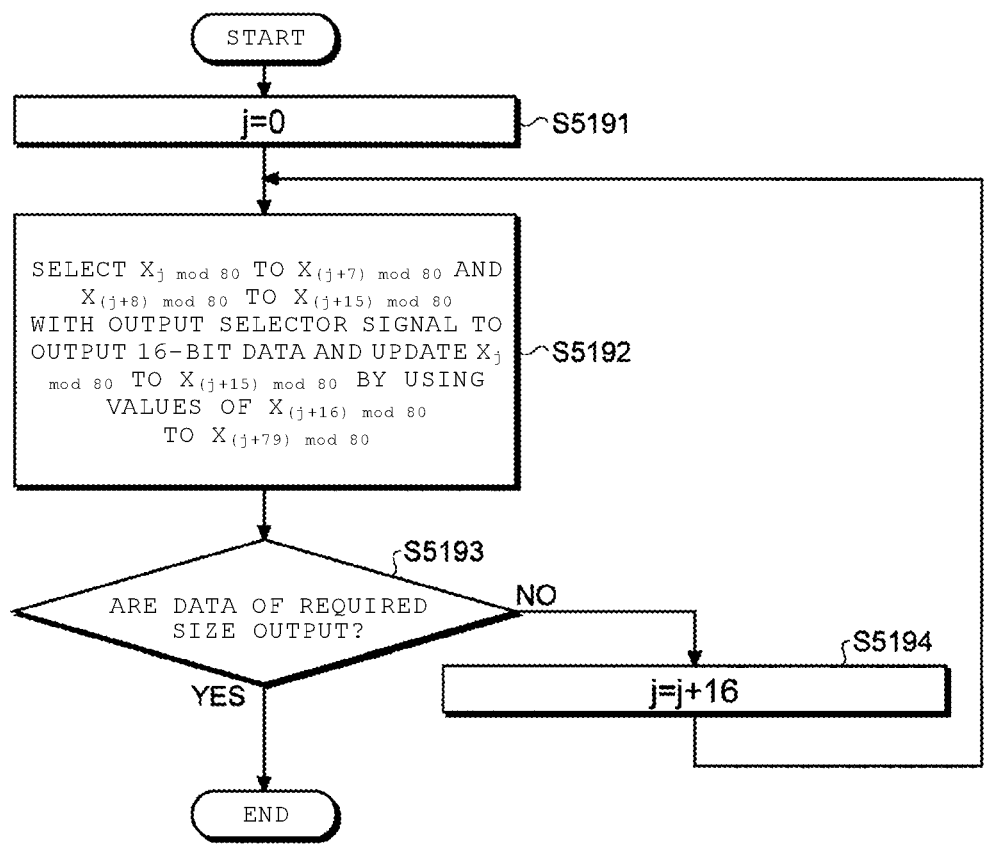
FIG. 29 is a flowchart illustrating a specific example of an operation illustrated in Step S519 of FIG. 28.

In the Step S519 of FIG. 28, for example, an operation illustrated in FIG. 29 is performed. In the operation illustrated in FIG. 29, first, the value of j that specifies a term of the recursive formula (3) is reset to 0 (Step S5191).

Next, 16-bit data are output by selecting $X_{i\ mod\ 80}$ to $X_{(j+7)\ mod\ 80}$ and $X_{(j+8)\ mod\ 80}$ to $X_{(j+15)\ mod\ 80}$ with an output selector signal, and $X_{j\ mod\ 80}$ to $X_{(j+15)\ mod\ 80}$ are updated by using the values of $X_{(j+16)\ mod\ 80}$ to $X_{(j+79)\ mod\ 80}$ (Step S5192).

Next, a determination of whether or not data of a required size are output is performed (Step S5193). If data of the required size are not output (NO in the Step S5193), j is incremented by 16 (Step S5194), and then the operation returns to the Step S5191. Meanwhile, if data of the required size are output (YES in the Step S5193), the present operation is ended.

In the operation illustrated in FIG. 28 and FIG. 29, $X_i$ that has the index i corresponding to j mod 80, (j-24) mod 80, and (j-55) mod 80 is used in X(j), X(j-24), and X(j-55). While one of $X_{55}$ is updated in the Step S516 and eight of $X_{56}$ to $X_{63}$ in the Step S517, update is performed in units of 16 after Step S518.

While the operating example illustrated in FIG. 28 and FIG. 29 is configured to update 16 bits in one cycle and take 16 bits of data at a time, this configuration is considered to be sufficient for generating a required pseudorandom sequence from the following reasons since the main random number generator 250 includes the 80-bit flip-flops 201 of $X_0$ to $X_{79}$. The first reason is that since 16 bits to be updated reference 64 non-updated bits, operation in accordance with the recursive formula (3) can be performed. The second reason is that when 16 bits are updated, 16 flip-flops 201 selected by the output select signal 252 are not referenced from now on and thus can be assigned to the next 16 bits to be updated.

Increasing the number of logical outputs (fan out) output from the flip-flop 201 to the output selectors 251a and 251b can decrease the number of flip-flops 201 of the main random number generators 250 illustrated in FIG. 27 by eight to 72. However, in the seventh embodiment, the main random number generator 250 is configured with 80 flip-flops 201 that are five times the 16-bit output, in order to decrease the number of interconnections connecting the output selectors 251a and 251b and the flip-flop 201 by half.

Other configurations, operations, and effects are the same as the above embodiments, and duplicate descriptions thereof will not be provided.

Eighth Embodiment

In an eighth embodiment, a randomizer and a semiconductor storage device that can output 24-bit data in one cycle by increasing the number of used flip-flops will be described with a specific example.

Figure 30:
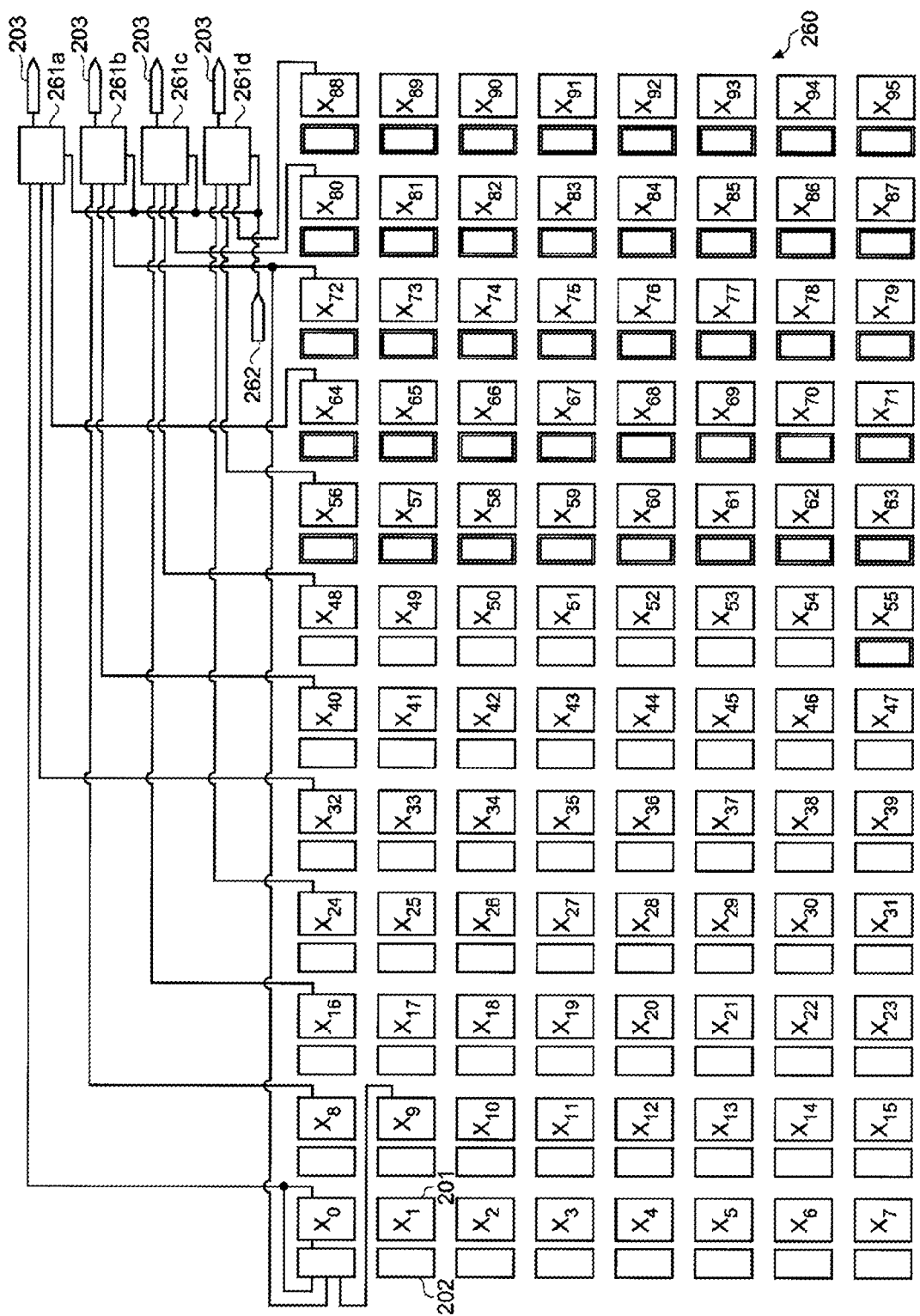
FIG. 30 illustrates a main random number generator according to an eighth embodiment.
Figure 31:
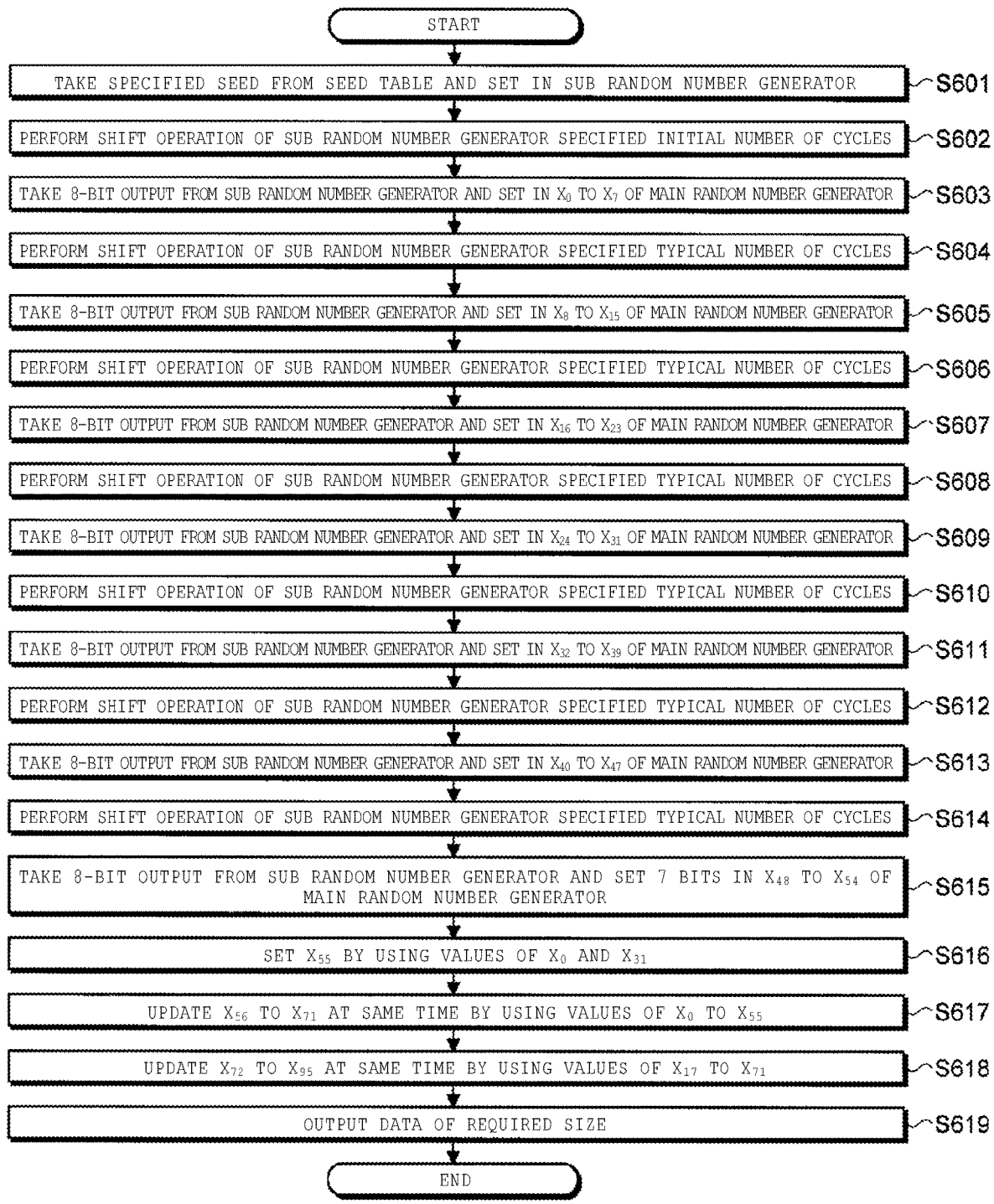
FIG. 31 is a flowchart illustrating an operation carried out when a pseudorandom sequence generated by a sub random number generator is used as a seed of the main random number generator illustrated in FIG. 30.

FIG. 30 illustrates one example of a main random number generator according to the eighth embodiment, and FIG. 31 illustrates an operating example at the time of using a pseudorandom sequence generated by a sub random number generator as a seed of the main random number generator illustrated in FIG. 30. A main random number generator 260 illustrated in FIG. 30 is a lagged Fibonacci random number generator that is configured to output 24-bit data in one cycle.

As illustrated in FIG. 30, the main random number generator 260 according to the eighth embodiment has a configuration in which 96 elements configured with the flip-flop 201 and the input circuit 202 are arranged in an 8-row and 12-column matrix. In addition, the main random number generator 260 includes four output selectors 261a to 261d.

The output selector 261a is connected to the Q outputs of the flip-flops 201 in the first column, the fifth column, and the ninth column. The output selector 261b is connected to the Q outputs of the flip-flops 201 in the second column, the sixth column, and the tenth column. The output selector 261c is connected to the Q outputs of the flip-flops 201 in the third column, the seventh column, and the eleventh column. The output selector 261d is connected to the Q outputs of the flip-flops 201 in the fourth column, the eighth column, and the twelfth column. Each of the output selectors 261a to 261d switches the output thereof in synchronization with an input select signal on the basis of an output select signal 262 that is obtained by delaying the input select signals 2024 and 2025 in the input circuit 202 by one cycle (or two cycles).

The main random number generator 260 illustrated in FIG. 30 is operated in accordance with, for example, a procedure illustrated in Steps S601 to S621 and a natural extension thereof (Step S622) described in FIG. 31 and below, and thereby generates a pseudorandom sequence of a required size. The Steps S601 to S616 are the same as the operation described by using the Steps S101 to S116 of FIG. 24 above, and duplicate descriptions thereof will not be provided.

(Step S617) $X_{56}$ to $X_{71}$ of the main random number generator 260 are updated at the same time by using the values of $X_0$ to $X_{55}$. The input of each of $X_{56}$ to $X_{71}$ is implemented in the XOR circuit 2023 that is in accordance with the recursive formula (3) of lagged Fibonacci.

(Step S618) $X_{72}$ to $X_{95}$ of the main random number generator 260 are updated at the same time by using the values of $X_{17}$ to $X_{71}$. The value of X(j) is set to $X_i$ that corresponds to i=j mod 96. The inputs of $X_{72}$ to $X_{95}$ are implemented in the XOR circuit 2023 that is in accordance with the recursive formula (3) of lagged Fibonacci corresponding to $X_{72}$ to $X_{95}$.

(Step S619) Data of a required size are output from the main random number generator 260 after values are set in $X_0$ to $X_{95}$ of the main random number generator 260 as above.

Figure 32:
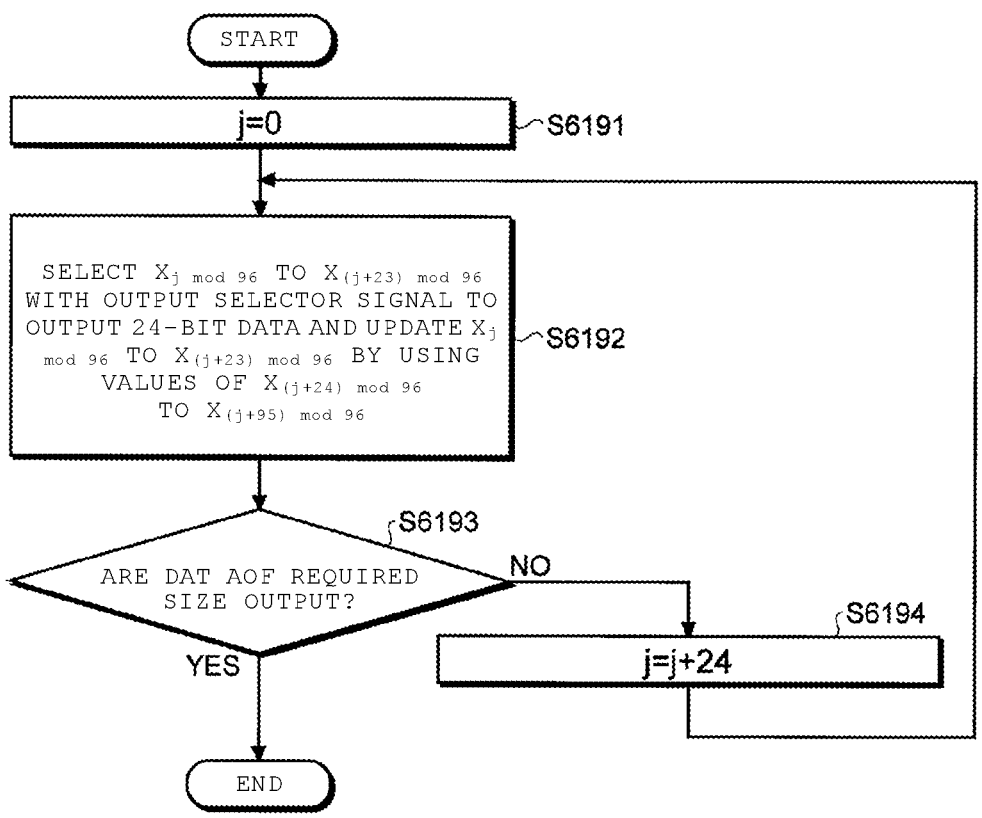
FIG. 32 is a flowchart illustrating a specific example of an operation illustrated in Step S619 of FIG. 31.

In the Step S619 of FIG. 31, for example, an operation illustrated in FIG. 32 is performed. In the operation illustrated in FIG. 32, first, the value of j that specifies a term of the recursive formula (3) is reset to 0 (Step S6191).

Next, 24-bit data are output by selecting $X_{j \bmod 96}$ to $X_{(j+23) \bmod 96}$ with an output selector signal, and $X_{j \bmod 96}$ to $X_{(j+15) \bmod 96}$ are updated by using the values of $X_{(j+24) \bmod 96}$ to $X_{(j+95) \bmod 96}$ (Step S6192).

Next, a determination of whether or not data of a required size are output is performed (Step S6193). If data of the required size are not output (NO in the Step S6193), j is incremented by 24 (Step S6194), and then the operation returns to the Step S6191. Meanwhile, id data of the required size are output (YES in the Step S6193), the present operation is ended.

In the operation illustrated in FIG. 31 and FIG. 32, $X_i$ that has the index i corresponding to j mod 96, (j-24) mod 96, and (j-55) mod 96 is used in X(j), X(j-24), and X(j-55). While one of $X_{55}$ is updated in the Step S616 and 16 of $X_{56}$ to $X_{71}$ in the Step S617, update is performed in units of 24 from the Step S618.

While the operating example illustrated in FIG. 31 and FIG. 32 is configured to update 24 bits in one cycle and take 24 bits of data at a time, this configuration is considered to be sufficient for generating a required pseudorandom sequence from the following reasons since the main random number generator 260 includes the 96-bit flip-flops 201 of $X_0$ to $X_{95}$. The first reason is that since 24 bits to be updated reference 72 non-updated bits, operation in accordance with the recursive formula (3) can be performed. The second reason is that when 24 bits are updated, 24 flip-flops 201 selected by the output select signal 262 are not referenced from now on and thus can be assigned to the next 24 bits to be updated.

Increasing the number of logical outputs (fan out) from the flip-flop 201 to the output selectors 261a to 261d can decrease the number of flip-flops 201 of the main random number generators 260 illustrated in FIG. 30 by 16 to 80. However, in the eighth embodiment, the main random number generator 260 is configured with 96 flip-flops 201 that are three times the 24-bit output in order to decrease the number of interconnections connecting the output selectors 261a to 261d and the flip-flop 201 by one third.

Other configurations, operations, and effects are the same as the above embodiments, and duplicate descriptions thereof will not be provided.

Ninth Embodiment

Next, a randomizer and a semiconductor storage device according to a ninth embodiment will be described in detail below. In the ninth embodiment, a new pseudorandom sequence is generated by calculating XOR (or XNOR) of a pseudorandom sequence output from a short-cycle sub random number generator and a pseudorandom sequence output from a long-cycle main random number generator in the same manner as the fourth embodiment.

A long-cycle pseudorandom number generator generally has a part, not the entirety, of generated pseudorandom sequences used in writing or the like of data and thus can generate a pseudorandom sequence that is completely independent of a random number testing target. However, using only a part of generated pseudorandom sequences indicates that bias may be generated in the probability of appearance of a pattern of a subsequence generated by a pseudorandom sequence according to a seed. As a simple example, maximum 31 bits of "0" may be continuous in a pseudorandom number generator of, for example, a CRC-32 type, and such a pseudorandom sequence is a pseudorandom sequence inappropriate for the purpose of avoiding the case of eight or more continuous bits of "0".

A pseudorandom sequence generated by a short-cycle pseudorandom number generator has the most part thereof (for example, a part of ½ or more) repeatedly used, for example, four times or more. For that reason, in the case of using the short-cycle pseudorandom number generator, the probability of appearance of a pattern of a subsequence generated by a pseudorandom sequence is almost even, while the same pseudorandom sequence appears a plurality of times. In addition, since the cycle of the generated pseudorandom sequence is short, the length of continuous "0"s is shorter than the cycle of the pseudorandom sequence generated by the long-cycle pseudorandom number generator. Furthermore, the short-cycle pseudorandom number generator has a smaller circuit size than the long-cycle pseudorandom number generator. Given that the number of bits of a shift register (LFSR) is c, the circuit size of the short-cycle pseudorandom number generator is a size proportional to c (O(c) when Landau notation is used).

In the ninth embodiment, a new pseudorandom sequence is generated by calculating XOR (or XNOR) of a pseudorandom sequence output from the short-cycle sub random number generator and a pseudorandom sequence output from the long-cycle main random number generator. For example, the cycle of a pseudorandom sequence generated by a pseudorandom number generator of a CRC-32 type is $2^{32}-1$, and the cycle of a pseudorandom sequence generated by 13-bit LFSR is $2^{13}-1$. For that reason, both are not completely synchronized with each other, and the possibility of weak synchronization is low. Thus, calculating XOR (or XNOR) of a pseudorandom sequence output from the short-cycle sub random number generator and a pseudorandom sequence output from the long-cycle main random number generator can generate a pseudorandom sequence having a good testing result.

Typically, in the case of not being able to sufficiently secure the number of seeds due to a size constraint or the like of a seed table, a required number of seeds are secured by, for example, scrambling a seed value or rotating bit assignment. However, the ninth embodiment employs different methods for each pseudorandom number generator as such operations. For example, in the long-cycle main random number generator, an idling process of eight cycles is performed after a seed value is given. Meanwhile, in the short-cycle sub random number generator, rotation of bit assignment is performed by 8-bit alignment. Performing different processes independently for each pseudorandom number generator for a scrambling process can cancel synchronization in the case of generation of weak synchronization, and consequently a pseudorandom sequence having a good testing result can be generated. A pseudorandom sequence generated in the short-cycle pseudorandom number generator may be used as a seed of the long-cycle main random number generator. In this case, the short-cycle pseudorandom number generator that is used in creation of a seed of the main random number generator may be reused as the short-cycle sub random number generator.

Other configurations, operations, and effects are the same as the above embodiments, and duplicate descriptions thereof will not be provided.

Tenth Embodiment

Next, a randomizer and a semiconductor storage device according to a tenth embodiment will be described in detail below. In the tenth embodiment, a new pseudorandom sequence is generated by calculating XOR (or XNOR) of a pseudorandom sequence output from a long-cycle main random number generator and a pseudorandom sequence output from a long-cycle sub random number generator. The main random number generator and the sub random number generator desirably have different cycles.

The tenth embodiment illustrates the case of using a pseudorandom number generator of a lagged Fibonacci sequence type as the main random number generator and a pseudorandom number generator of a CRC-32 type as the sub random number generator. A seed used in each of the main random number generator and the sub random number generator may be generated by using a short-cycle pseudorandom number generator other than the two long-cycle pseudorandom number generators as illustrated in the above embodiments. In addition, since the main random number generator and the sub random number generator have different random sequences, the same seed may be input into the two pseudorandom number generators. Furthermore, the same seed may be given to a short-cycle pseudorandom number generator other than the two pseudorandom number generators, and 2-sequence pseudorandom sequences generated thereby may be input as seeds into each of the main random number generator and the sub random number generator. Furthermore, in order to reduce the amount of hardware, 2-sequence pseudorandom sequences that are given as seeds into each of the main random number generator and the sub random number generator may be generated by sharing another short-cycle pseudorandom number generator in the main random number generator and the sub random number generator and changing a seed to be input into the short-cycle pseudorandom number generator.

As described above, a long-cycle pseudorandom number generator generally has a part, not the entirety, of generated pseudorandom sequences used in writing or the like of data and thus can generate a pseudorandom sequence that is completely independent of a random number testing target. However, using only a part of generated pseudorandom sequences indicates that bias may be generated in the probability of appearance of a pattern of a subsequence generated by a pseudorandom sequence according to a seed.

In the tenth embodiment, a new pseudorandom sequence is generated by calculating XOR (or XNOR) of pseudorandom sequences output from two long-cycle pseudorandom number generators. For example, the cycle of a lagged Fibonacci sequence is $2^{55}-1$, and the cycle of CRC-32 is $2^{32}-1$. Thus, both are not completely synchronized with each other, and the possibility of generation of weak synchronization is low. In addition, since the cycles are independent of each other, the entire cycle is approximately $2^{87}$ ($\approx(2^{55}-1)\times(2^{32}-1)$).

Typically, in the case of not being able to sufficiently secure the number of seeds due to a size constraint or the like of a seed table, a required number of seeds are secured by, for example, scrambling a seed value or rotating bit assignment. However, the tenth embodiment employs different methods for each pseudorandom number generator as such operations. For example, in the long-cycle main random number generator, an idling process of eight cycles is performed after a seed value is given. Furthermore, in the long-cycle sub random number generator, the output of the sub random number generator may have a bit layout thereof swapped and then may be used as a seed of the main random number generator. In this bit swapping method, for example, eight bits output in one cycle by the sub random number generator are swapped by a rule below and is then used as a part of a seed of the main random number generator. In the rule illustrated below, the left side indicates the layout of output bits of the sub random number generator (in the order of bit #0→#1→#2→#3→#4→#5→#6→#7), and the right side indicates the layout of bits after swapping, that is, the bit layout of a seed used for the main random number generator (in the order of #6→#7→#4→#5→#2→#3→#0→#1).

(Before Swapping→After Swapping)
Bit #0→Bit #6
Bit #1→Bit #7
Bit #2→Bit #4
Bit #3→Bit #5
Bit #4→Bit #2
Bit #5→Bit #3
Bit #6→Bit #0
Bit #7→Bit #1

In the case of applying the rule illustrated above, 8-bit output bits "00101011" that are output from the sub random number generator in one cycle are changed to "11101000". While bits are swapped within the output of the sub random number generator in one cycle in this example, various modifications can be made, such as performing swapping within 55 bits that are the number of bits of a seed of the main random number generator.

Performing different processes independently for each pseudorandom number generator for a scrambling process can cancel synchronization in the case of generation of weak synchronization, and consequently a pseudorandom sequence having a good testing result can be generated.

Other configurations, operations, and effects are the same as the above embodiments, and duplicate descriptions thereof will not be provided.

Eleventh Embodiment

Next, a randomizer and a semiconductor storage device according to an eleventh embodiment will be described in detail below. In the eleventh embodiment, a new pseudorandom sequence is generated by calculating XOR (or XNOR) of a pseudorandom sequence output from a short-cycle main random number generator and a pseudorandom sequence output from a short-cycle sub random number generator. The main random number generator and the sub random number generator desirably have different cycles. In the following description, the case of employing an M23-sequence as the short-cycle main random number generator and employing an M17-sequence as the short-cycle sub random number generator will be illustrated.

As described above, a pseudorandom sequence generated by a short-cycle pseudorandom number generator has the most part thereof (for example, a part of ½ or more) repeatedly used, for example, four times or more. For that reason, in the case of using the short-cycle pseudorandom number generator, the probability of appearance of a pattern of a subsequence generated by a pseudorandom sequence is almost even, while the same pseudorandom sequence appears a plurality of times. In addition, since the cycle of the generated pseudorandom sequence is short, the length of continuous "0"s is shorter than the cycle of the pseudorandom sequence generated by the long-cycle pseudorandom number generator. Furthermore, the short-cycle pseudorandom number generator has a smaller circuit size than the long-cycle pseudorandom number generator. Given that the number of bits of a shift register (LFSR) is c, the circuit size of the short-cycle pseudorandom number generator is a size proportional to c (O(c) when Landau notation is used).

In the case of using two short-cycle pseudorandom number generators as in the eleventh embodiment, given that the lengths of shift registers used in each pseudorandom number generator are K1 and K2, the cycle of a generated pseudorandom sequence is $(2^{K1}-1) \times (2^{K2}-1) = 2^{(K1+K2)} - 2^{K1} - 2^{K2} + 1$, and the circuit size is $O(K1) + O(K2) = O(K1+K2)$ ($O(K1) \approx O(K2)$). When these are compared with the cycle $2^{(K1+K2)}$ and the circuit size $O(K1+K2)$ of a short-cycle pseudorandom number generator having a shift register length of K1+K2, the circuit size can be regarded as being almost the same, and the cycle can also be regarded as being almost the same although the cycle is shorter by approximately $(2^{K1}+2^{K2})$.

From above, in the case of combining two or more short-cycle pseudorandom number generators, a randomizer and a semiconductor storage device having the same circuit size and a slightly short cycle compared with a single pseudorandom number generator (LFSR) having the same shift register length as the total shift register length of the short-cycle pseudorandom number generators can be realized. In addition, combining two or more short-cycle pseudorandom number generators can adjust a property (testing result or the like) of a generated pseudorandom sequence by selecting pseudorandom number generators to be combined, and thus the degree of freedom in design for obtaining a pseudorandom sequence of desired randomness can be increased.

Typically, in the case of not being able to sufficiently secure the number of seeds due to a size constraint or the like of a seed table, a required number of seeds are secured by, for example, scrambling a seed value or rotating bit assignment. However, the eleventh embodiment employs different methods for each pseudorandom number generator as such operation. For example, in the short-cycle main random number generator, an idling process of eight cycles is performed after a seed value is given. Meanwhile, in the short-cycle sub random number generator, rotation of bit assignment is performed by 8-bit alignment. Performing different processes independently for each pseudorandom number generator for a scrambling process can cancel synchronization in the case of generation of weak synchronization, and consequently a pseudorandom sequence having a good testing result can be generated. A pseudorandom sequence generated in the short-cycle pseudorandom number generator may be used as a seed of the short-cycle main random number generator. In this case, the short-cycle pseudorandom number generator that is used in creation of a seed of the main random number generator may be reused as the short-cycle sub random number generator.

Other configurations, operations, and effects are the same as the above embodiments, and duplicate descriptions thereof will not be provided.

Twelfth Embodiment

Next, a randomizer and a semiconductor storage device according to a twelfth embodiment will be described in detail below with reference to the drawings. The twelfth embodiment will be illustratively described in the case of randomizing data in both of an inter-page direction and an inter-column direction of a nonvolatile memory (for example, a NAND memory).

Along with an increase in the capacity and the speed of the nonvolatile memory, a reduction in an increase in the circuit size and an improvement in randomness are also required for a function of performing a randomization process on data stored in a memory. Generally, in the case of using a pseudorandom sequence generated from an M-sequence or the like that is appropriate for randomization in the inter-column direction, an object is to achieve sufficient randomness in the inter-page direction.

A method for shifting a pseudorandom sequence generated from an M-sequence by a predetermined number of bits (N bits) for each page address is considered as a technique for achieving randomness in the inter-page direction. However, variation in the amount of shift N is required to be increased along with an increase in the capacity of the NAND memory in this technique. For that reason, the number of circuits that perform a shifting process is increased in proportion to an increase in the variation.

Rendering seeds set in an M-sequence to be completely different in the inter-page direction is also considered as another technique for achieving randomness in the inter-page direction. However, in the case of an increase in the number of pages along with an increase in the capacity of a memory, the size of a seed table in which seeds are registered is proportionally increased according to this technique. For that reason, the circuit size is increased in the same manner as the above technique.

In the twelfth embodiment, a randomizer and a semiconductor storage device that can achieve compatibility of securing randomness and reducing a circuit size will be described with an example. According to the twelfth embodiment described below, a scrambling function that rewrites data stored in the nonvolatile memory can also be realized by a simple circuit configuration.

In the twelfth embodiment, a shift operation or a bit rotation operation is performed on a pseudorandom sequence generated from the randomizer in order to realize desired randomness while an increase in the circuit size is reduced. Furthermore, in order to realize the scrambling function that prevents data of the same pattern from being repeatedly written into each memory cell in the nonvolatile memory, bit inversion is performed on a data stream output from the randomizer in multilevel page units.

Figure 33:
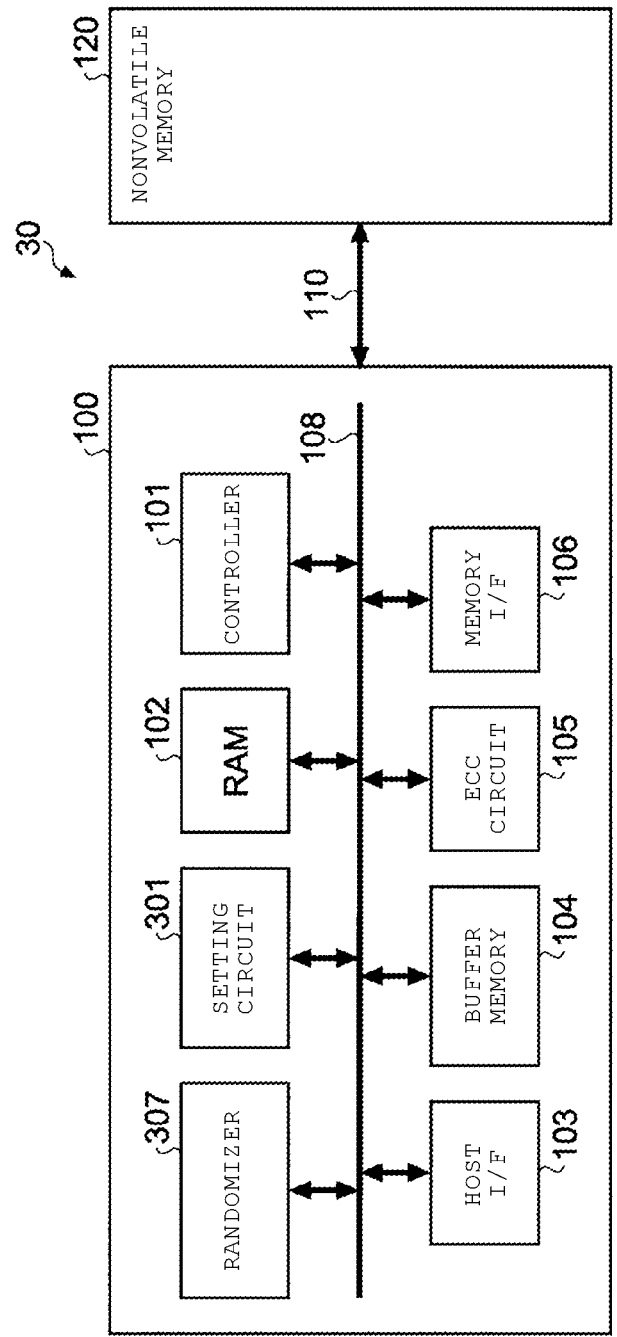
FIG. 33 is a block diagram of a semiconductor storage device according to a twelfth embodiment.

FIG. 33 is a block diagram of a semiconductor storage device according to a twelfth embodiment. As illustrated in FIG. 33, a semiconductor storage device 30 has the same configuration as the semiconductor storage device 10 illustrated in FIG. 1 except that the randomizer 107 of FIG. 1 is changed to a randomizer 307. In addition, the semiconductor storage device 30 further includes a setting circuit 301.

The setting circuit 301 specifies a specified page number, a frame offset number, and a scrambling value and inputs these values into the randomizer 307 in accordance with, for example, an instruction from the controller 101 into which a write request/a read request from the host is input.

Figure 34:
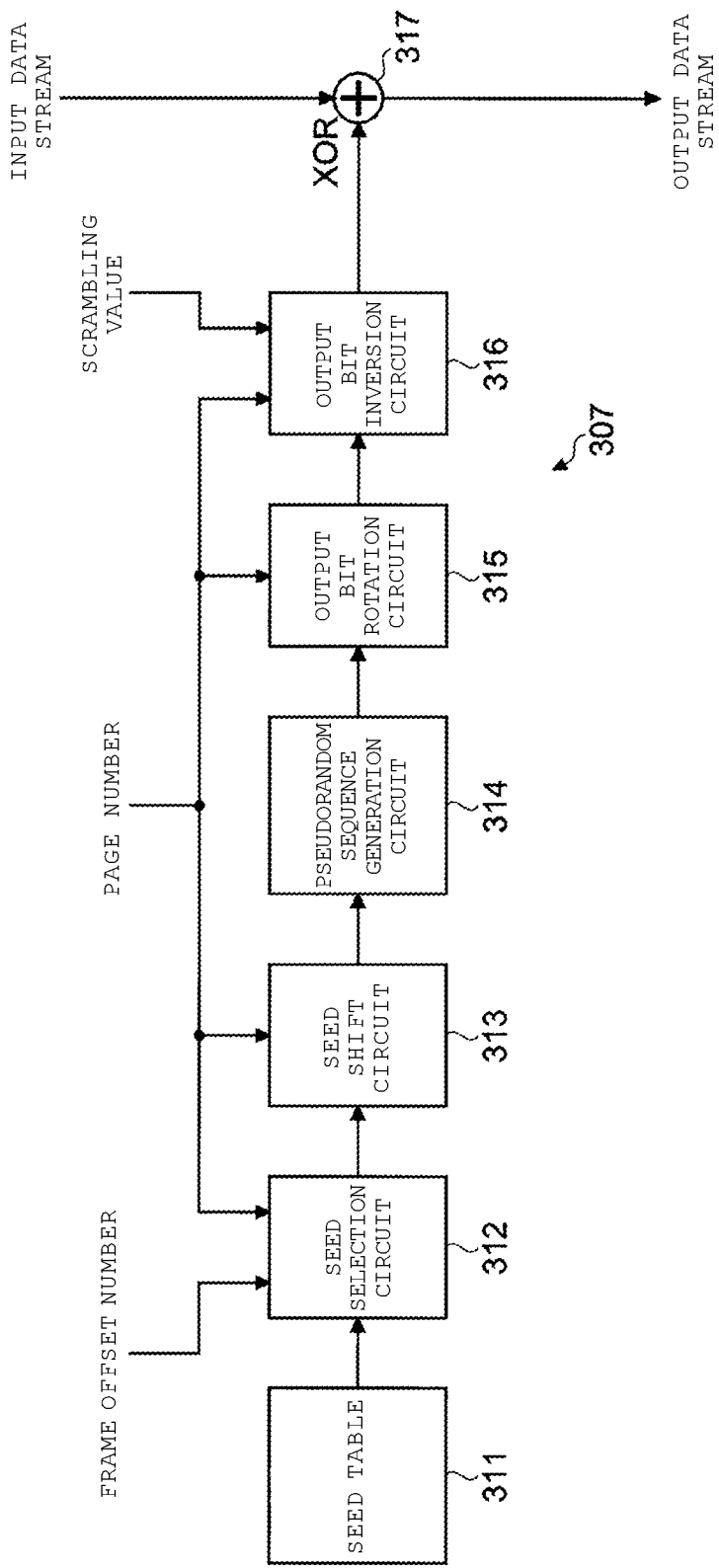
FIG. 34 illustrates a randomizer according to the twelfth embodiment.

FIG. 34 illustrates a schematic configuration example of a randomizer according to the twelfth embodiment. As illustrated in FIG. 34, the randomizer 307 includes a seed table 311, a seed selection circuit 312, a seed shift circuit 313, a pseudorandom sequence generation circuit 314, an output bit rotation circuit 315, an output bit inversion circuit 316, and an XOR circuit 317. In this configuration, the pseudorandom sequence generation circuit 314 is configured with two or more pseudorandom number generators in the above embodiments.

The seed table 311 stores the values of a plurality of seeds for generating a pseudorandom sequence. In the twelfth embodiment, for example, 67 seeds are registered in the seed table 311. Each seed is given a number of the index i=0 to 66. In addition, each seed is configured with a random sequence of which number of bits corresponds to the degree of an M-sequence (for example, 20 bits).

The seed selection circuit 312 specifies the index (hereinafter, referred to as an index number or a seed index number as well) i of a seed that is used on the basis of the frame offset number and the page number input from the setting circuit 301, and obtains the seed specified by the index i from the seed table 311. In addition, the seed selection circuit 312 inputs the obtained seed into the seed shift circuit 313.

The seed shift circuit 313 shifts the seed input from the seed selection circuit 312 on the basis of the page number input from the setting circuit 301 and inputs the shifted seed into the pseudorandom sequence generation circuit 314.

The pseudorandom sequence generation circuit 314 generates a pseudorandom sequence by using the input seed as in, for example, any of the above embodiments and inputs the generated pseudorandom sequence into the output bit rotation circuit 315. The configuration of any of the above embodiments may be applied to the pseudorandom sequence generation circuit 314.

The output bit rotation circuit 315 shifts the pseudorandom sequence generated by the pseudorandom sequence generation circuit 314 on the basis of the page number input from the setting circuit 301 and inputs the pseudorandom sequence after shifting into the output bit inversion circuit 316.

The output bit inversion circuit 316 performs a scrambling process that inverts/non-inverts the bit value of the pseudorandom sequence input from the output bit rotation circuit 315 on the basis of the page number and the scrambling value input from the setting circuit 301, and inputs the pseudorandom sequence after the scrambling process into the XOR circuit 317.

The XOR circuit 317 performs a scrambling/descrambling process on target data by calculating XOR of data written into the nonvolatile memory 120 and data read from the nonvolatile memory 120 (hereinafter, collectively referred to as an input data stream) and the pseudorandom sequence input from the output bit inversion circuit 316.

Next, a more specific operating example of the seed selection circuit 312 will be described in detail by using FIG. 35. FIG. 35 illustrates an operating example of a seed selection circuit according to the twelfth embodiment when the frame size of data written into the nonvolatile memory is in units of 512 bytes. In the present description, in the case of the frame size being equal to 512 bytes, 32 frames are stored in one page. Therefore, in the present description, the frame offset number has a value of 0 to 31. In FIG. 35, a number described in each box in a table having a horizontal direction as the frame offset number and a vertical direction as the page number represents the index number of a seed.

The index number i of a seed selected at the time of generating a pseudorandom sequence can be determined in accordance with a formula (4) below with the page number and the frame offset number as input, given that the size of the seed table 311 or the number of positively set seeds is a prime number p and that the number of bits of a seed is f (refer to FIG. 35). In the formula (4), a frame number is equal to page number×f+frame offset number. The prime number p is, for example, 67, and the number f of bits of a seed is, for example, 32 bits.

$$i = \{\text{frame number} \times \text{Ceiling}(\text{page number}/p)\} \bmod p \quad (4)$$

Using the formula (4) above allows the seed index number i to be immediately obtained with the page number and the frame offset number as input. This indicates that a seed selection method that uses the above formula (4) is a method that is appropriate for not only sequential access to the NAND memory but also implementation corresponding to random access.

In the present embodiment, the reason why the number of used seeds is 67 is that the number of seeds is desirably a prime number that is greater than the number of frames (32 in the present description) in the inter-column direction. The reason why a prime number is selected as the number of seeds is that the formula (4) uses a property of a prime number.

As illustrated in FIG. 35, using a property of a prime number can configure, for every 67 pages, the index number i of 0 to 66 of a seed to appear once in an array of seeds in the inter-page direction (vertical direction) and configure the layout of the index numbers i to be a different combination between adjacent pages.

For example, when the page number is in the range of 0 to 66, the index number i of a seed table is incremented by one for each frame (horizontal direction), and when the page number is in the range of 67 to 133, the index number i of a seed table is incremented by two for each frame (horizontal direction). Furthermore, when the page number is in the range of greater than or equal to 134 (for example, to 200), the index number i of a seed table is incremented by three for each frame (horizontal direction).

Using a selection method as illustrated in FIG. 35 can achieve randomness in the inter-column direction (horizontal direction) and improve randomness in the inter-page direction (vertical direction). Such a property can be used to maximum 67×66 pages.

Figures 36, 37, 38:
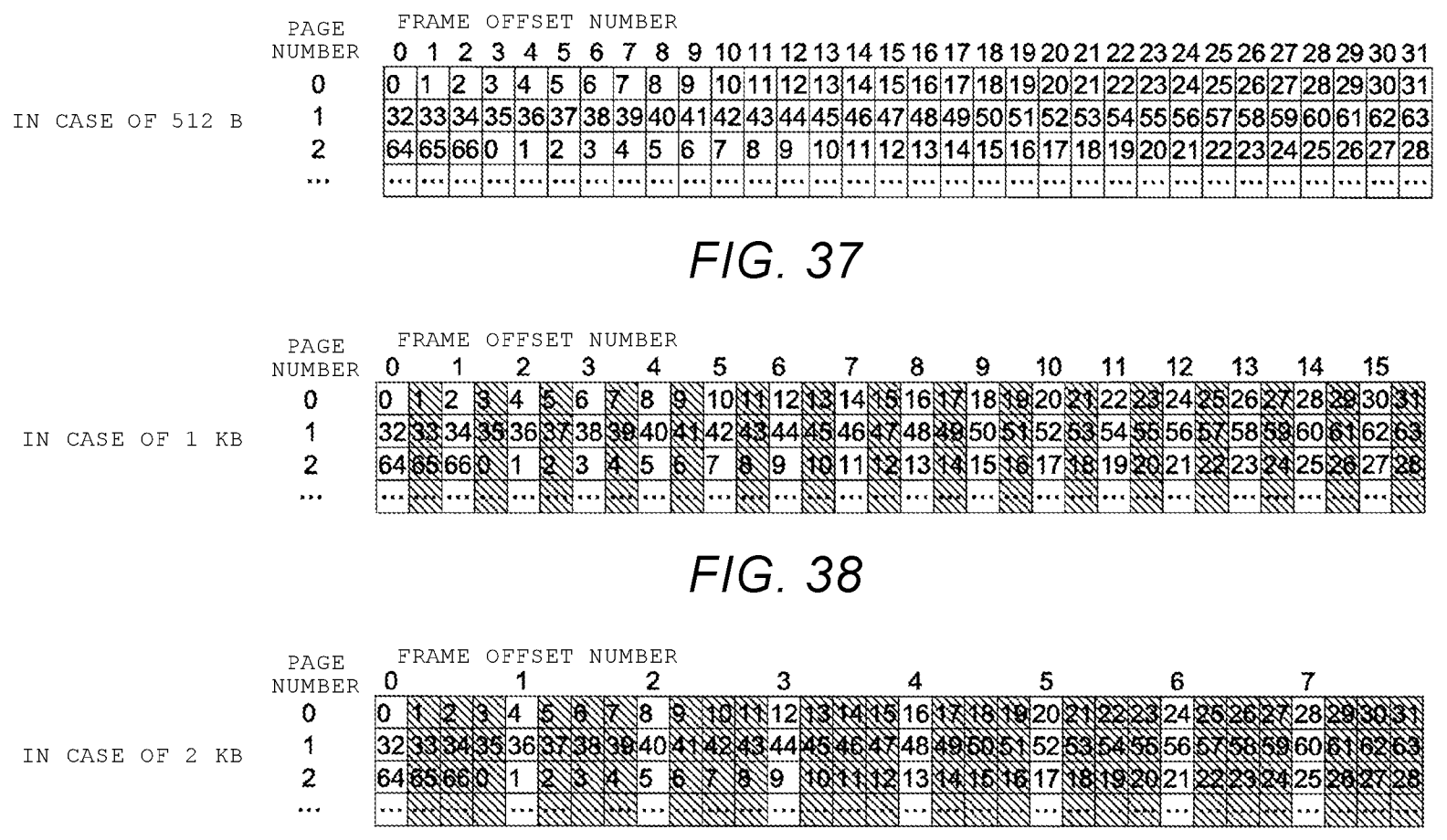

A seed selection method using the seed selection circuit 312 will be described in detail with reference to FIG. 36 to FIG. 41. FIG. 36 to FIG. 41 illustrate one example of a seed selection method using a seed selection circuit in the case of the frame size being greater than or equal to 512 bytes. FIG. 36 illustrates a case of the frame size being equal to 512 bytes. FIG. 37 illustrates a case of the frame size being equal to 1 kilobyte. FIG. 38 illustrates a case of the frame size being equal to 2 kilobytes. FIG. 39 illustrates a case of the frame size being equal to 4 kilobytes. FIG. 40 illustrates a case of the frame size being equal to 8 kilobytes. FIG. 41 illustrates a case of the frame size being equal to 16 kilobytes. Even in FIG. 36 to FIG. 41, a number described in each box in a table having a horizontal direction as the frame offset number and a vertical direction as the page number represents an index number in the same manner as FIG. 35.

As illustrated in FIG. 36 to FIG. 41, in the twelfth embodiment, the interval between the seed indexes i is doubled each time the frame size is doubled. In the case of a great frame size, a pseudorandom sequence generated from an M-sequence pseudorandom number generator (pseudorandom sequence generation circuit 314) is used across a plurality of seeds. Such a configuration reduces a non-used part of a pseudorandom sequence generated from an M-sequence and thus allows the degree of an M-sequence to be designed to be small in the same manner for different frame sizes. In addition, since the manner of lining up seeds in the vertical direction is not changed by the frame size, an advantage that randomness is unlikely to receive influence from the frame size is achieved.

Figure 42:
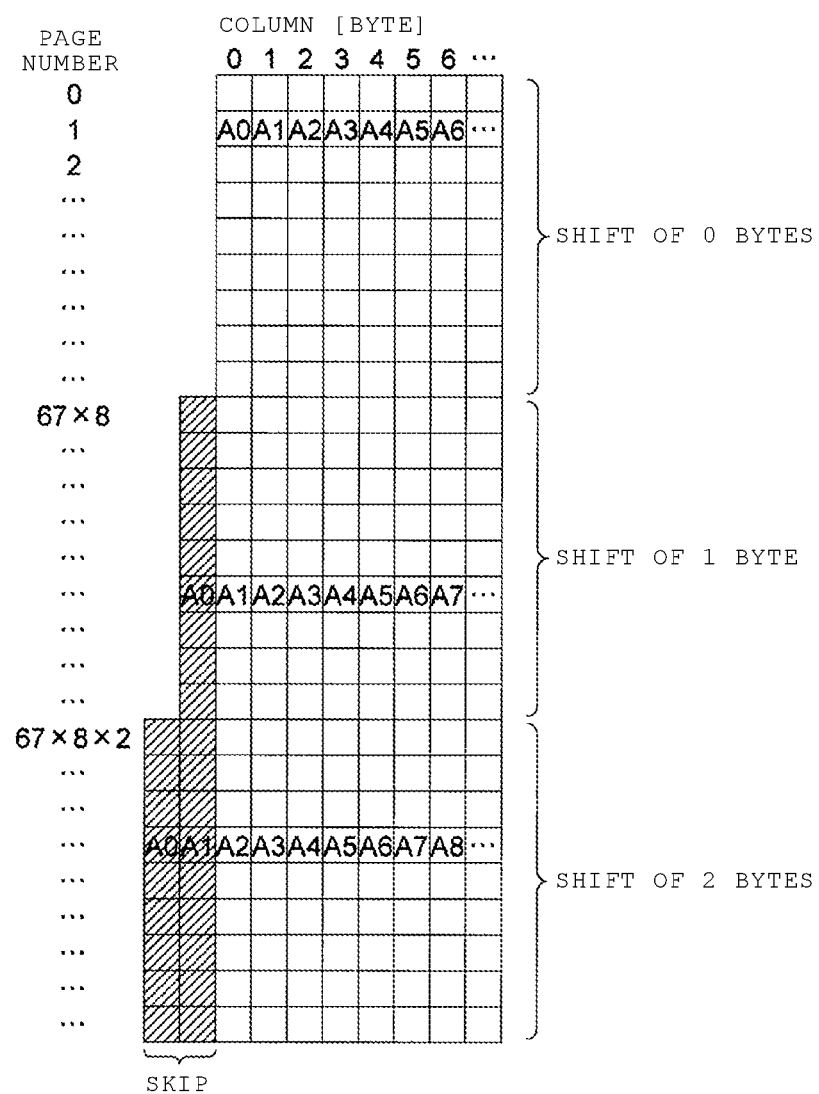
FIG. 42 illustrates a sequence of an operation of a seed shift circuit according to the twelfth embodiment.

Next, a more specific operating example of the seed shift circuit 313 will be described in detail with reference to the drawings. FIG. 42 illustrates an operating example of a seed shift circuit according to the twelfth embodiment. In FIG. 42, a number described in each box in a table having a horizontal direction as a column (byte) and a vertical direction as the page number represents the bytes of a pseudorandom sequence that is generated by a seed selected from a seed table.

As illustrated in FIG. 42, the seed shift circuit 313 performs an operation of shifting the value of a seed input from the seed selection circuit 312 in units of bytes. For example, when the page number is in the range of 0 to 67×8−1, the set amount of shifting is equal to zero. For that reason, a shift operation for the seed is not performed, and the seed input from the seed selection circuit 312 is used as is. Meanwhile, when the page number is in the range of 67×8 to 67×8×2−1, the set amount of shifting is equal to one. For that reason, the value of the seed is shifted by one in units of bytes, and the seed after shifting is input into the pseudorandom sequence generation circuit 314. Thereafter, each time the page number reaches eight times the table size (67 in the present example), the amount of shifting is incremented by one, and a seed that is shifted by the number of bytes corresponding to the amount of shifting is input into the pseudorandom sequence generation circuit 314.

Figure 43A:
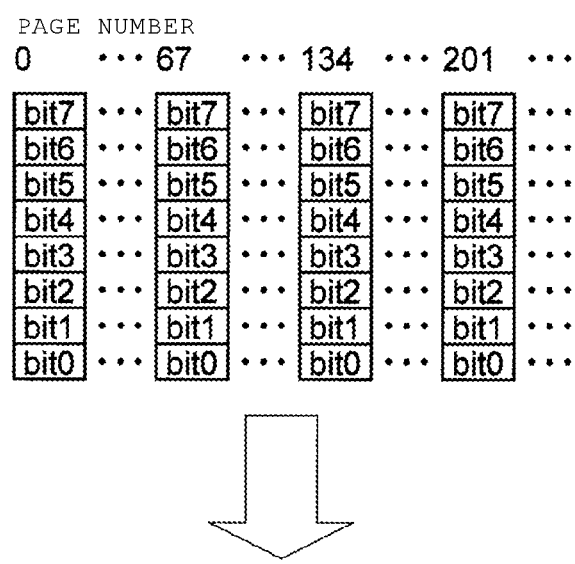
FIGS. 43A and 43B illustrate data input to and output from an output bit rotation circuit according to the twelfth embodiment.
Figure 43B:
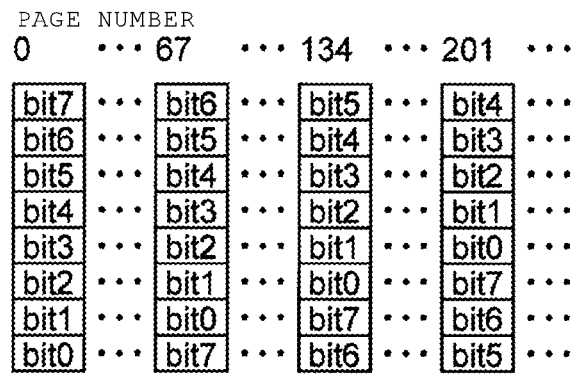

Next, a more specific operating example of the output bit rotation circuit 315 will be described in detail with reference to the drawings. FIGS. 43A and 43B illustrate an operating example of an output bit rotation circuit according to the twelfth embodiment. In FIGS. 43A and 43B, bits that are arranged in the vertical direction with respect to each page number arranged in the horizontal direction (bit 0 to bit 7) correspond to each bit of a pseudorandom sequence.

As illustrated in FIG. 43A, the output bit rotation circuit 315 first divides a pseudorandom sequence input from the pseudorandom sequence generation circuit 314 in units of bytes and lines up the divisions for each page. Next, as illustrated in FIG. 43B, each time the page number reaches a multiple of the table size (67 in the present example) of a seed table, the pseudorandom sequence is rotated (circularly shifted) in units of bytes one byte at a time. For example, when the page number is in the range of 0 to 66, the set number of rotations is equal to zero. For that reason, the pseudorandom sequence is not rotated in the column direction and is output from the output bit rotation circuit 315 with the array thereof maintained. Meanwhile, when the page number is in the range of 67 to 133, the set number of rotations is equal to one. For that reason, the pseudorandom sequence is rotated in units of bytes one byte at a time, and the pseudorandom sequence after rotation is output from the output bit rotation circuit 315. Thereafter, each time the page number reaches a multiple of the table size (67), the number of rotations is incremented by one, and a pseudorandom sequence that is rotated by the number of bytes corresponding to the number of rotations is output from the output bit rotation circuit 315.

In the twelfth embodiment, in order to realize desired randomness in the column direction, operations of the seed selection circuit 312, the seed shift circuit 313, and the output bit rotation circuit 315 may be switched in conjunction with the page number. That is, operation of at least one of the seed selection circuit 312, the seed shift circuit 313, and the output bit rotation circuit 315 may be switched in a cycle that is an integral multiple of the size of the seed table 311 or the number of positively set seeds. Specifically, first, each seed stored in a seed table is selected once by the seed selection circuit 312 for every 67 pages. The output bit rotation circuit 315 shifts a column by one bit at a time for every 67 pages and thereby substantially avoids, in the same column, conjunction of pseudorandom sequences due to selection of the same seed a plurality of times in the inter-page direction. However, since the output bit rotation circuit 315 rotates a pseudorandom sequence one byte (eight bits) at a time, the array of the pseudorandom sequence after rotation returns to the original state thereof when the cycle of 67 pages reaches eight times. In order to compensate for this, the seed shift circuit 313 shifts the pseudorandom sequence by one byte for every 67×8 pages. As a result, conjunction of pseudorandom sequences in the inter-page direction can be substantially avoided in the same column even after 67×8 pages. Consequently, a decrease in randomness of an output pseudorandom sequence can be reduced.

The twelfth embodiment achieves an advantage that influence of a circuit size accompanied by an increase in the capacity of a nonvolatile memory (for example, a NAND memory) can be decreased, because the size of the seed table 311, variation in the number of shifts of the seed shift circuit 313, and variation in the number of rotations of the output bit rotation circuit 315 exhibit a synergistic effect with respect to the number of pages.

Next, a more specific operating example of the output bit inversion circuit 316 will be described in detail with reference to FIG. 44 to FIG. 51. FIG. 44 to FIG. 51 illustrate an operating example of an output bit inversion circuit according to the twelfth embodiment. FIG. 44 illustrates the case of the scrambling value being equal to "0". FIG. 45 illustrates the case of the scrambling value being equal to "1". FIG. 46 illustrates the case of the scrambling value being equal to "2". FIG. 47 illustrates the case of the scrambling value being equal to "3". FIG. 48 illustrates the case of the scrambling value being equal to "4". FIG. 49 illustrates the case of the scrambling value being equal to "5". FIG. 50 illustrates the case of the scrambling value being equal to "6". FIG. 51 illustrates the case of the scrambling value being equal to "7". In FIG. 44 to FIG. 51, each box in a table having a horizontal direction as the frame offset number and a vertical direction as the page number corresponds to a pseudorandom sequence (after a shifting process and a rotation process) generated based on a corresponding seed of the index number I in FIG. 35.

FIG. 44 to FIG. 51 illustrate the case of a memory cell of a nonvolatile memory having three bits as a level of multiple values. In the case of the level of multiple values of the memory cell being equal to three bits, the scrambling value may also be represented in three bits. In this case, for example, bit inversion can be performed on a pseudorandom sequence in units of pages with, for example, three pages as one unit. The example illustrated in FIG. 44 to FIG. 51 is configured in such a manner that the initial page of the three pages included in each unit is associated with the rightmost bit of the 3-bit scrambling value, the last page is associated with the leftmost bit of the scrambling value, the middle page is associated with the middle bit of the scrambling value, and a pseudorandom sequence in a page is non-inverted if the bit of the scrambling value corresponding to each page is equal to "0" and is inverted if the bit is equal to "1".

Figures 52, 53:
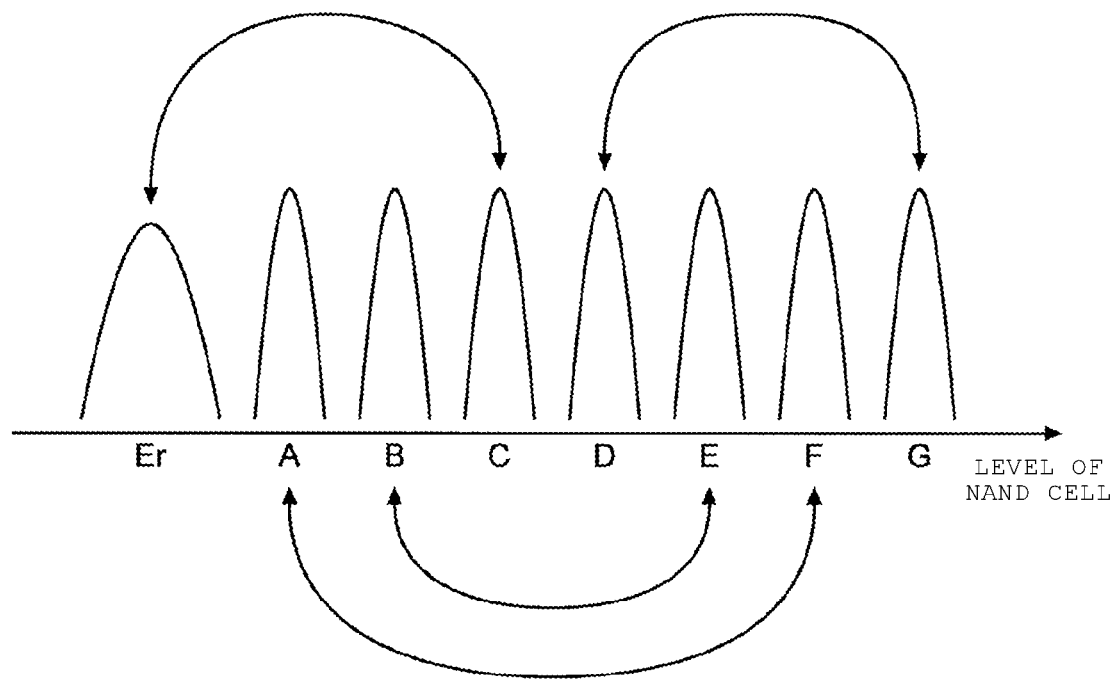
FIG. 52 illustrates an example of relationship between the scrambling value in the twelfth embodiment and swapping of a voltage level of a floating gate.
FIG. 53 illustrates swapping of a voltage level of a floating gate when the scrambling value in the twelfth embodiment is switched from "0" to "7".

A scrambling function in the twelfth embodiment means a function of preventing a voltage level of a floating gate of each memory cell from being the same before and after rewriting when data to be stored in the nonvolatile memory are rewritten. FIG. 52 illustrates an example of relationship between the scrambling value and swapping of a voltage level of a floating gate. FIG. 53 illustrates swapping of a voltage level of a floating gate when the scrambling value is switched from "0" to "7". As understood from FIG. 52 and FIG. 53, switching the scrambling value scrambles the voltage level of the floating gate and a bit value corresponding to each voltage value, and accordingly data of the same pattern can be prevented from being repeatedly written into each memory cell in the nonvolatile memory.

While the twelfth embodiment illustrates the case of repeating a pattern of inversion/non-inversion for every three pages assuming that the level of multiple values in a memory cell is equal to "3", a pattern of inversion/non-inversion may be repeated, for example, for every two pages in the case of the level of multiple values being equal to "2" and for every four pages in the case of the level of multiple values being equal to "4". That is, in the case of the level of multiple values in a memory cell being equal to M (M is a natural number), a pattern of inversion/non-inversion may be repeated for every M pages.

A pseudorandom sequence that is scrambled by the output bit inversion circuit 316 is input into the XOR circuit (scrambling circuit) 317. As described above, the XOR circuit 317 performs a scrambling/descrambling process on target data by calculating XOR of an input data stream to be written/read on the nonvolatile memory 120 and a pseudorandom sequence input from the output bit inversion circuit 316.

According to the twelfth embodiment, desired randomness can be realized in both of the inter-page direction and the inter-column direction while an increase in the circuit size is reduced. In the case of the scrambling function not being required, the output bit inversion circuit 316 can be removed.

Other configurations, operations, and effects are the same as the above embodiments, and duplicate descriptions thereof will not be provided.

Thirteenth Embodiment

While the output bit inversion circuit 316 is arranged between the output of the output bit rotation circuit 315 and the input of the XOR circuit 317 and scrambles a pseudorandom sequence before calculating XOR of the pseudorandom sequence and an input data stream in the twelfth embodiment, the present disclosure is not limited to this configuration.

Figure 54:
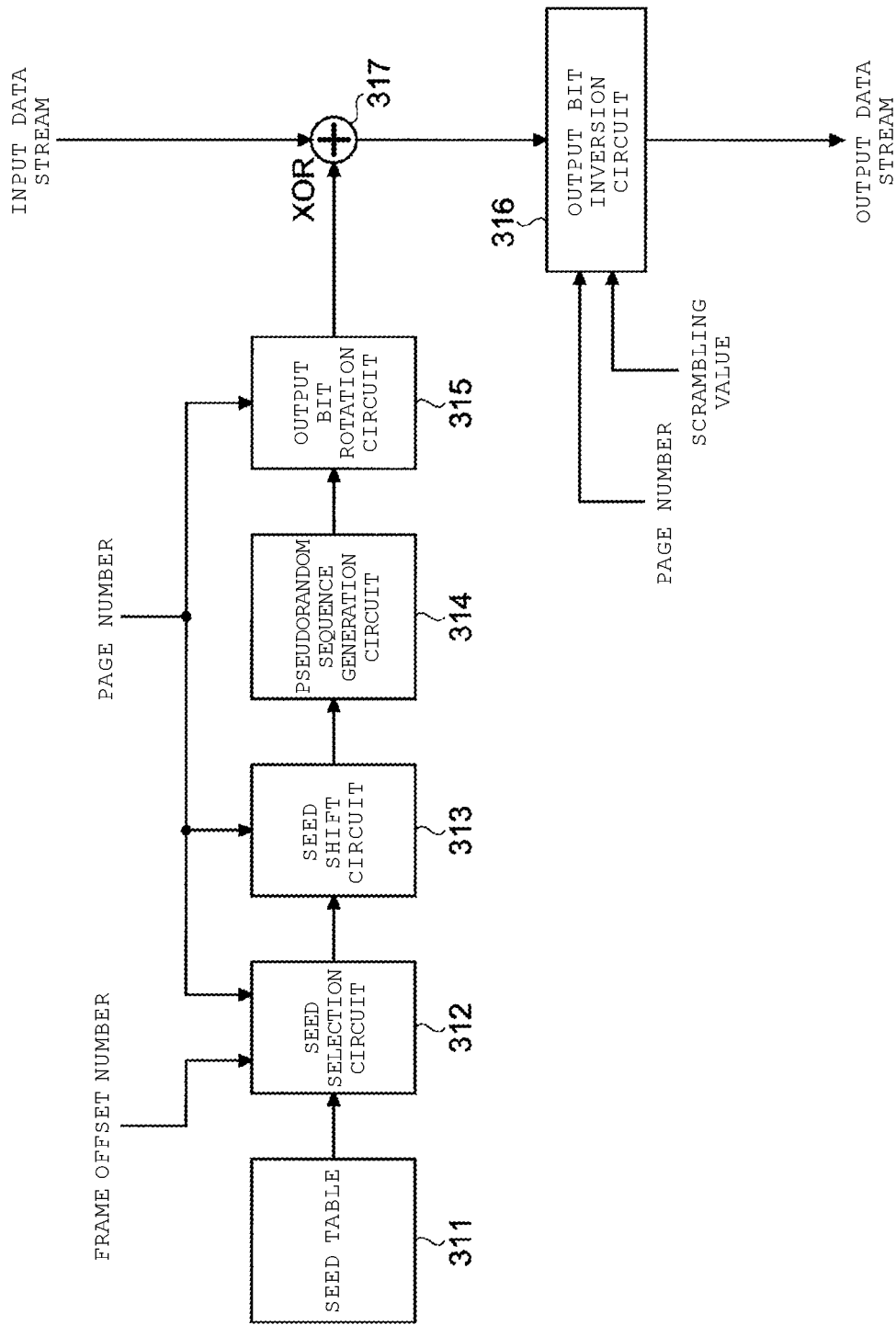
FIG. 54 illustrates an example of a randomizer according to a thirteenth embodiment.

For example, as illustrated in FIG. 54, the output bit inversion circuit 316 can be arranged on the output side of the XOR circuit 317. In this case, the output bit inversion circuit 316 scrambles the input data stream after calculating XOR of the pseudorandom sequence and the input data stream.

Figure 55:
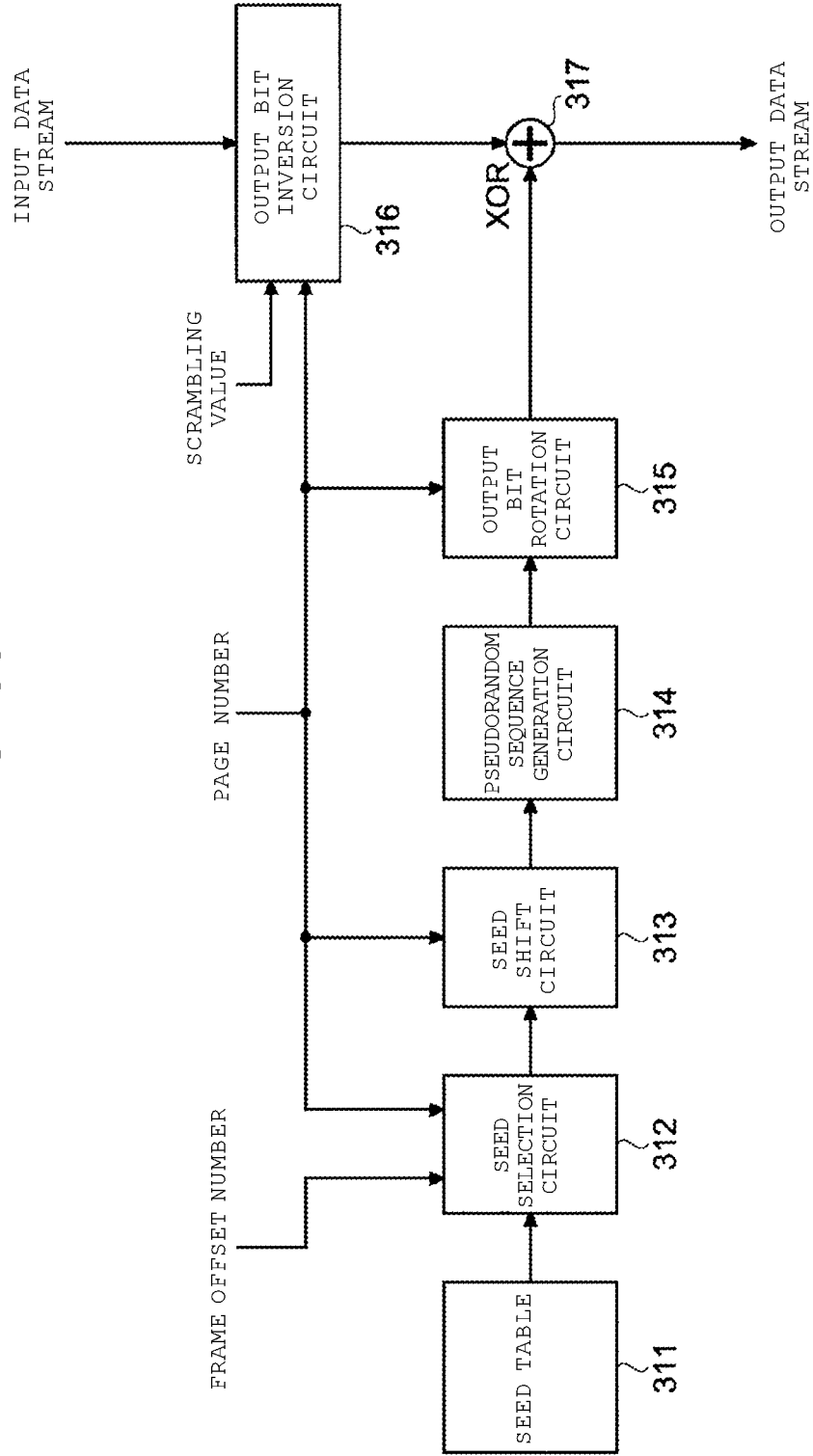
FIG. 55 illustrates another example of the randomizer according to the thirteenth embodiment.

For example, as illustrated in FIG. 55, the output bit inversion circuit 316 can be arranged on the input side of the XOR circuit 317. In this case, the output bit inversion circuit 316 scrambles the input data stream before calculating XOR of the pseudorandom sequence output from the output bit rotation circuit 315 and the input data stream.

Figure 56:
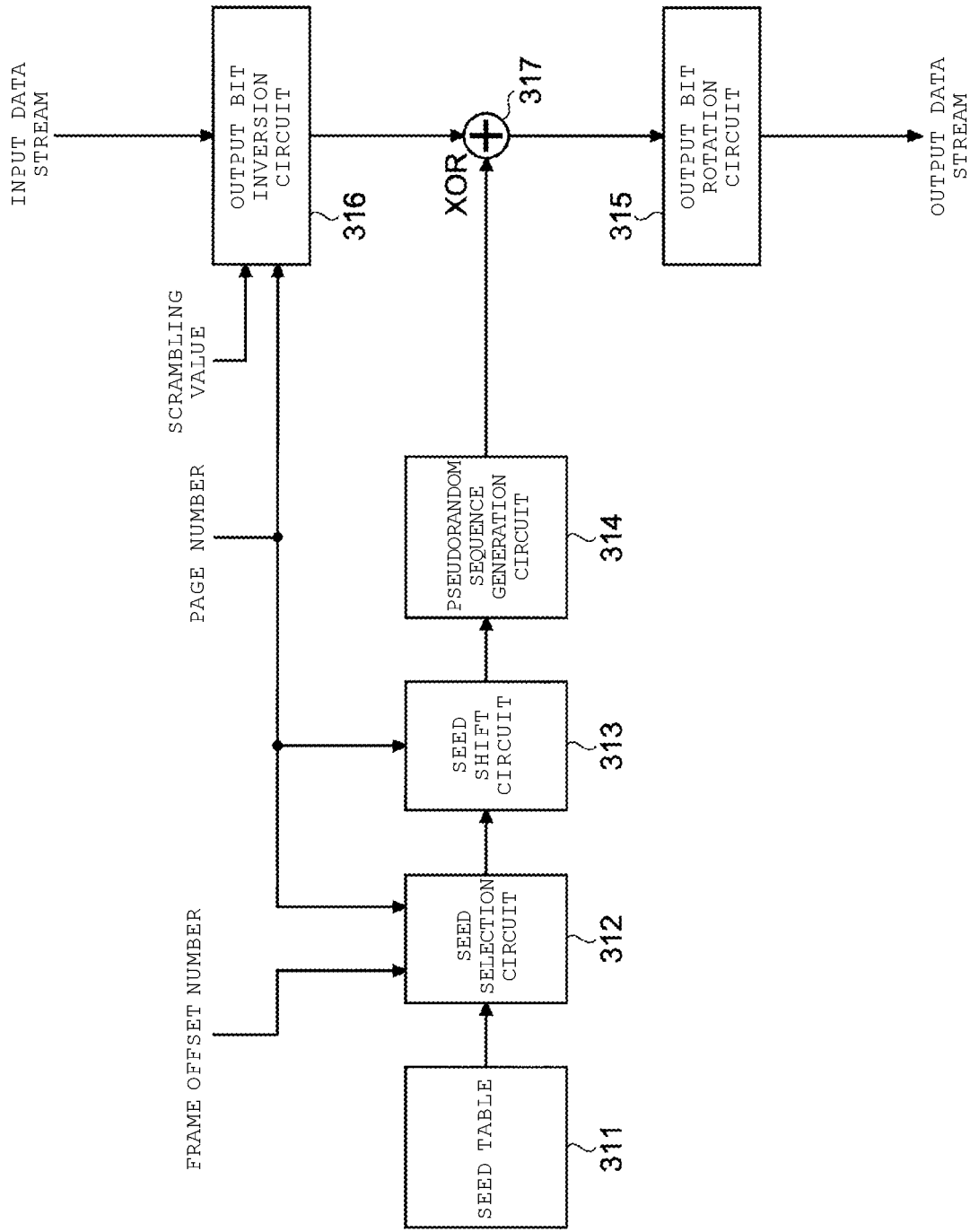
FIG. 56 illustrates still another example of the randomizer according to the thirteenth embodiment.

Furthermore, the arrangement of the output bit rotation circuit 315 is not limited to the location illustrated in the twelfth embodiment (refer to FIG. 34). For example, as illustrated in FIG. 56, the output bit rotation circuit 315 can be arranged on the output side of the XOR circuit 317. In this case, the output bit rotation circuit 315 is configured to perform the above rotation process on a data stream output from the XOR circuit 317. In the case of the output bit rotation circuit 315 being arranged on the output side of the XOR circuit 317, the direction of rotation is required to be reversed in the rotation process performed on the input data stream to be written into the nonvolatile memory and in the rotation process performed on the input data stream read from the nonvolatile memory.

Other configurations, operations, and effects are the same as the above embodiments, and duplicate descriptions thereof will not be provided.

Fourteenth Embodiment

In a fourteenth embodiment, a testing result of a randomizer illustrated in the above embodiments will be described in detail with several comparative examples with reference to the drawings.

Figure 57:
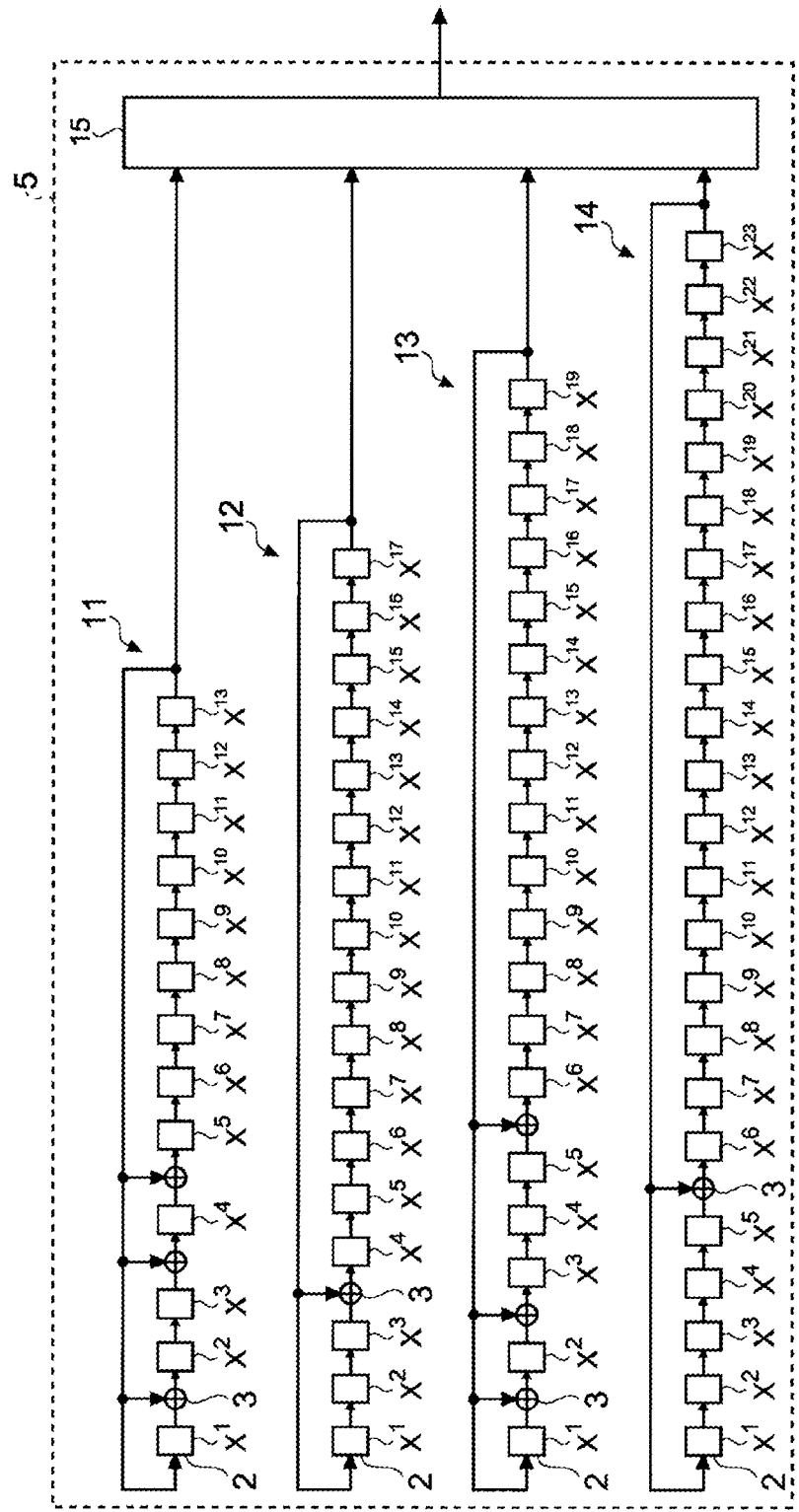
FIG. 57 illustrates an example of a pseudorandom number generator that is illustrated as a third example in a fourteenth embodiment.

In the following description, four types of pseudorandom number generators of a random number generator of a CRC-32 type (first example), the linear feedback shift register 1 illustrated in FIG. 4 in the first embodiment (second example), a pseudorandom number generator configured by combining a plurality of M-sequences illustrated in FIG. 57 (third example), and a random number generator that uses a Fibonacci sequence (fourth example) are exemplified as comparative examples. As illustrated in FIG. 57, a pseudorandom number generator 5 exemplified as the third example includes, as the plurality of M-sequence pseudorandom number generators to be combined, an M13-sequence pseudorandom number generator 11, an M17-sequence pseudorandom number generator 12, an M19-sequence pseudorandom number generator 13, and an M23-sequence pseudorandom number generator 14 and, in addition, includes a random number output unit 15 that generates a pseudorandom sequence of a predetermined number of bits (eight bits in the present description) from a pseudorandom sequence output from each of the pseudorandom number generators 11 to 14.

A randomizer according to the above embodiments, that is, a randomizer that generates a new pseudorandom sequence by calculating XOR of pseudorandom sequences output from pseudorandom number generators having different properties, is illustrated by a pseudorandom number generator that calculates XOR of output of a pseudorandom sequence (eight bits) output from the linear feedback shift register 1 exemplified as the second example and a pseudorandom sequence (eight bits) output from the pseudorandom number generator 5 exemplified as the third example and configured by combining a plurality of M-sequences.

Figure 58:
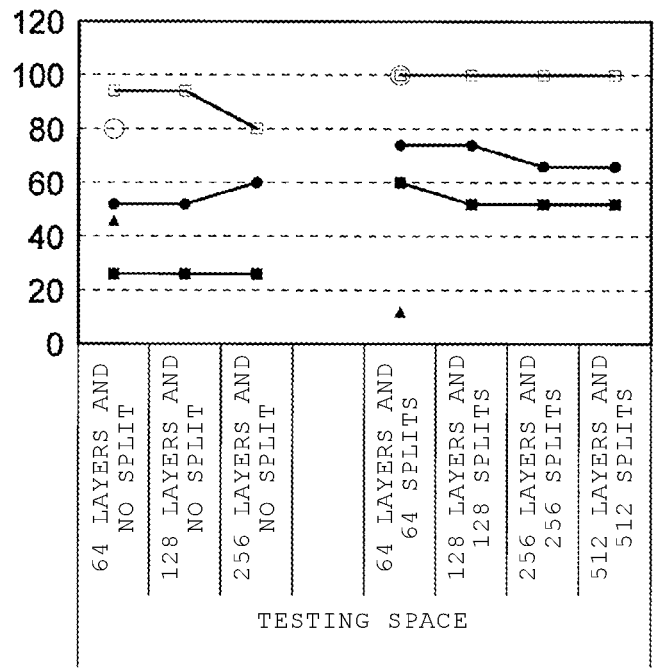
FIG. 58 is a graph illustrating a first result (pass rate) of testing using statistical hypothesis testing defined by the U.S. National Institute of Standards and Technology.
Figure 59:
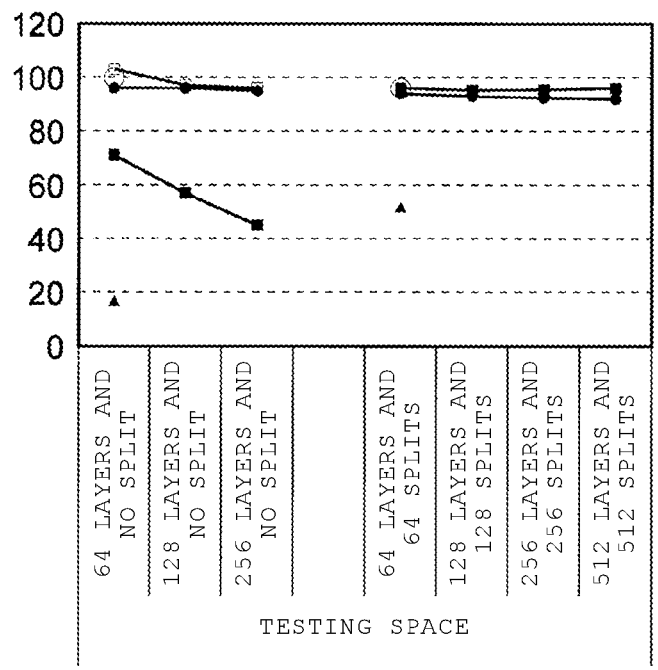
FIG. 59 is a graph illustrating a second result (P value) of the testing using the statistical hypothesis testing.

FIG. 58 is a graph illustrating a first result (pass rate) of testing using statistical hypothesis testing predefined by the U.S. National Institute of Standards and Technology (so-called NIST testing). FIG. 59 is a graph illustrating a second result (P value) of testing using the same testing. The NIST testing targets a 3D structure NAND flash memory and assumes the case where the number of layers of a storage element thereof (number of layers of BiCS) is equal to 64 layers, 128 layers, 256 layers, and 512 layers. In addition, for example, when the number of layers is equal to 64 layers in the NIST testing, testing is performed for each of the case where the entirety of a pseudorandom sequence corresponding to 64 layers is a testing target (64 layers and no split) and the case where each space obtained by splitting a pseudorandom sequence corresponding to 64 layers into 64 pieces is a testing target (64 layers and 64 splits). Similarly, in the case of the number of layers being equal to 128 layers, 256 layers, and 512 layers, testing is performed in each of the case of not splitting a pseudorandom sequence and the case of splitting a pseudorandom number into a number of pieces corresponding to the number of layers.

In FIG. 58 and FIG. 59, a "black circle" indicates a testing result of the first example, a "black quadrangle" indicates a testing result of the second example, a "black triangle" indicates a testing result of the third example, a "white quadrangle" indicates a testing result of the fourth example", and a "white circle" indicates a testing result of a randomizer according to the above embodiments.

As understood from FIG. 58, a pseudorandom sequence generated by the pseudorandom number generator that is exemplified as the fourth example and uses a Fibonacci sequence exhibits the best randomness of the four comparative examples. A pseudorandom sequence generated by the randomizer according to the above embodiments indicated by the "white circle" exhibits better randomness than a pseudorandom sequence generated by the original combined pseudorandom number generators, that is, the pseudorandom number generator of the second example and the pseudorandom number generator of the third example. This means that a new pseudorandom sequence having more excellent randomness is generated by calculating XOR of pseudorandom sequences output from pseudorandom number generators having different properties, as in the above embodiments. The generation of a new pseudorandom sequence having more excellent randomness by calculating XOR of pseudorandom sequences output from pseudorandom number generators having different properties is an effect that is also apparent from a change in the P value illustrated in FIG. 59.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of writing data into a nonvolatile memory, the method comprising:
generating a plurality of first pseudorandom sequences each having an N1-bit length;
generating a second pseudorandom sequence having an N2-bit length, where N2>N1, a seed for generating the second pseudorandom sequence being made up of a plurality of third pseudorandom sequences, each of the third pseudorandom sequences having an N3-bit length and being a part of each of the first pseudorandom sequences, where 1<N3<N1;
randomizing data on the basis of the second pseudorandom sequence; and
writing the randomized data into the nonvolatile memory, wherein N1, N2 and N3 are positive integers.

2. The method according to claim 1, wherein
generating the plurality of first pseudorandom sequences is done by a first pseudorandom number generator, and
generating the second pseudorandom sequence is done by a second pseudorandom number generator that is of a type different from a type of the first pseudorandom number generator.

3. The method according to claim 2, wherein
the first pseudorandom number generator is an M-sequence-type pseudorandom number generator, and the second pseudorandom number generator is a lagged Fibonacci-type random number generator.

4. The method according to claim 1, further comprising:
storing fixed bits and a seed table in a memory, the seed table containing a plurality of seeds as variable bits; and
generating a bit number by combining the fixed bits and one of the seeds selected from the seed table, wherein
generating the plurality of first pseudorandom sequences is done by using the generated bit number.

5. The method according to claim 1, further comprising:
storing a seed table in a memory, the seed table containing a plurality of seeds;
selecting one of the seeds from the seed table; and
shifting the selected seed, wherein
generating the plurality of first pseudorandom sequences is done by using the shifted seed.

6. The method according to claim 1, wherein
a length of a seed for generating each of the plurality of first pseudorandom sequences is shorter than a length of a seed for generating the second pseudorandom sequence.

7. The method according to claim 1, wherein
the nonvolatile memory includes a block, the block being a unit of an erase operation and having a size smaller than $2^{N2}$ bits.

8. A method of randomizing data, the method comprising:
generating a plurality of first pseudorandom sequences each having an N1-bit length;
generating a second pseudorandom sequence having an N2-bit length, where N2>N1, a seed for generating the second pseudorandom sequence being made up of a plurality of third pseudorandom sequences, each of the third pseudorandom sequences having an N3-bit length and being a part of each of the first pseudorandom sequences, where 1<N3<N1; and
randomizing data on the basis of the second pseudorandom sequence,
wherein N1, N2 and N3 are positive integers.

9. The method according to claim 8, wherein
generating the plurality of first pseudorandom sequences is done by a first pseudorandom number generator, and
generating the second pseudorandom sequence is done by a second pseudorandom number generator that is of a type different from a type of the first pseudorandom number generator.

10. The method according to claim 9, wherein
the first pseudorandom number generator is an M-sequence-type pseudorandom number generator, and the second pseudorandom number generator is a lagged Fibonacci-type random number generator.

11. The method according to claim 8, further comprising:
storing fixed bits and a seed table in a memory, the seed table containing a plurality of seeds as variable bits; and generating a bit number by combining the fixed bits and one of the seeds selected from the seed table, wherein generating the plurality of first pseudorandom sequences is done by using the generated bit number.

12. The method according to claim 8, further comprising:
storing a seed table in a memory, the seed table containing a plurality of seeds;
selecting one of the seeds from the seed table; and
shifting the selected seed, wherein
generating the plurality of first pseudorandom sequences is done by using the shifted seed.

13. The method according to claim 8, wherein
a length of a seed for generating each of the plurality of first pseudorandom sequences is shorter than a length of a seed for generating the second pseudorandom sequence.

* * * * *